United States Patent [19]
Maegawa et al.

[11] Patent Number: 6,098,111
[45] Date of Patent: Aug. 1, 2000

[54] PARALLEL DISTRIBUTED PROCESSING SYSTEM AND METHOD OF SAME

[75] Inventors: Hirotoshi Maegawa; Tetsuhiro Chiba; Yuichi Kobayakawa; Takayuki Saito, all of Tokyo, Japan

[73] Assignee: Digital Vision Laboratories Corporation, Tokyo, Japan

[21] Appl. No.: 08/812,399

[22] Filed: Mar. 5, 1997

[30] Foreign Application Priority Data

| Mar. 5, 1996 | [JP] | Japan | 8-047833 |
| Oct. 21, 1996 | [JP] | Japan | 8-278364 |
| Oct. 22, 1996 | [JP] | Japan | 8-279732 |
| Dec. 27, 1996 | [JP] | Japan | 8-351610 |

[51] Int. Cl.$^7$ ............................... G06F 9/00
[52] U.S. Cl. ............................... 709/300; 709/201
[58] Field of Search ............................ 709/201, 300, 709/303, 304, 219, 217, 225, 223; 707/10

[56] References Cited

U.S. PATENT DOCUMENTS

| 5,341,478 | 8/1994 | Travis, Jr. et al. | 395/200 |
| 5,377,323 | 12/1994 | Vasudevan | 395/200 |
| 5,396,630 | 3/1995 | Banda et al. | 395/700 |
| 5,422,999 | 6/1995 | Travis et al. | 395/200 |
| 5,425,028 | 6/1995 | Britton et al. | 370/94.1 |
| 5,430,727 | 7/1995 | Callon | 370/85.13 |
| 5,434,974 | 7/1995 | Loucks et al. | 395/200 |
| 5,588,147 | 12/1996 | Neeman et al. | 395/601 |
| 5,630,140 | 5/1997 | Modiri et al. | 395/726 |
| 5,790,548 | 8/1998 | Sistanizadeh et al. | 370/401 |

OTHER PUBLICATIONS

A. Goscinski, Distributed Operating Systems The Logic Design, Addison–Wesley, pp. 285–368, 1991.

*Primary Examiner*—Majid A. Banankhah
*Assistant Examiner*—Sue Lao
*Attorney, Agent, or Firm*—Staas & Halsey

[57] ABSTRACT

A system in which a plurality of network nodes are connected through a network, wherein when a computation object of a first network node calls a function (facility) of a computation object of a second network node, the first network node obtains a facility identification codes (numeral) of the object and the function from a remote reference table and outputs the facility identification codes through the network as a message together with the arguments of the function to the second network node. The second network node uses the input facility identification code as a key to obtain the execution address of the facility from a local reference table and executes that facility.

24 Claims, 61 Drawing Sheets

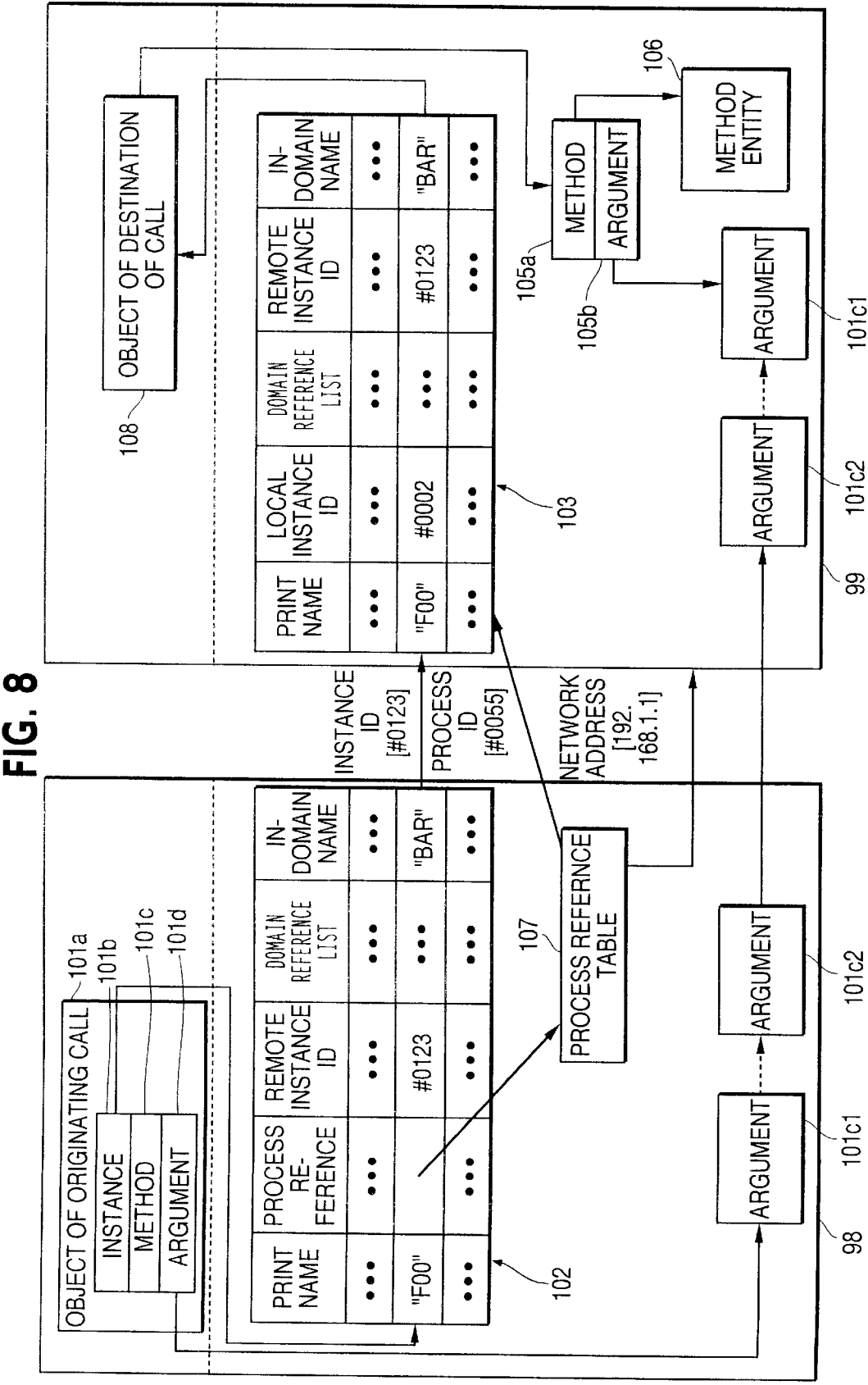

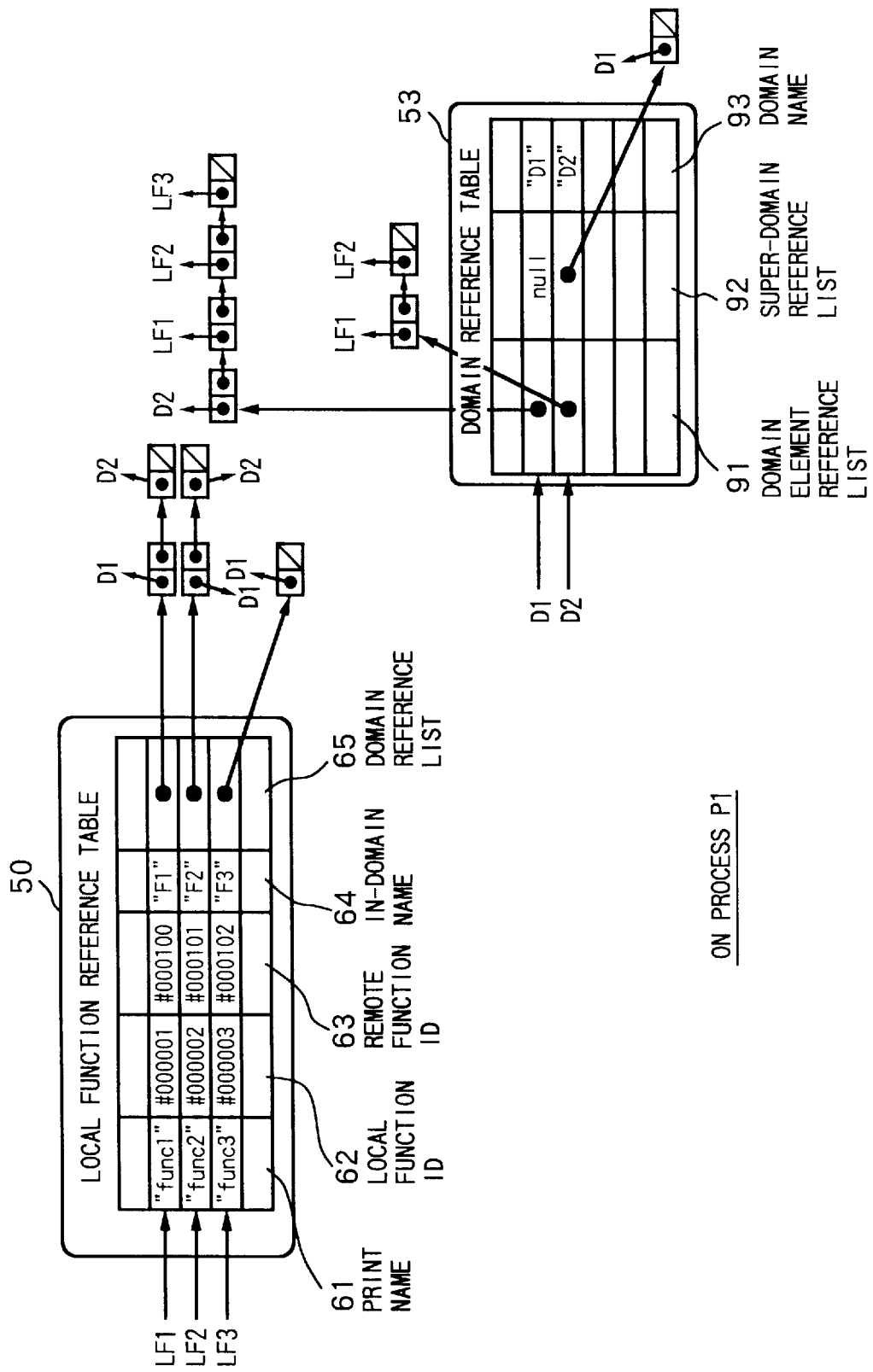

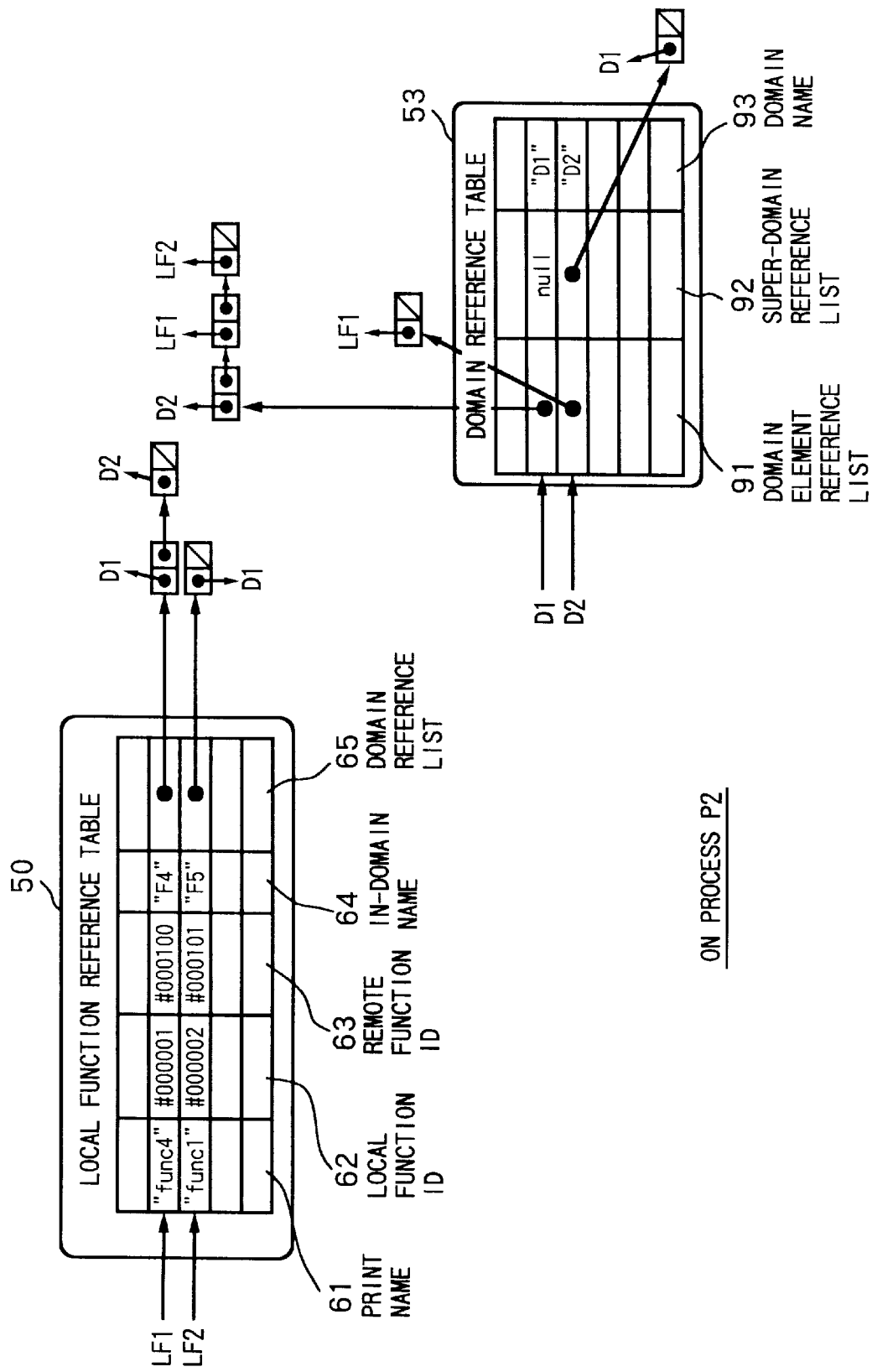

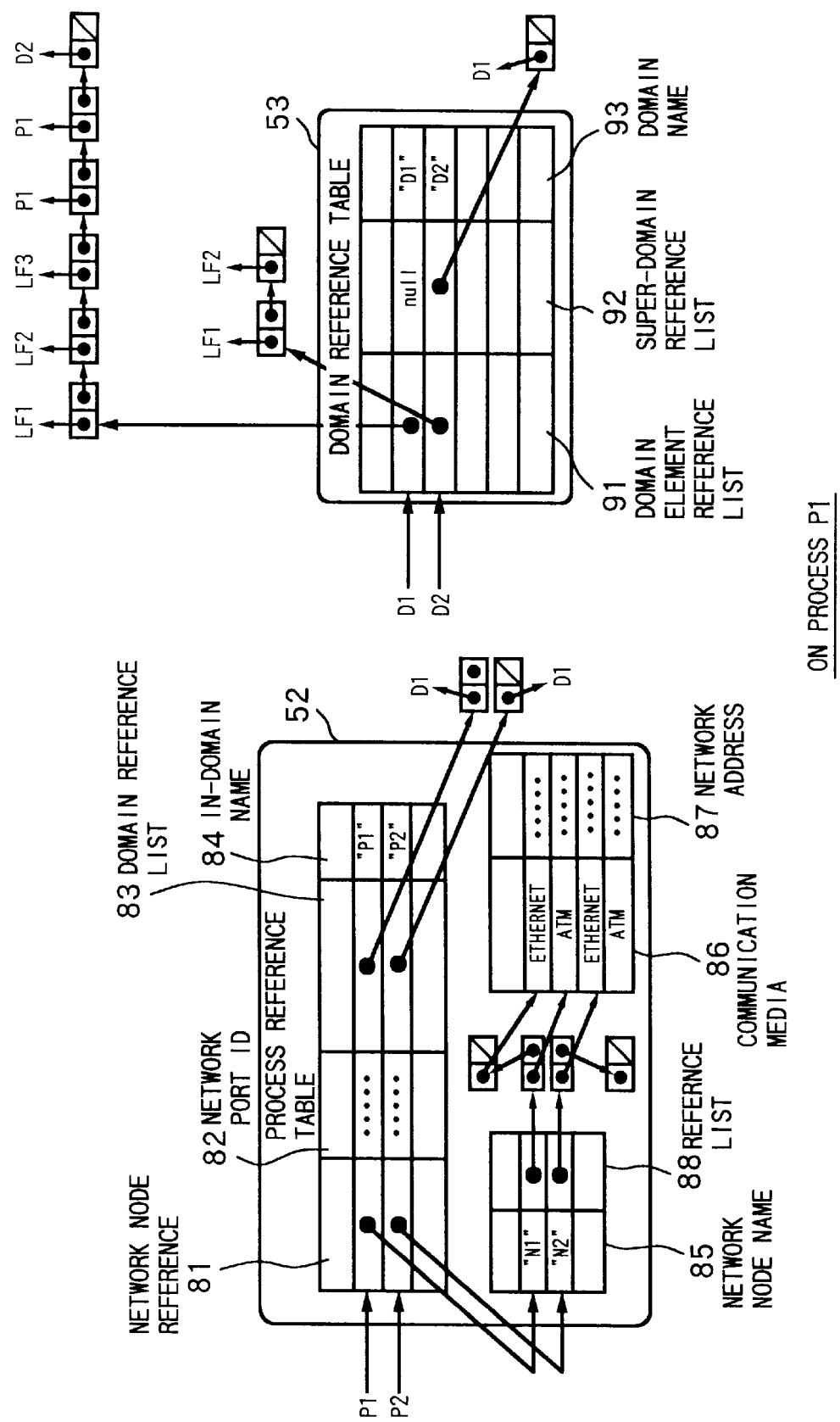

ON PROCESS P1

ON PROCESS P2

FIG.43

| CONFIGURATION ID (250) | PROCESS NAME (251) | PORT NUMBER (252) |
|---|---|---|
|  |  |  |
|  |  |  |

MANAGEMENT PROCESS A  250    251    252

| CONFIGURATION ID | PROCESS NAME | PORT NUMBER |
|---|---|---|
| #000001 | "D1/PX1" | #010000 |
| #000001 | "D1/PZ1" | #010001 |

253

MANAGEMENT PROCESS B

| CONFIGURATION ID | PROCESS NAME | PORT NUMBER |
|---|---|---|
| #000001 | "D2/PY1" | #010000 |
|  |  |  |

254

MANAGEMENT PROCESS C

| CONFIGURATION ID | PROCESS NAME | PORT NUMBER |
|---|---|---|
| #000001 | "D2/PZ2" | #010000 |
|  |  |  |

211

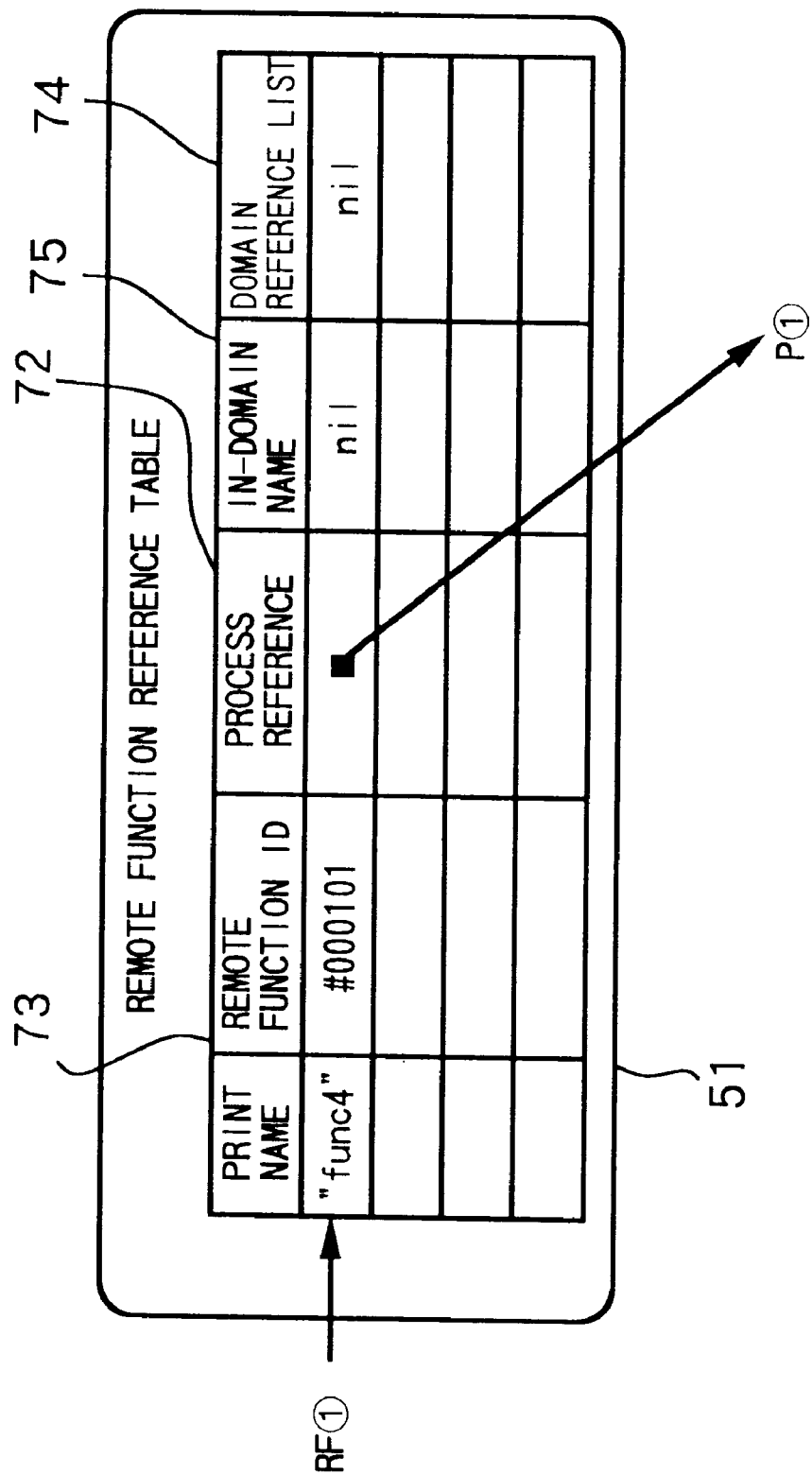

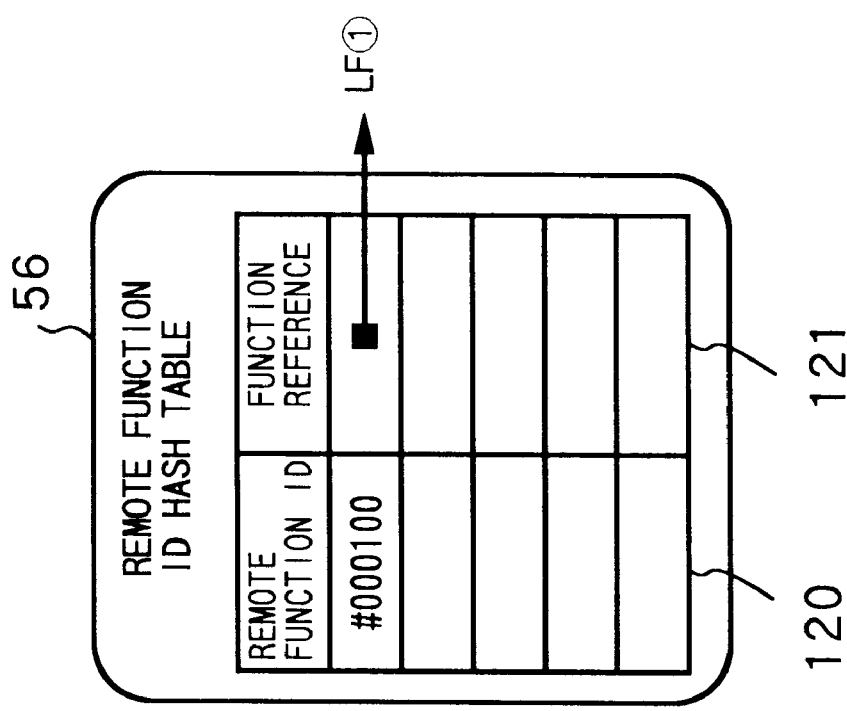
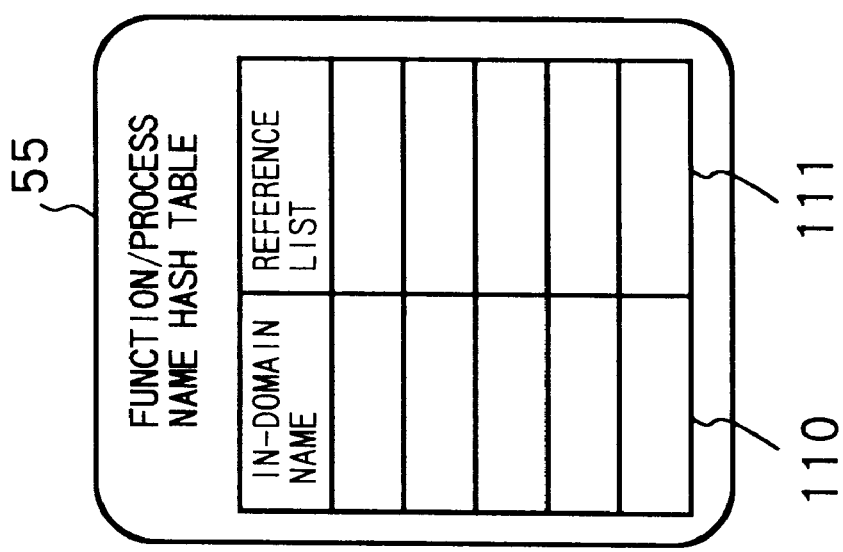

FIG.57A

FOURTH CONVERSION UNIT : A → (A1, A2, A3)
　FIRST CONVERSION UNIT : A1 → S1
　SECOND CONVERSION UNIT : A2 → (S2, S3)
　THIRD CONVERSION UNIT : A3 → A4
　　FIFTH CONVERSION UNIT : A4 → (A5, S4, S5)
　　　FIRST CONVERSION UNIT : A5 → S6

FINAL CONVERSION RESULT : A → (S1, (S2, S3), (S6, S4, S5))

FIG.57B

FOURTH CONVERSION UNIT : A → (A1, A2, A3)

FIRST CONVERSION UNIT : (A1, A2, A3) → (S1, S2, S3)

FINAL CONVERSION RESULT : A → (S1, S2, A3)

FIG.57C

FOURTH CONVERSION UNIT : A → (A1, A2, A3)

FIRST CONVERSION UNIT : (A1, A2) → (S1, S2)

SECOND CONVERSION UNIT : A3 → (S3, S4)

FINAL CONVERSION RESULT : A → (S1, S2, (S3, S4))

FIG.59

- IN DOMAIN CONVERSION UNIT 152
  - D1→(E1, E2, D2, D3)  ・・・FOURTH CONVERSION UNIT:A→(A, A, A, A)
  - D2→(E3, E4)  ・・・FOURTH CONVERSION UNIT:A→(A, A)
  - D3→(E5, E6)  ・・・FOURTH CONVERSION UNIT:A→(A, A)

- IN ENTITY CONVERSION UNIT 153
  - E1→(P1, RemoteEntityID1)  ・・・FIFTH CONVERSION UNIT:A→(A, S)
  - E2→(P2, RemoteEntityID1)  ・・・FIFTH CONVERSION UNIT:A→(A, S)
  - E3→(P3, RemoteEntityID1)  ・・・FIFTH CONVERSION UNIT:A→(A, S)
  - E4→(P4, RemoteEntityID1)  ・・・FIFTH CONVERSION UNIT:A→(A, S)
  - E5→(P4, RemoteEntityID2)  ・・・FIFTH CONVERSION UNIT:A→(A, S)
  - E6→(P4, RemoteEntityID3)  ・・・FIFTH CONVERSION UNIT:A→(A, S)

- IN PROCESS CONVERSION UNIT 154
  - P1→("www.dvl.co.jp", ProccessID1)  ・・・FIFTH CONVERSION UNIT:A→(A, S)
  - P2→("www.dvl.co.jp", ProccessID2)  ・・・FIFTH CONVERSION UNIT:A→(A, S)
  - P3→("111.111.111.111, ProccessID1)  ・・・SECOND CONVERSION UNIT:A→(S, S)
  - P4→("N1", ProccessID1)  ・・・FIFTH CONVERSION UNIT:A→(A, S)

- IN NODE NAME CONVERSION UNIT 155
  - "N1"→www2.dvl.co.jp  ・・・THIRD CONVERSION UNIT:A→A

- IN DNS NAME PROXY CONVERSION UNIT 156
  - "www.dvl.co.jp"→222.222.222.222  ・・・FIRST CONVERSION UNIT:A→S
  - "www2.dvl.co.jp"→333.333.333.333  ・・・FIRST CONVERSION UNIT:A→S

- FINAL CONVERSION RESULT
  - D1→(((222.222.222.222, ProccessID1), RemoteEntityID1), . . . . )
  - ・・・ A→((S, S), S), (S, S), S), (S, S), S), (S, S), S), (S, S), S), (S, S), S))

PARALLEL DISTRIBUTED PROCESSING SYSTEM AND METHOD OF SAME

BACKGROUND OF THE INVENTION

1. Field of the Invention

The present invention relates to a parallel distributed processing system for performing network-wide multimedia parallel processing and a method of the same.

2. Description of the Related Art

In recent years, there has been active development of ISMs (Information Super-Markets), that is, information supplying and utilizing service applications for enabling the utilization and circulation of multimedia information. In an ISM, to enhance the dialog among facility modules and the flexibility of the inter-module structure, an application execution environment enabling efficient network-wide multimedia parallel processing is required. In response to this, a "parallel distributed process system" has been developed.

In such a conventional parallel distributed processing system, a facility call is made among modules by using the module name and facility name (method name) indicated by a character string. Here, a "facility call" means the call and use of a facility provided in another module in processing carried out in a certain module.

A typical example of a parallel distributed processing system is the CORBA (Common Object Request Broker Architecture)—ORB (Object Request Broker). Here, the CORBA is a mechanism for intercommunication of software operating at a plurality of computers connected to a network and serves as the basis for flexibly and efficiently constructing a distributed system. Further, ORB is software performing the communication among objects and facilities to transfer a message received from a client object to a suitable server object via the network.

In the CORBA-ORB, the management space of the objects is defined as the entire environment supported by the system.

Further, in the CORBA-ORB, when a certain module calls a facility of another module, the facility name and arguments defined as symbols are transferred from the module originating the call to the module receiving the call. The module receiving the call is provided with a table of correspondence between the facility names and the execution addresses of the programs for executing the facilities. The module receiving the call obtains the execution address by searching through the correspondence table and executes the facility which is called.

Further, a parallel distributed processing system wherein description is made of a method of distributed allocation and execution of programs with which the user can describe the program without being conscious of which network node the module is arranged in is disclosed in Japanese Unexamined Patent Publication (Kokai) No. 3-226856.

In this method of distributed allocation and execution of programs, a private directory for designating the name of the network node in which each module is arranged is provided. The description of an external call existing in a source program is automatically rewritten (amended) by the system while referring to this directory.

Further, the above-mentioned type of parallel distributed processing system is often constructed using the Internet. In the Internet, an IP address and a DNS (domain name system) name are given to the nodes on the network. The IP address is an identification number of each data processing device connected to the network and is expressed by a 32 bit number. Further, the DNS name is a name enabling differentiation of nodes on the network by a symbolic name having meaning to the users. The network is divided into management ranges and a name given to each range. The DNS (domain name system), which is a hierarchical naming mechanism using DNS names comprised by the series of names divided by periods establishes a hierarchy of the machine names in the Internet based on the TCP/IP.

Note that, these IP addresses and DNS names must not overlap on the network, that is, through the world, and are centrally managed by a network information center (NIC).

In the conventional CORBA-ORB, however, since the module receiving the call uses the facility name indicated by the character string as a key to refer to the table and specify the execution address, and there are the problems that the cost for specifying the execution unit is large and the efficiency of the processing accompanying the facility call is poor.

Also, in the CORBA-ORB, the format of the arguments accompanying a facility call must be separately defined at the time of compilation. At this time, the data structure of the arguments which can be defined is limited to simple one such as structure and array, thus there is the problem that complex data structures such as linked data structures cannot be used.

Further, in the CORBA-ORB, the module receiving the call must exist (be registered) in advance. Further, there is the problem that it is basically necessary to define the format of the call facility and arguments at the time of compilation, thus when trying to dynamically download (additionally register) and use a module receiving a call, the work becomes troublesome.

Further, in the CORBA-ORB, when the system of synchronization for performing the facility call is different, a different programming interface (API) must be used, thus there is the problem that the description of the program becomes complex.

Further, in the conventional CORBA-ORB, the management space of the objects is defined as the entire environment supported by the system, therefore the user cannot freely define a management space having as a range of management only the required objects according to the particular purpose.

Accordingly, there is a problem that the user must maintain uniqueness of the names even for unnecessary objects in the wide area of the system even when using only part of the objects for a particular purpose and otherwise manage the system, thus the load accompanying this management is heavy.

Further, in the CORBA-ORB, since it is necessary to maintain the uniqueness of names in the wide area of the system, there is the problem that the same names cannot be used among a plurality of applications supported by the system, thus the degree of freedom of the names usable in each application is low.

Further, since the objects are managed in the wide area of the system in this way, there is the problem that the number of the objects to be managed becomes enormous and the search time when accessing an object becomes long.

Further, there also exists the problem that dynamic (incremental) space management accompanying addition, deletion, etc. of the computation modules and so on is difficult.

Further, in the method of distributed allocation and execution of programs disclosed in Japanese Unexamined Patent Publication (Kokai) No. 3-226856, since the description of the external call existing in the source program is amended while referring to the directory, there is a problem that, if the contents of the directory are changed in accordance with the change of the module allocation, it becomes necessary to newly compile the source program, so the processing accompanying the change is troublesome and cannot be quickly handled.

Further, in the DNS, which is widely spreading as the name solution mechanism for objects, the conversion of the reference information is a simple one such as conversion from a DNS name to an IP address. Namely, it cannot only handle a single step of conversion and thus cannot be used for such complex name solutions that requires multi-stage conversion. Further, it cannot adequately handle complex reference information that is based on a plurality of pieces of information either.

This means that the DNS is not suitable as the reference mechanism used in a more sophisticated parallel distributed processing environment as mentioned before. Namely, this is because, in such a parallel distributed processing environment, it is necessary to efficiently refer to various computation resources and various objects on the network by using various names and ID's, but the DNS cannot handle such a reference solution.

SUMMARY OF THE INVENTION

The present invention was made in consideration with the above prior art and has as an object thereof to provide a parallel distributed processing system and a method of same able to perform a facility call at a high speed and efficiently.

further, the present invention has as its object to provide a parallel distributed processing system and a method of same enabling the load on the user for management of the identification names of the modules to be reduced.

Further, the present invention has as its object to provide a parallel distributed processing system and a method of same enabling use of a variety of formats of arguments in a facility call.

Further, the present invention has as its object to provide a parallel distributed processing system and a method of same enabling dynamic downloading (additional registration) and use of any module receiving a call without going through troublesome work.

Further, the present invention has as its object to provide a parallel distributed processing system which can efficiently cope with a dynamic change of the computation module allocation and a method of the same.

Further, the present invention has as an object thereof to provide a parallel distributed processing system with which an application programmer can describe the reference relationship of computation modules etc. without depending upon the network allocation at the time of execution and a method of the same.

Further, the present invention has as its object thereof to provide a parallel distributed processing system with which the management space of the computation objects can be freely defined when managing the computation objects network-wide and a method of the same.

Further, the present invention has as its object to provide a parallel distributed processing system which can handle multi-stage name/reference solutions and reference by a large number of elements etc., can efficiently perform communication among the objects, and can provide a more sophisticated parallel distributed processing environment by this.

The parallel distributed processing system of the present invention is a parallel distributing processing system wherein a plurality of operation processing nodes for executing processes provided with one or more computation objects are connected with each other through a network, wherein when calling and executing a computation object or its facility provided in a first process by a second process, the second process obtains location information directly specifying the computation object or its facility on the network from referring means using as a key a name or identifier of the computation object or its facility, transmits this location information to the first process, and calls up the computation object or its facility provided by the first process.

Further, in the parallel distributed processing system of the present invention, preferably the referring means is comprised of a local referring means provided in a process receiving a call for a computation object or its facility for showing for the computation object or its facility which is called the correspondence between an identification number of the computation object or its facility and an execution address of the computation object or its facility and a remote referring means provided in a process originating a call for a computation object or its facility for showing for the computation object or its facility which it calls the correspondence between a name or identifier of the computation object or its facility and an identification number of the computation object or its facility, a process originating a call uses the name or identifier of the computation object or its facility which it calls as a key to obtain a corresponding identification number from the remote referring means and sends a message containing the identification number to the process receiving the call for the computation object or its facility, and the process receiving the call uses the identification number contained in the message sent from the process originating the call as a key to obtain the execution address of the computation object or its facility which is called from the local referring means and executes the computation object or its facility which is called based on the execution address.

Further, in the parallel distributed processing system of the present invention, preferably a computation space is prescribed which is composed of a set of any of the one or a plurality of computation objects or their facilities and in which uniqueness of names or identifiers of the computation objects or their facilities is required in only the set; and the referring means gives location information on a computation object or its facility by using the name or identifier of the computation object or its facility in the computation space as a key.

Further, in the parallel distributed processing system of the present invention, preferably each operation processing node has a process allocating means for allocating a program module at a predetermined operation processing node and creating a process at an operation processing node receiving the allocation based on allocation information indicating correspondence between location information of the program module for realizing the process and information of the operation processing node receiving the allocation of the program module and a reference information generating means for generating the reference information of the computation objects or their facilities which the program module for realizing a process refers to based on the allocation information and the reference relationship among the computation objects or their facilities described in the program module in each process.

Further, the parallel distributed processing system of the present invention preferably prescribes a computation space which is composed of a set of any of the one or a plurality of computation objects or their facilities and in which uniqueness of names or identifiers of the computation objects or their facilities is required in only the set; has a plurality of reference converting means for converting logical reference information specifying a computation object or its facility in a computation space to either of similar logical reference information and system reference information corresponding to the location information or reference information of a combination of the same; has a conversion control means for recursively inputting the input logical reference information and the logical reference information converted and generated in the reference converting means to any one of the plurality of reference converting means based on the logical reference information and converting the input logical reference information to the system reference information; and converts the logical reference information of the process receiving the communication to system reference information by the reference converting means through the conversion control means and performs communication among processes.

In the parallel distributed processing system of the present invention, at the time of initialization of the system, the relationships of facility calls between modules are analyzed. Based on the results of the analysis, facility identification numbers of for example a numerical format are allocated to the facilities to be called from another module, and the local referring means and the remote referring means are prepared. A facility call between modules is performed by using the local referring means and the remote referring means. Further, the module receiving the call uses the facility identification number indicated by the numerical format as a key and uses the local referring means to search for the execution address.

As explained above, according to the parallel distributed processing system of the present invention and the method of same, a facility call can be made at a high speed and efficiently.

Also, according to the parallel distributed processing system of the present invention and the method of same, the load on the user for management of the identification names of the modules can be reduced.

Further, according to the parallel distributed processing system of the present invention and the method of same, a variety of formats (data structures) of arguments can be used in the facility call.

Further, according to the parallel distributed processing system of the present invention and the method of same, any module receiving a call can be dynamically downloaded (additionally registered) and used without having to go through troublesome work.

Further, according to the parallel distributed processing system of the present invention and the method of the same, by introducing the concept of computation space, the user can freely form management spaces for managing only the required computation objects in accordance with particular purposes. As a result, the load on the user for management of the names and identifiers of the computation objects is reduced. Further, the number of the managed computation objects is decreased, so the time for specifying a computation object can be shortened. Further, erroneous access to a computation object out of the reference space can be effectively prevented.

Further, according to the parallel distributed processing system of the present invention and the method of the same, dynamic space management of the computation objects can be easily carried out.

Further, according to the parallel distributed processing system of the present invention and the method of the same, the allocation information concerning the network node by which the program module is executed is described outside of the program module, therefore the network node for which the program module is executed can be dynamically changed by only changing the allocation information without amendment of the description of the program module. Namely, after the computation object space is formed, the space configuration thereof can be dynamically changed.

Further, according to the parallel distributed processing system of the present invention and the method of the same, the application programmer can describe the reference relationship at the time of execution of the program module without depending upon the network allocation at the time of execution.

Namely, since the allocation information at the execution of the program module is specified outside of the program module, it is sufficient so far as the user describes the program module by being conscious of only the reference relationship of the computation object on the program module.

Further, according to the parallel distributed processing system of the present invention and the method thereof, on a computer network constituted by a plurality of computer devices etc., reference information of the application level is converted to system reference information by a process of recursive and hierarchical conversion, therefore it is possible to suitably cope with also complex reference information. Further, the resolution operation can be controlled by dividing the reference information into groups and converting it in that state, requesting the resolution from other reference resolution units, or adding additional information concerning the resolution, therefore the system reference information can be suitably obtained with respect to reference information of any format. As a result, no matter what the topology of the computer network, the present invention can solve the reference information and can therefore contributes to the provision of a more sophisticated distributed processing system and distributed processing environment.

BRIEF DESCRIPTIONS OF THE DRAWINGS

FIG. 8 is a conceptual view of the parallel distributed processing system of the present invention.

FIG. 23 is a view for explaining the initialization processing of a local function reference table on the process P1 shown in FIG. 19.

FIG. 25 is a view for explaining the initialization processing of a local function reference table on a process P2 shown in FIG. 19.

FIG. 27 is a view for explaining the initialization processing of a process reference table on the process P1 shown in FIG. 19.

FIG. 43 is a view of the configuration of a port number assignment table.

FIG. 44 is a view of the configuration of the port number assignment table.

FIG. 50 is a view for explaining an export processing.

FIG. 52A is a view for explaining the export processing.

FIG. 52B is a view for explaining the export processing.

FIG. 57A is a view of an example of operation of the reference conversion device shown in FIG. 55.

FIG. 57B is a view of an example of operation of the reference conversion device shown in FIG. 55.

FIG. 57C is a view of an example of operation of the reference conversion device shown in FIG. 55.

FIG. 59 is a view of an example of operation of the reference solution unit shown in FIG. 58.

DESCRIPTION OF THE PREFERRED EMBODIMENTS

Below, an explanation will be made of a parallel distributed processing system according to an embodiment of the present invention.

The parallel distributed processing system according to the present embodiment supports the execution environment of, for example, an ISM, enhances the dialog between facility modules and the flexibility of the inter-module structure, and thereby enables network-wide multimedia parallel processing.

First Embodiment

Figure 1:
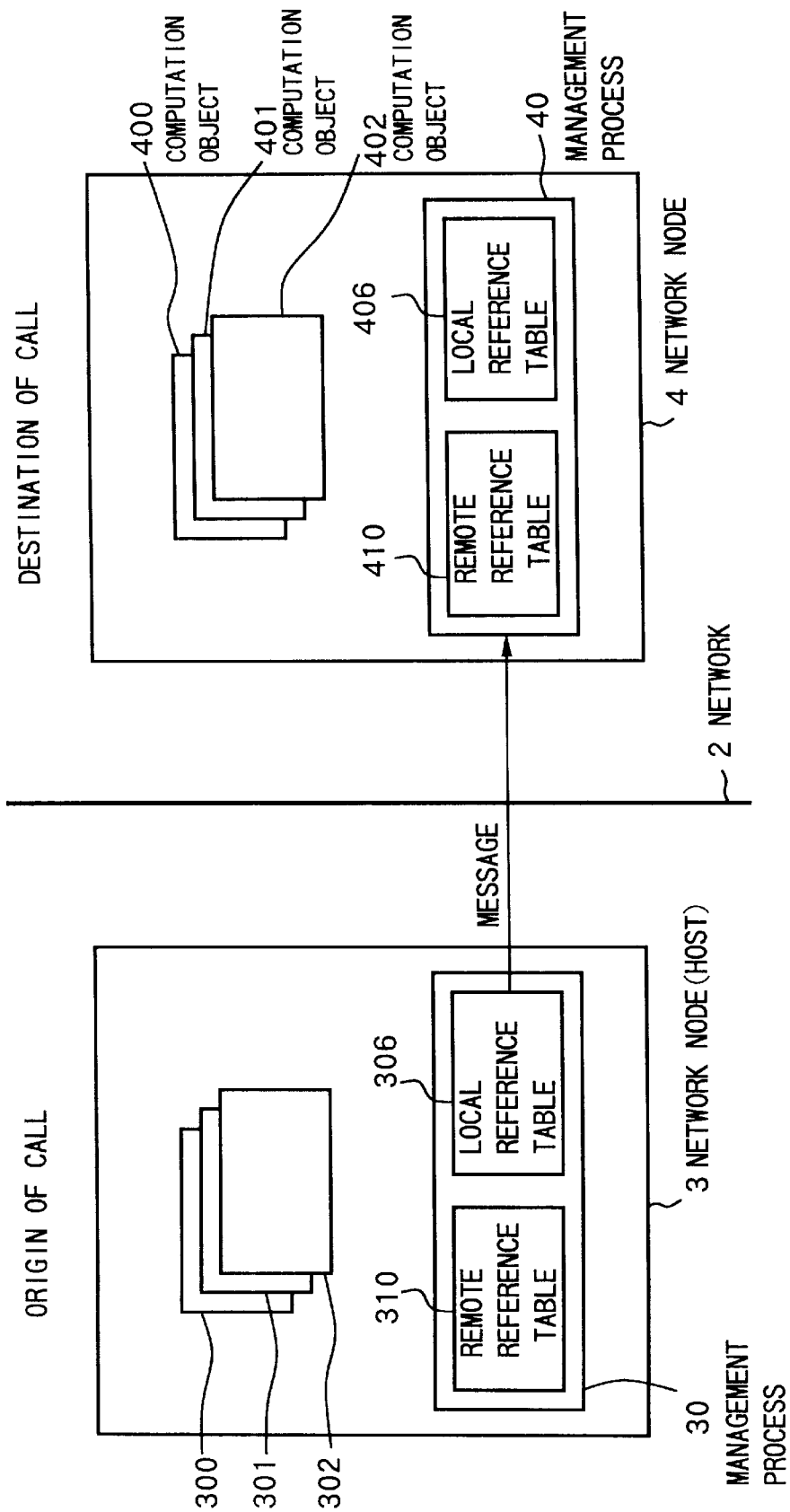
FIG. 1 is a conceptual view of a parallel distributed processing system according to the first embodiment of the present invention.

FIG. 1 is a conceptual view of a parallel distributed processing system 1 according to the present embodiment.

As shown in FIG. 1, in the parallel distributed processing system 1, network nodes 3 and 4 communicate via a network 2 to perform predetermined processing. As the network nodes 3 and 4, for example use may be made of host computers. In the network node 3, programs such as a management process 30 and computation objects 300, 301, and 302 operate. Here, a computation object executing application program is comprised of a definition of a function, variable, class and method which define an operation of said computation object, and the operation of an instance generated based on the class is described in a definition of a function and method, etc.

The management process 30 has a local reference table 306 and a remote reference table 310 as will be explained later.

The local reference table 306 is a table indication the correspondence of the facility identification codes and the addresses at which the facilities thereof are stored. The local reference table 306 is used for obtaining the address in the computation objects 300 to 302 of the facility which is called from the facility identification code contained in the message input from the network node 4 when a facility call is made from the network node 4 to the network node 3.

The remote reference table 310 is a table showing the correspondence of the addresses as the facility identifiers at which the facility identification codes are stored and the facility identification codes. The remote reference table 310 is used for obtaining the facility identification code of a facility from the address referred to in the computation objects 300 to 302 when a facility call is made from the network node 3 to the network node 4.

Further, in the network node 4, programs such as a management process 40 and computation objects 400, 401, and 402 operate.

The computation objects 400 to 402 of the network node 4, the local reference table 406, and the remote reference table 410 have the same meanings and facilities as those of the computation objects 300 to 302 of the network node 3, the local reference table 306, and the remote reference table 310.

In the parallel distributed processing system 1 shown in FIG. 1, the allocation of the computation objects, that is, in which network node or processor which computation object is allocated, is in principle analyzed (designated) only one time at the time of initializing the system. Accordingly, at the time of execution of the system, each computation object already knows the location of the computation object which receives a call when calling the facility of another class. Note that the allocation of the computation objects is sometimes designated at the time of execution of the system.

Note that, the network 2 may have other network nodes connected to it too in addition to the network nodes 3 and 4.

Below, an explanation will be made of the processing in the parallel distributed processing system 1 taking as an example the case where a facility provided in the computation object 402 of the network node 4, more specifically a method, is called when performing the processing of a method call in object-oriented computation, that is, the processing of the computation object 302 at the network node 3.

In the processing of the method call in the object-oriented computation, the method in the computation object is for example a functional procedure or other facility.

[Preparation of Local Reference Table and Remote Reference Table]

Figure 2:
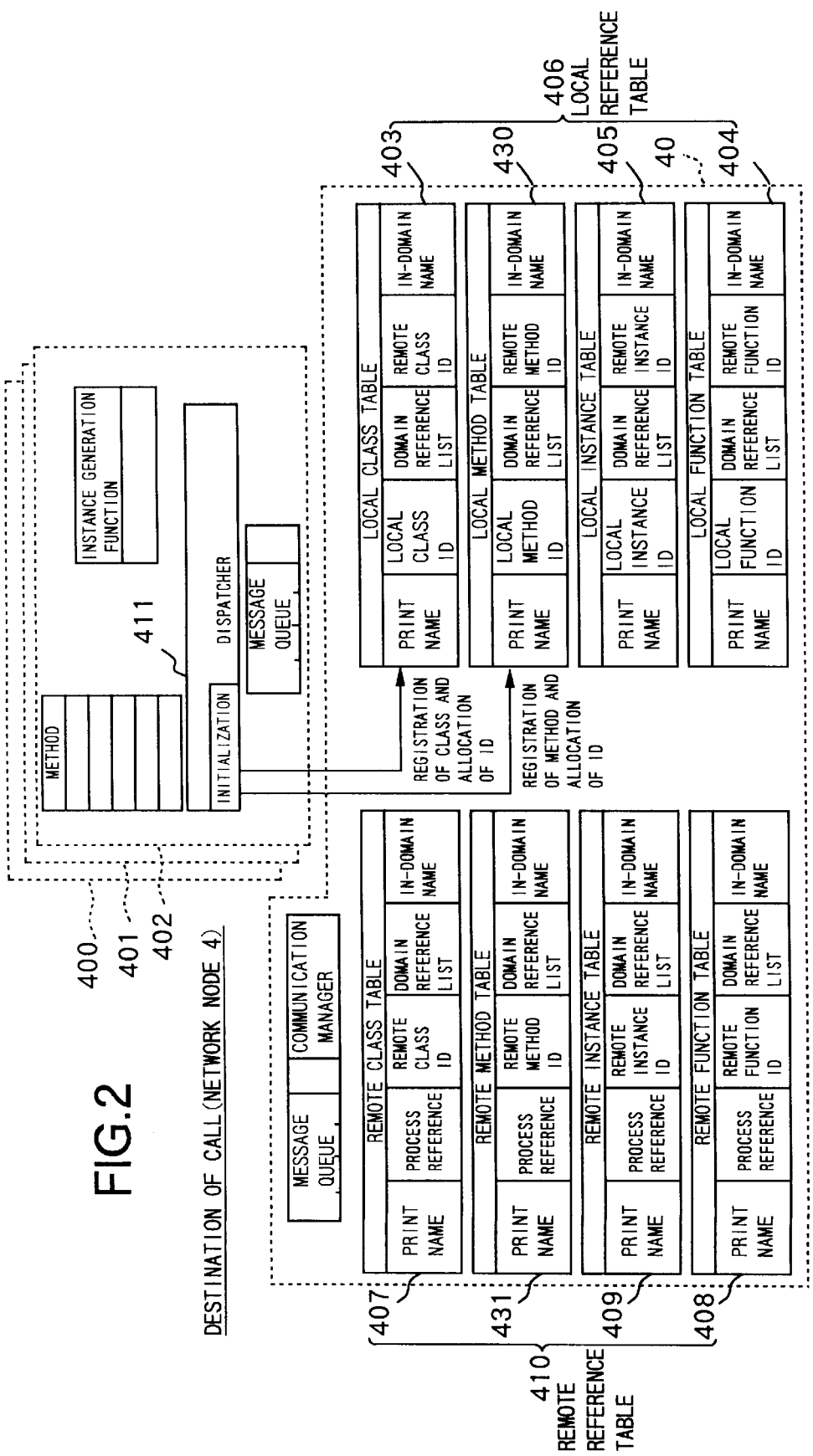
FIG. 2 is a view for explaining a procedure for preparing a local reference table in the parallel distributed processing system shown in FIG. 1.

In the parallel distributed processing system 1, where for example the computation object 302 is newly added (registered) in the network node 3 shown in FIG. 3, and the computation object 302 calls the facility of the computation object 402 of the network node 4 shown in FIG. 2, the remote reference table 310 of the management process 30 shown in FIG. 3 and the local reference table 406 of the management process 40 shown in FIG. 2 are prepared or updated as shown below.

First, an explanation will be made of the preparation of the local reference table.

Figure 3:
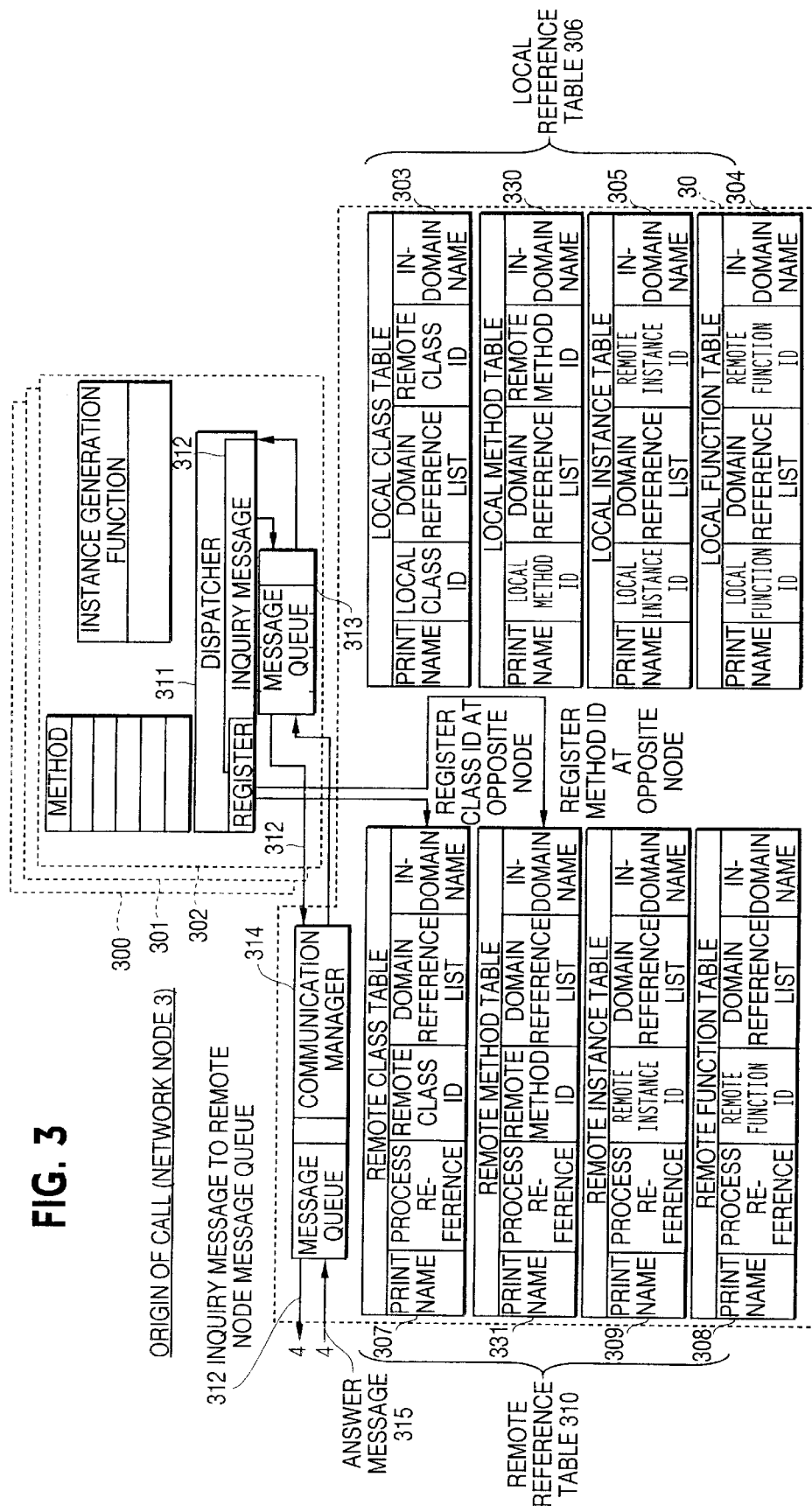
FIG. 3 is a view for explaining a procedure for preparing a remote reference table in the parallel distributed processing system shown in FIG. 1.

The network nodes 3 and 4 prepare the local reference tables 406 and 306 shown in FIG. 2 and FIG. 3 for the classes, the methods, the instances and the functions defined by these computation objects at for example the time of initializing the system.

Here, the local reference table 306 is comprised by a local class table 303, a local function table 304, a local instance table 305, and a local method table 330.

Further, the local reference table 406 is comprised by a local class table 403, a local function table 404, a local instance table 405, and a local method table 430.

Here, the local method tables 330 and 430 show the correspondence between the "method ID" of the method and the "method address", that is, the execution address of the method.

Note that, the relationships of calls of the methods between the network nodes 3 and 4 and other network nodes are analyzed in advance at the time of initializing the system and when the computation object 402 is newly added. At the stage for preparing the remote reference table 310 and the local reference table 406, a "method ID (facility identification code)" and a "class ID" are automatically allocated to the method and the class of the computation object 402, respectively.

Next, an explanation will be made of the preparation of the remote reference table.

For example, where the computation object 302 shown in FIG. 1 calls method provided in the computation object 402, as shown in FIG. 3, the network node 3 outputs an inquiry 312 to the network node 4 using the computation object 402 and method name from a dispatcher 311 of the computation object 302.

When receiving this inquiry 312, the network node 4 refers to the local reference table 406, inserts the "class ID" and "method ID" assigned to the computation object 402 and the method of the computation object 402 in an answer message 315 shown in FIG. 3, and outputs the same to the network node 3 via the network 2 shown in FIG. 1. The answer message 315 is output to the dispatcher 311 via the message queues (waiting matrixes) 314 and 313 in the network node 3.

Next, the dispatcher 311 performs the registration processing and prepares a remote class table 307 and a remote method table 331 by using the "class ID" and "method ID" contained in the answer message 315.

Here, the remote reference table 310 is comprised by a remote class table 307, a remote function table 308, and a remote instance table 309, and a remote method table 331.

The local reference table and the remote reference table are prepared as an initialization process when the network node 3 and the network node 4 are connected via the network 2 or are automatically prepared only one time when a new computation object is dynamically downloaded (additionally registered) in the network nodes 3 and 4.

[Facility Call Processing]

Below, an explanation will be made of a case where a facility call is made from the network node 3 to the network node 4 by using the remote reference table 310 and the local reference table 406 prepared as mentioned before. Here, the explanation will be made of the case of a so-called complete synchronous message transmission in which the computation object originating the call calls the facility, then stops its processing until it receives as input the result of execution of the function from the computation object receiving the call.

Figure 4:
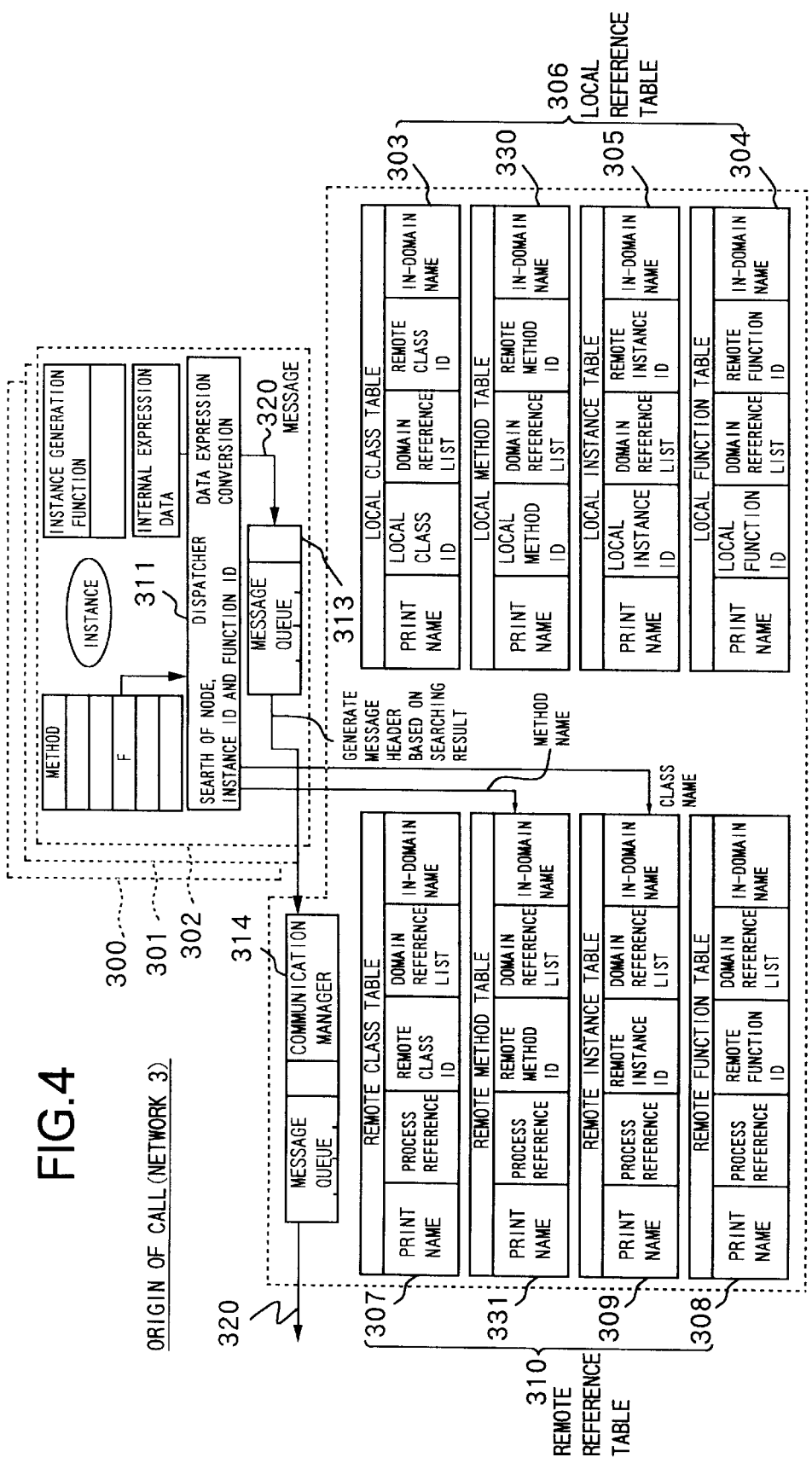
FIG. 4 is a view for explaining the processing in a network node originating a call when calling a facility in the parallel distributed processing system shown in FIG. 1.
Figure 6A:
FIG. 6A is a timing chart of the parallel distributed processing system shown in FIG. 1 where complete synchronous message transmission is carried out.

For example, when a method of the computation object 402 provided in the network node 4 is called when processing is carried out in the computation object 302 of the network node 3 shown in FIG. 4 ("A1" shown in FIG. 6A), the dispatcher 311 of the computation object 302 converts the data structure of the arguments contained in the message to the data expression of the logical format ("B1" shown in FIG. 6A). In the conversion, it uses a conversion program to analyze the data structure of the internal expressed data in the computation object 302 and converting it to a data expression of the logical format. At this time, the data expression of the logical format adopts a description syntax enabling a complex data structure such as a list structure to be expressed by combining simple data. For this reason, a variety of data structures can be used as the arguments. For this reason, the range of the type of methods and functions which can be covered by the facility call can be expanded.

Next, in the dispatcher 311, the above-mentioned addresses identifying the method and the class of the computation object 402 are output to the remote method table 331 and the remote instance table 309, respectively. By this, the function identification code is referred to and the "method ID" and "class ID" corresponding to these addresses are searched for ("B2" shown in FIG. 6A). The retrieved "method ID" and "class ID" are registered in the transmission queue 313 in the dispatcher 311 ("B3" shown in FIG. 6A).

Next, the "method ID" and "class ID" registered in the transmission queue 313 are registered in the transmission queue 314 of the management process 30 ("C1" shown in FIG. 6A). In the management process 30, the message header of the message 320 is prepared by using the "method ID" and "class ID", and the message containing this message header is transmitted to the reception queue 414 of the management process 40 of the network node 4 shown in FIG. 5 via the network ("C2" shown in FIG. 6A). The network node 3 stops the processing of the program being executed until it receives as input the result of processing of the method from the network node 4.

In this way, by using the message queues 314 and 414, the messages are accumulated in the queues and then processed by the method (facility). For this reason, even if the facility call requests with respect to a certain specific computation object compete by these queues, they are processed in order or according to the priority order without a loss of the call request.

Figure 5:
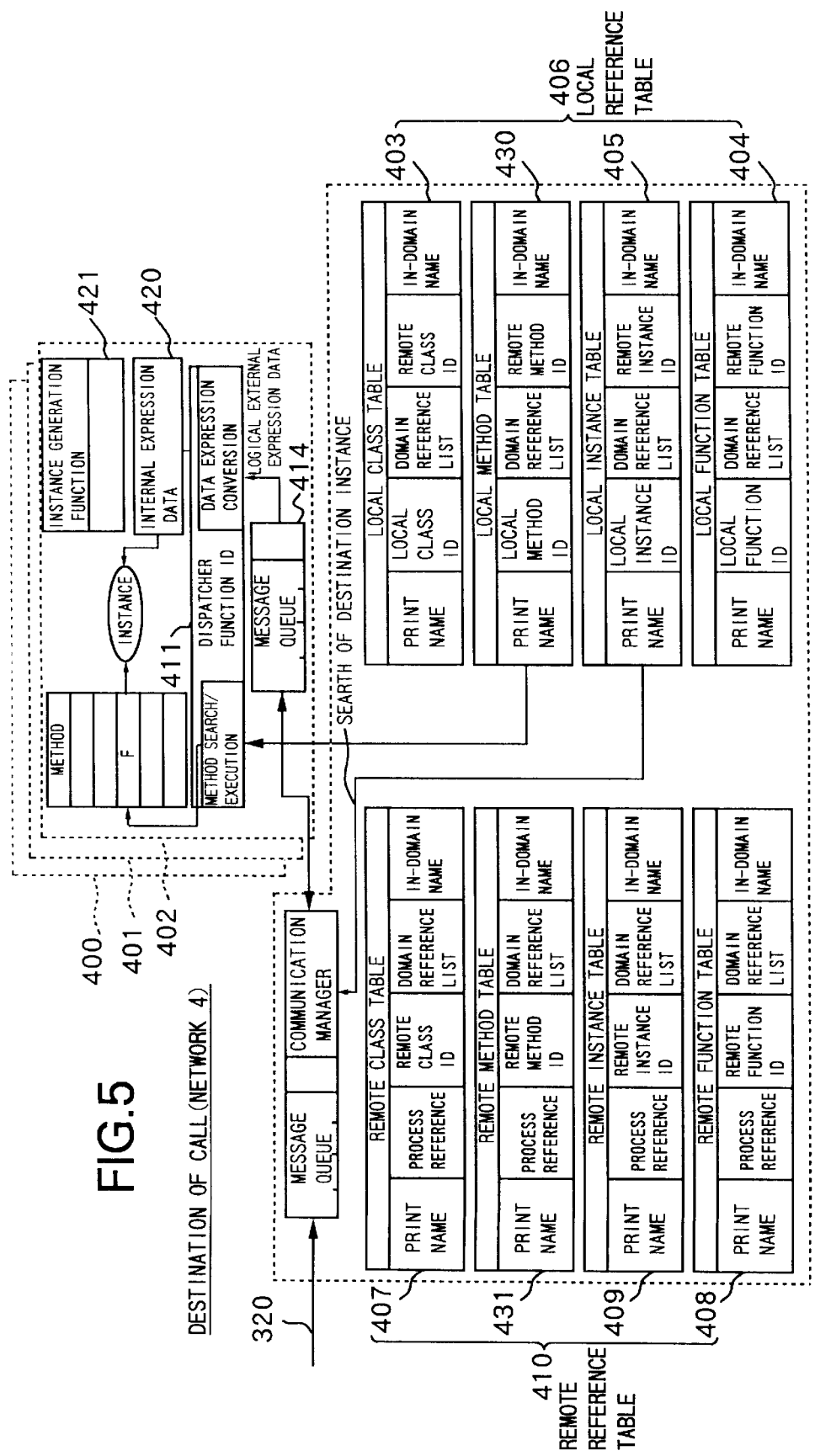
FIG. 5 is a view for explaining the processing in a network node receiving a call when calling a facility in the parallel distributed processing system shown in FIG. 1.
Figure 6B:
FIG. 6B is a timing chart of the parallel distributed processing system shown in FIG. 1 where complete synchronous message transmission is carried out.

When receiving the message from the network node 3 ("D1" shown in FIG. 6A), the management process 40 of the network node 4 registers that message in the reception queue 414 shown in FIG. 5 ("D2" shown in FIG. 6B). Next, the signal is output from the management process 40 to the dispatcher 411 ("D3" and "E1" shown in FIG. 6B).

Next, the dispatcher 411 refers to the local instance table 405 shown in FIG. 5 by using the "class ID" as the key and calls the predetermined instance ("E2" shown in FIG. 6B). The dispatcher 411 executes the next processing until a state where the predetermined instance can be called is exhibited ("E3" shown in FIG. 6B).

At this time, the communication manager provided in the message queue 414 uses the "class ID" contained in the message 320 as a key to refer to the local instance table 405 and obtain the address of the instance of the computation object 402. By this, the instance of the computation object 402 is determined. Here, "instance" means an facility showing a state where the processing of the class is actually carried out.

Note that the instance in the computation object 402 is generated, as shown in FIG. 5, by referring to the "address of the instance generation function" stored corresponding to the computation object 402 in the local class table 403, executing the instance generation function 421 existing at the "address of the instance generation function", and registering the instance generated by this in the local instance table 405.

Next, the dispatcher 411 converts the data structure of the message to the same data structure as that used in the original computation object 302 ("E4" shown in FIG. 6B).

Next, based on the "method ID" and the "class ID" contained in the received message 320, the "method address" of the function for the facility which is called is obtained by using the local method table 430. At this time, the "method ID" and "class ID" are indicated by numerals, therefore are collated at a high speed.

In the network node 4, the processing in the computation object 402 is carried out by using the "method address" of the method obtained in the dispatcher 411, the instance determined by the communication manager, and the local expression data 420 obtained by conversion in the dispatcher 411 ("F" shown in FIG. 6B).

The result of this processing is sent to the processing of the computation object 302 of the network node 3 originating the call shown in FIG. 3 by performing the processing of "E5", "D4", and "D5" shown in FIG. 6B and "C3", "C4", "C5", "B4", "B5", and "A2" shown in FIG. 6A as return values. By this, the facility call processing is completed.

Here, "E5" means the conversion of the data expression of the return value, "D4" means the registration of the return value in the transmission queue, "D5" means the transmission of the message, "C3" means the reception of the message, "C4" means the registration to the reception queue, "C5" means the signal transmission to the class 302, "B4" means the signal reception, "B5" means the conversion of the data expression of the return value, and "A2" means the continued execution of the next processing.

The network node 3 resumes the processing of the stopped program when the result of the processing of the method is input from the network node 4.

As explained above, according to the parallel distributed processing system 1, the callup of a facility such as a method is made by using the local reference table and remote reference table showing the relationship of the facility calls among the computation objects and the relationship of the facility identification codes etc. indicated by the numerals for the facility to be called, therefore the address of the execution unit of the facility which is called can be specified at a high speed.

Further, according to the parallel distributed processing system 1, the system automatically gives a unique facility identification code for the address of the computation object and method for which the facility call is made. For this reason, it is not necessary for the user (programmer) to expend much labor for avoiding the collision of the addresses of the computation objects and methods, so the load on the user is reduced.

Further, according to the parallel distributed processing system 1, the local reference table and the remote reference table are dynamically prepared in accordance with the addition of a computation object, therefore it becomes possible to dynamically download the necessary computation object at the designated network node.

Further, according to the parallel distributed processing system 1, it is not necessary to define the arguments of the facility call and the format of the result of the processing (return value) at the time of compilation, therefore the flexibility of the facility call can be enhanced.

In order to efficiently use the processors and other resources of the system, there is a programming system for automatically dividing a program into smaller parallel distributed execution units at a level that is not apparent to the user (programmer). As opposed to this, in the parallel distributed processing system 1, the user divides the computation object into parallel distributed modules in units of large facilities and can clearly designate the allocation of the parallel distributed modules, so can construct a large application system.

Next, an explanation will be made of another example of the case where a facility call is made from the network node 3 to the network node 4. Here, the explanation will be made of the case of so-called asynchronous message transmission where a computation object originating a call calls a facility, then does not receive as input the result of execution of the facility from the computation object receiving the call.

Figure 7A:
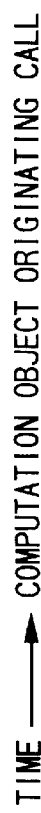
FIG. 7A is a timing chart of the parallel distributed processing system shown in FIG. 1 in the case of asynchronous message transmission.
Figure 7B:
FIG. 7B is a timing chart of the parallel distributed processing system shown in FIG. 1 in the case of asynchronous message transmission.

FIGS. 7A and 7B are timing charts of the case of the asynchronous message transmission.

Namely, if the method of the computation object 402 provided in the network node 4 is called by asynchronous message transmission when the processing is carried out in the computation object 302 of the network node 3 shown in FIG. 4 ("G1" shown in FIG. 7A), the processings of "H1", "H2", "H3", "I1", "I2", and "G2" shown in FIG. 7A are executed in the computation object 302, dispatcher 311, and management process 30 of the network node 3.

The processings of "H1", "H2", "H3", "I1", and "I2" shown in FIG. 7A correspond to the processings of "B1", "B2", "B3", "C1", and "C2" shown in FIG. 6A mentioned before.

However, in the example shown in FIGS. 7A and 7B, the computation object 302 does not wait for the result of processing of the facility by the computation object 402 of the network node 4 which was called, but executes the next processing "G2" after the processing "I2".

On the other hand, in the network node 4, the management process 40, the dispatcher 411, and the computation object 402 execute the processing of "J1", "J2", "J3", "K1", "K2", "K3", "K4", and "L" shown in FIG. 7B. Here, the processing of "J1", "J2", "J3", "K1", "K2", "K3", "K4", and "L" shown in FIG. 7B are basically the same as the processing of the "D1", "D2", "D3", "E1", "E2", "E3", "E4", and "F" shown in FIG. 6B, but the result of processing of "F" is not transmitted to the network node 3.

Next, the concept of the parallel distributed processing system according to the present embodiment explained above will be summarized.

As shown in FIG. 8, the network node 98 remote-calls (refers) a method 105*a* of the object of the destination the call of the network node 99 in the object originating the call. At this time, the remote instance reference and remote method reference are performed. Namely the entity of the object for calling is specified by specifying both the instance and method.

Note that, in FIG. 8 the specification of the instance is illustrated.

That is, the remote instance reference table 102 is refereed by using a key described in the instance 101*b* of the object originating the call 101*a*, and then the remote instance ID [#0123] is obtained. Further the process reference table 107 is refereed by the pointer described in the process reference of the remote instance reference table 102, and then the process ID [#0055] to which the method receiving the call belongs and the network address [192.168.1.1] of the network node 99 on which the process operates are obtained. Further the argument 101*c*1 is indicated by the pointer described in the argument 101*d*, and then the argument 101*c*2 which is the logical conversion of the data structure of the argument 101*c*1 is obtained.

And then, the message including the remote instance ID [#0123], process ID [#0055] and the argument 101*c*2 are transmitted to the network node 99 via network based on the network address [192.168.1.1].

When receiving the message, the network node 99 specifies the local instance reference table 103 by the process ID [#0055], and obtains the local instance ID of the object receiving the call 108 by using the remote instance ID [#0123] as a key. The object receiving the call is specified by the local instance ID.

The remote method reference table and local method reference table are referred by using a key described in the method 101*c* of the object originating the call 101*a* in the same way described above, the local method ID is obtained. The method 105A of the object receiving the call 105A is specified by the local method ID. The entity of the method 106 is indicated by the pointer described in the method 105*a*.

On the other hand, the argument 101*c* which is inputted by the network node 99 via network is converted reversely from the logical-format of the data structure, and then becomes to be argument 101*c*1. The argument 101*c*1 is indicated by the pointer by the argument 105*b* corresponding to the method 105*a*.

And then, the entity of the method 106 is provided with the method 105*a*, and then the entity of the method 106 operates.

The present invention is not limited to the above embodiments. For example, in the above embodiments, a case where the present invention was applied to a callup of a method in object directed programming was exemplified, but the present invention can be applied to for example a remote function call too. A remote function call calls a function (facility) existing in a module such as a remote application.

Further, the present invention can also be applied to a case where an internal variable of a certain computation object is used as the shared variable (global variable) among groups of distributed modules (computation objects). In this case, as the facilities of the computation objects containing the variable which becomes the common variable, the facilities of reading, change, etc. of the common variable are programmed. At this time, the access to the common variable is all made by a facility call to the computation object containing the variable thereof, therefore exclusive control of the access to the common variable thereof is naturally realized. Namely, the common variable is held in the instance. For reading and rewriting the common variable, it is necessary to call the facility of the instance. By doing this, the instance acts as the common variable itself.

At this time, the common variable is defined as a class of the computation object, and the processing for the common variable is defined as the method (function).

Further, in the above embodiment, in the network node 3 acting as the module originating the call, the address at which the facility identification code was stored as a facility identifier was exemplified, but if the facility name indicated by characters or a number which is valid only in the module originating the call is used as the facility identifier, further higher speed facility call processing can be carried out.

Further, it is also possible to determine the order of output of messages based on a predetermined priority order in addition to output of a queue accumulating messages input or output between the network nodes 3 and 4 in the order of the input. Namely, it is also possible to give a priority order to a facility call. This priority order can be determined as a system in advance or can be contained in the message as attribute information.

Further, at the message transmission side, it is also possible to include the transmission time in the message and determine the time of execution of the facility specified by the message based on the time at the reception side. Further, the queue receiving the message can be provided for every instance (class) or can be shared by a plurality of instances (classes).

Further, in the present invention, it is also possible for the network node 3 to continue its processing until the result of processing from the network node 4 becomes necessary after outputting the message to the network node 4 and to stop the processing of the program being executed only in a case where the result of processing has not yet been received at the point of time when it becomes necessary.

At this time, it is also possible for the network node 3 to automatically activate an error processing program when the result of processing for the message which has been already sent cannot be obtained from the network node 4 even if a set time elapses.

Further, in the present invention, it is also possible for the network node 3 not to request the result of processing from the network node 4 after outputting the message to the network node 4.

Second Embodiment

Figure 9:
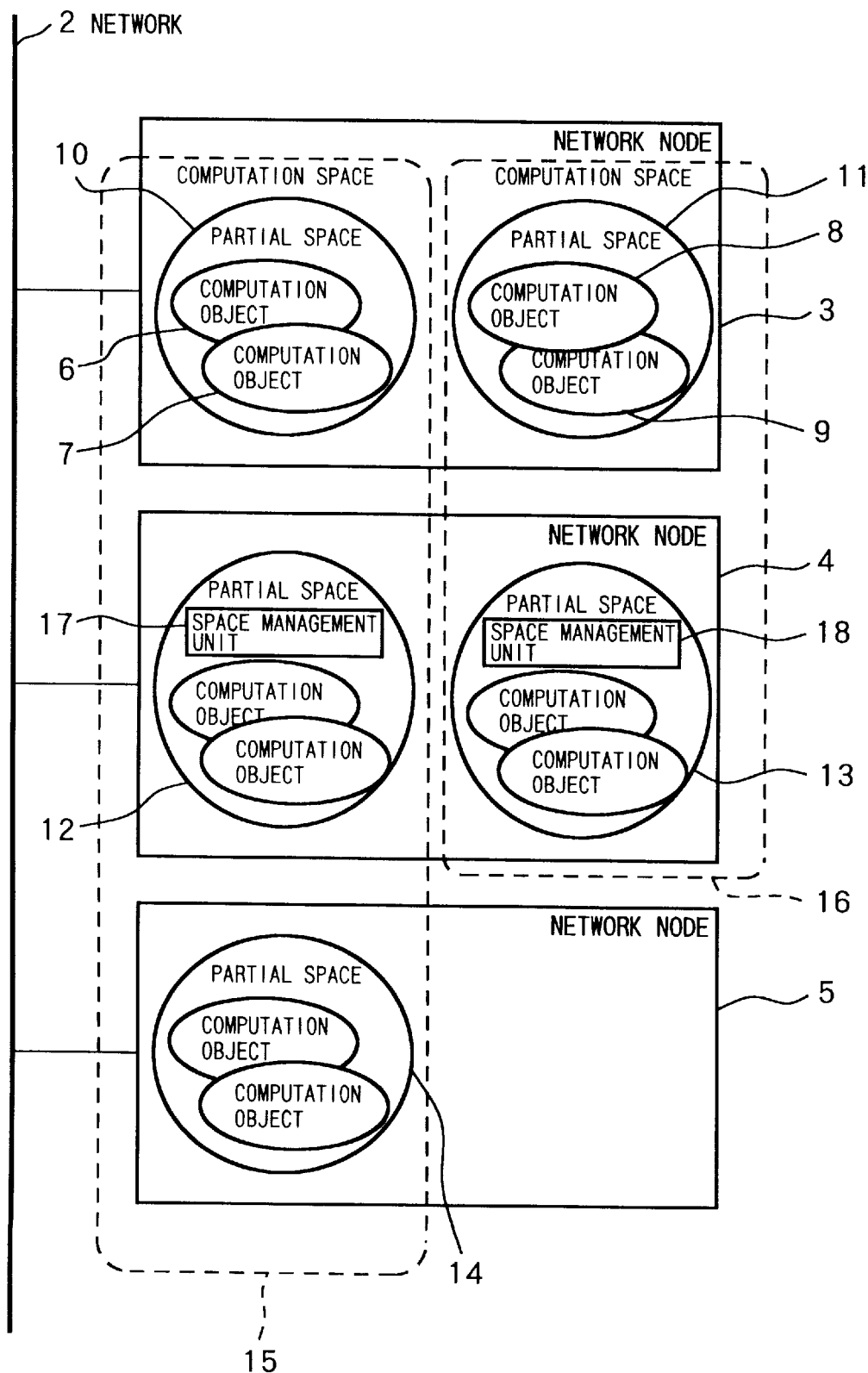
FIG. 9 is a conceptual view of a parallel distributed processing system according to a second embodiment of the present embodiment.

FIG. 9 is a conceptual view of a parallel distributed processing system 1 according to the present embodiment.

As shown in FIG. 9, in the parallel distributed processing system 1, the network nodes 3, 4, and 5 communicate with each other via a network 2 and perform predetermined processing. As the network nodes 3, 4, and 5, for example, personal computers and work stations are used. Further, as the network 2, for example an Ethernet or CATV is used.

In the network nodes 3, 4, and 5, computation objects, for executing a program, for example, functions, instances, classes, methods, global variables, and files exist. Here, a global variable is realized with an instance of a class of global variable.

For example, the computation objects 6 to 9 exist in the network node 3.

[Space Management System]

In the network nodes 3, 4, and 5, partial spaces comprised by a plurality of computation objects in the same network node exist. For example, in the network node 3, a partial space 10 is comprised by the computation objects 6 and 7, and a partial space 11 is comprised by the computation objects 8 and 9. Here, a "partial space" is a process generated by a management process, that is, a computation module, provided at the network node.

Further, a computation space may be comprised by partial spaces and/or computation objects existing in different network nodes. In the present embodiment, a computation space 15 is comprised by the partial spaces 10, 12, and 14, and a computation space 16 is composed by the partial spaces 11 and 13. Note that, it is also possible to comprise a computation space so as to contain partial spaces and/or computation objects existing in the same network node. Here, a "computation space" is a region in which information concerning the allocation of computation objects and partial spaces existing in the space is clarified.

Further, in the parallel distributed processing system 1, the allocation of the computation objects and the partial spaces is determined according to information given in advance, inquiries between the partial spaces, etc. The allocation of the computation objects and the partial spaces is managed by space management units 17 and 18.

In the parallel distributed processing system 1, as shown in FIG. 9, a space management unit 17 is provided in the network node 4 corresponding to the computation space 15, and a space management unit 18 is provided in the network node 4 corresponding to the computation space 16.

Note that, it is also possible to provide a space management unit for every partial space or provide the same for every computation object.

Further, in the parallel distributed processing system 1, there is a management process for every partial space. The reference information is managed by this management process. Here, a space expressed by the reference information will be referred to as a "reference space". In an API (application programming interface), the processes and computation objects are identified and managed on this reference space. An actually existing space which is referred to will be referred to as a "real space" with respect to this reference space.

Here, "reference" means that these processes and computation objects are logically indicated.

In the present embodiment, the concept of a domain for forming any reference set in this reference space is further introduced. This domain is used when dividing a computation space into a plurality of parts for management. The domain is not shown in FIG. 9 and will be explained in detail later by referring to FIG. 19.

A process (partial space) and computation object may belong to a plurality of domains. It is also allowed that the domains take a hierarchical structure. In this case, a contained domain will be referred to as a sub-domain, and a containing domain will be referred to as a super-domain. By the introduction of domains, space (service space, application space, personal space, community, etc.) can be flexibly formed network-wide.

In the present embodiment, a name is further given to each reference, and an identification space of the processes, computation objects, and domains by names is provided.

This identification space will be referred to as a "name space". From the API, it is possible to identify and manage the processes, computation objects, and domains even on this name space. Further, the uniqueness of names is guaranteed in only each name space.

Accordingly, the collision of names is allowed between computation objects belonging to different domains and thus the degree of freedom of the names useable in each domain is raised.

Below, an explanation will be made of the reference information used in the parallel distributed processing system according to the present embodiment.

Figure 10:
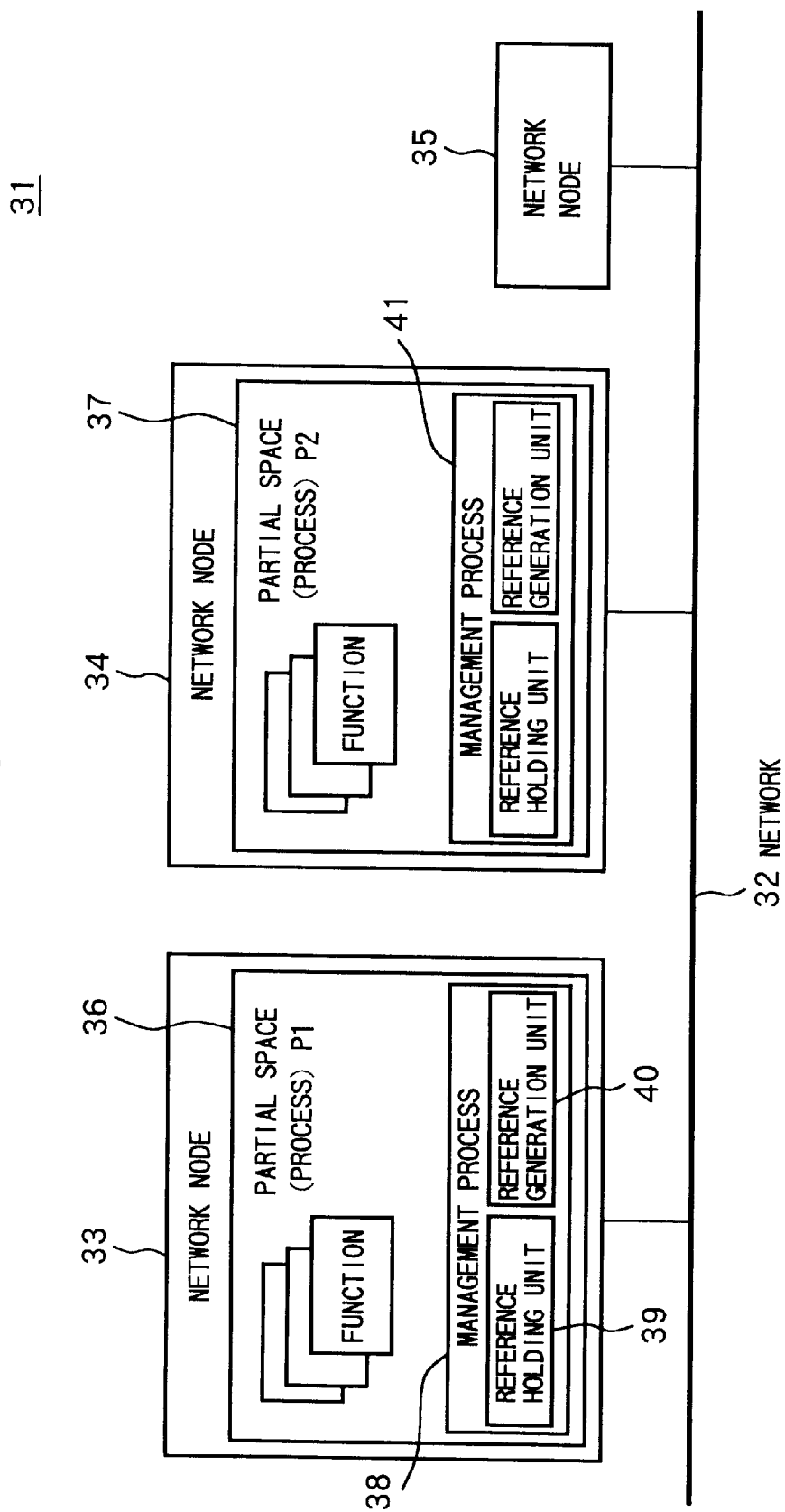
FIG. 10 is a view of the configuration of the parallel distributed processing system according to the second embodiment of the present invention.

FIG. 10 is a view of the configuration of a parallel distributed processing system 31 according to the present embodiment.

As shown in FIG. 10, in the parallel distributed processing system 31, network nodes 33 to 35 are connected via a network 32.

In the network node 33, a process (partial space) 36 generated by the management process 38 exists.

The management process 38 has a reference holding unit 39 and a reference generation unit 40. Here, the reference holding unit 39 stores reference information identifying the processes, computation objects, and domains for specifying their locations and controlling and managing the same.

Figure 11:
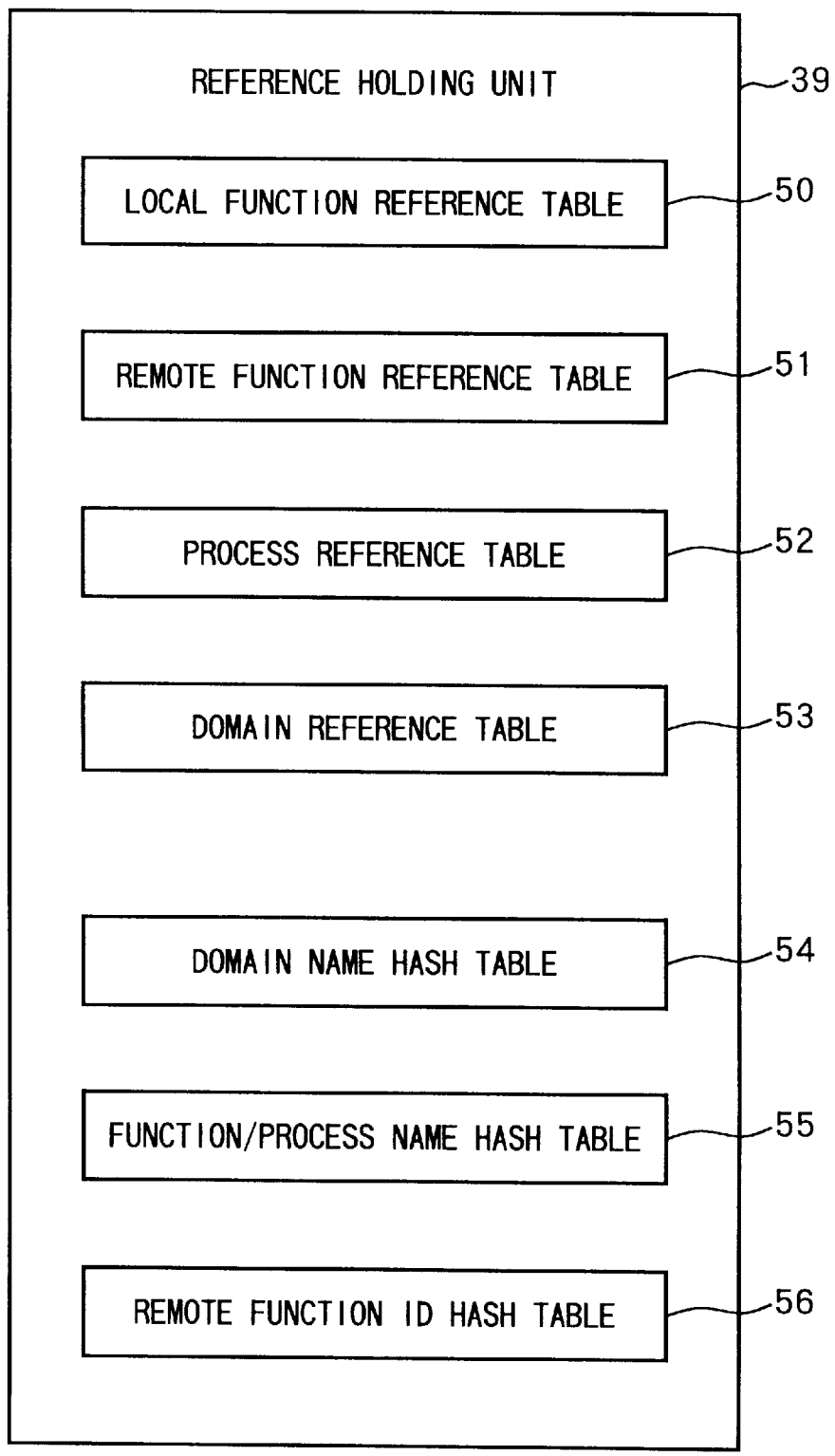
FIG. 11 is a view for explaining a reference information of the parallel distributed processing system shown in FIG. 10.

In the following example, a case is shown where functions allocated distributedly throughout a network are referred to. The reference information is comprised of four reference tables and three search use hash tables as shown in FIG. 11. As the reference tables, there are a local function reference table 50 shown in FIG. 12, a remote function reference table 51 shown in FIG. 13, a process reference table 52 shown in FIG. 14, and a domain reference table 53 shown in FIG. 15. Note that FIG. 12 and FIG. 13 also describe reference tables for the classes, instances, and methods in addition to functions.

Figure 16:
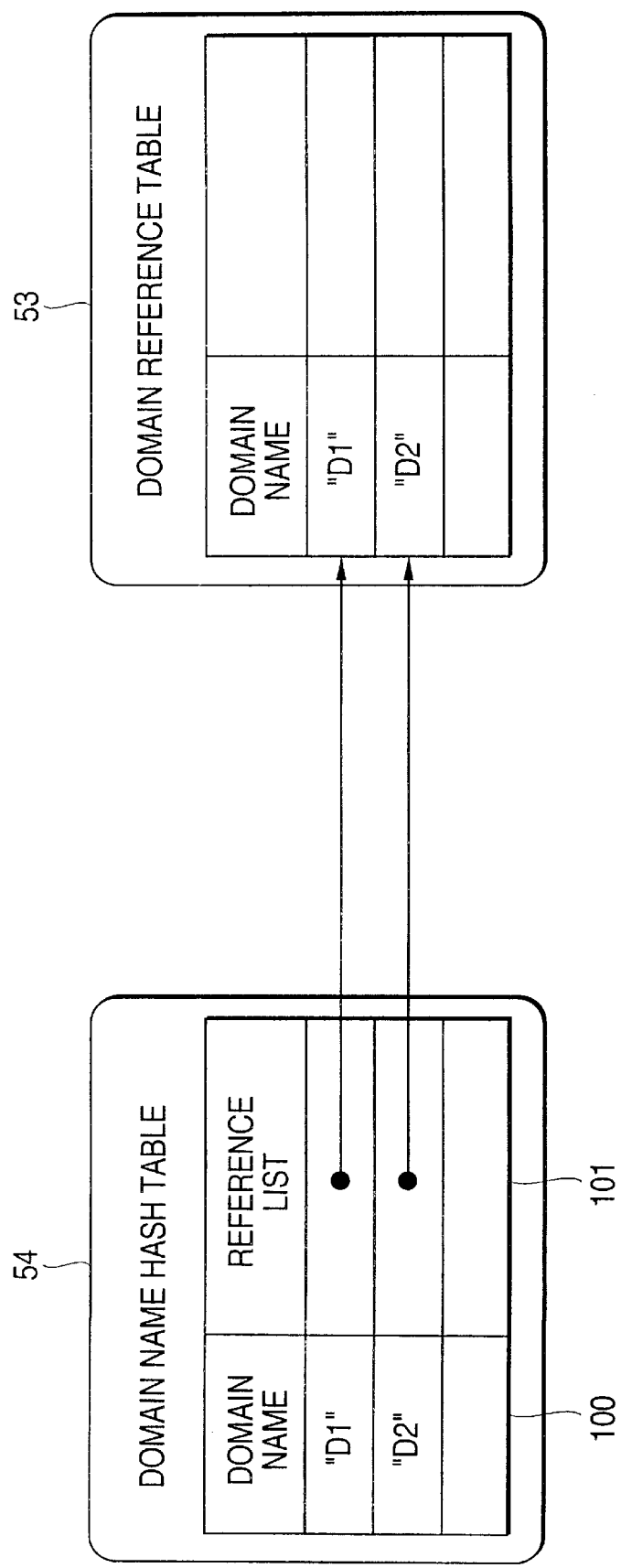
FIG. 16 is a view for explaining a domain name hash table.
Figure 17:
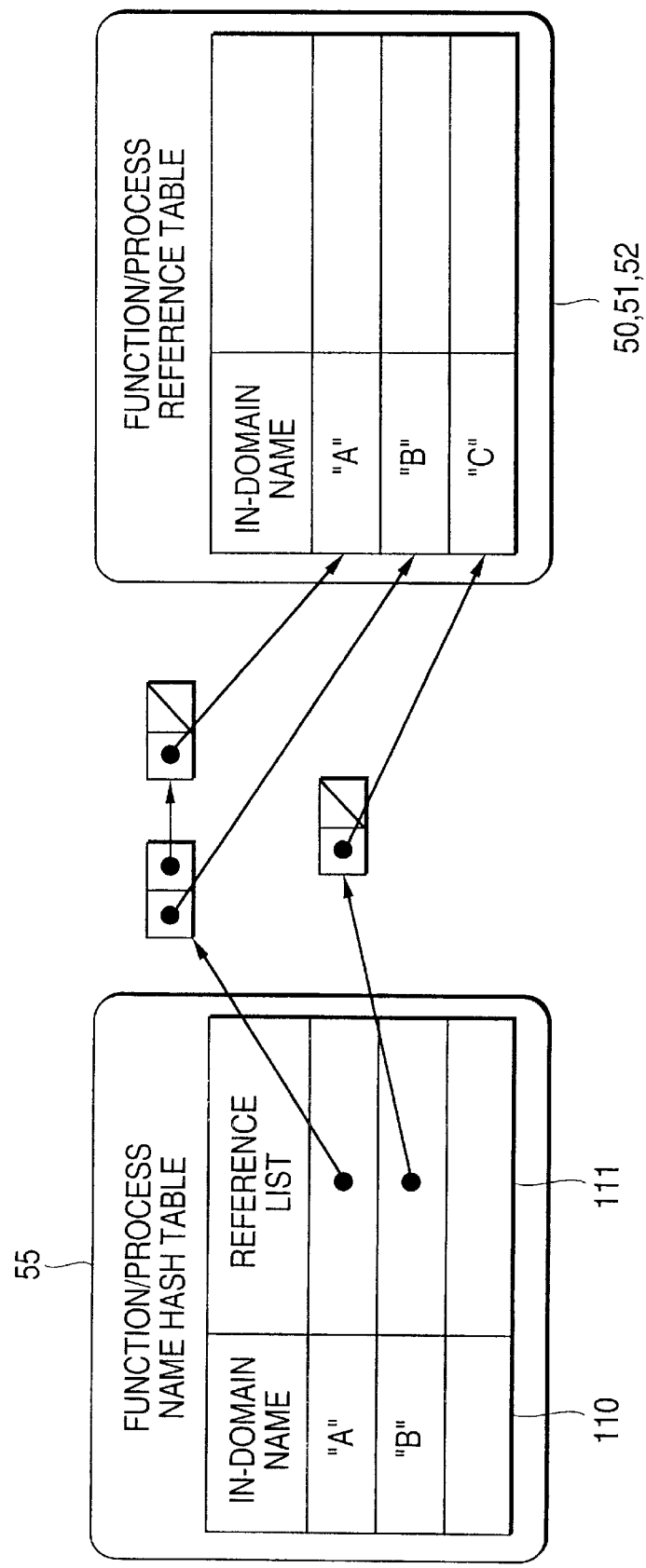
FIG. 17 is a view for explaining a function/process name hash table.
Figure 18:
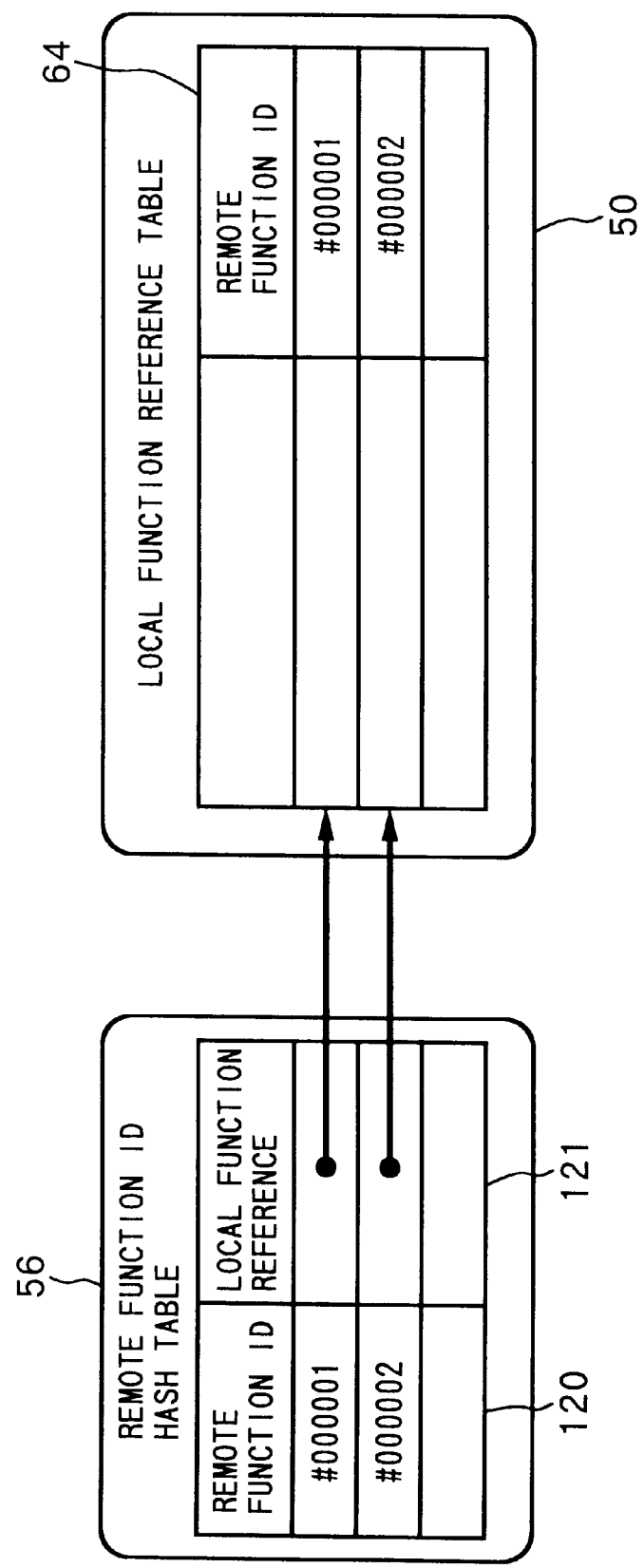
FIG. 18 is a view for explaining a remote function ID hash table.

Further, the search-use hash tables are hash tables between the names and identifiers, include a domain name hash table 54 shown in FIG. 16, a function/process name hash table 55 shown in FIG. 17, and a remote function ID hash table 56 shown in FIG. 18.

Note that, as the network node 34, there is a process (partial space) 37 generated by the management process 41. This is conceptually the same as the network node 33.

[Local Function Reference Table]

Figure 12:
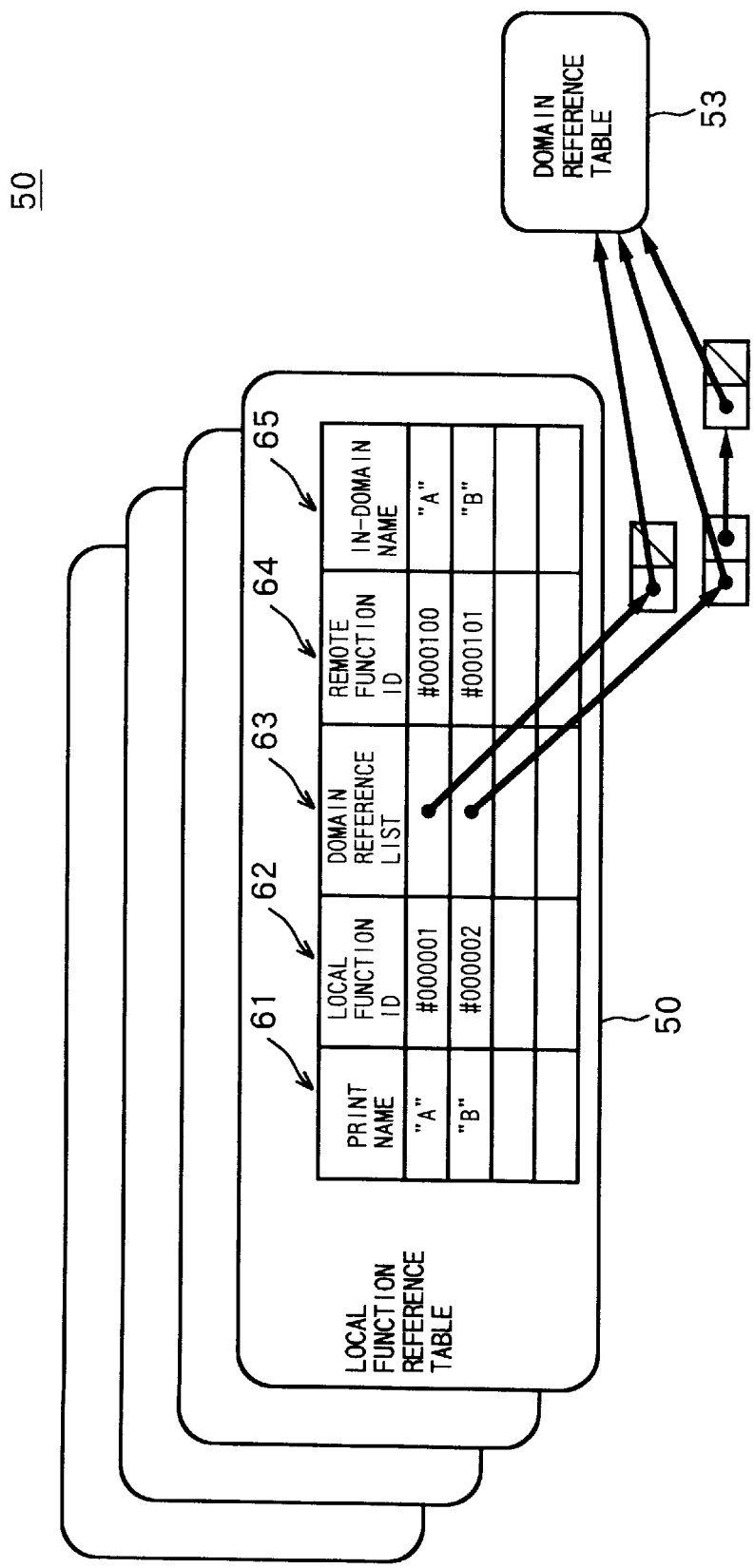
FIG. 12 is a view for explaining a local reference tables.

FIG. 12 is a view for explaining the local function reference table 50.

The local function reference table 50 is a local reference table of the functions existing in a partial space (process).

As shown in FIG. 12, the local function reference table 50 has five fields of a print name 61, a local function ID 62, a domain reference list 63, a remote function ID 64, and an in-domain name 65.

The print name 61 is the function name on the program source code. If it is a class provided for example by C++, the class name thereof is inserted.

The local function ID 62 is a function identifier in the network node used on the system. Access is actually carried out by using this function identifier.

The domain reference list 63 is a pointer list to the domain reference tables to which the function thereof belongs. The domain reference list 63 is indicated by data having a list structure as shown in FIG. 12. This is for enabling expression when a function belongs to a plurality of domains.

The remote function ID 64 is an external identifier of the function. A function is designated and called from outside of the network node by using this external identifier.

The in-domain name 65 is a name inside the domain on the name space. This name is used for designating and calling a function.

[Remote Function Reference Table]

Figure 13:
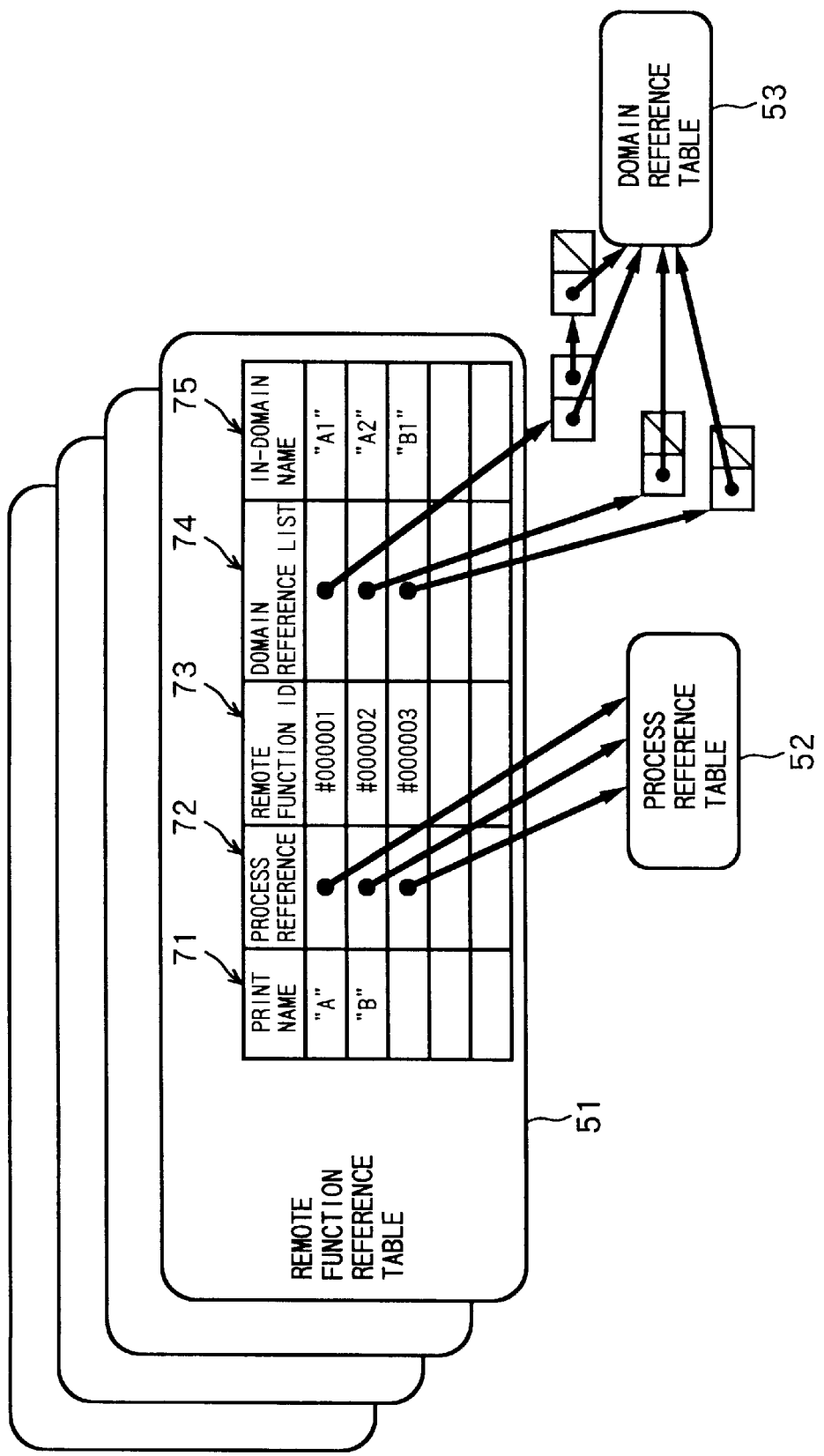
FIG. 13 is a view for explaining a remote reference tables.

FIG. 13 is a view for explaining a remote function reference table 51.

The remote function reference table 51 is a remote reference table of functions existing in partial space (process).

As shown in FIG. 13, the remote function reference table 51 has five fields of a print name 71, a process reference 72, a remote function ID 73, a domain reference list 74, and an in-domain name 75.

The meanings of the print name 71, the remote function ID 73, the domain reference list 74, and the in-domain name 75 are the same as those of the case of the local function reference table 50 mentioned before.

The process reference 72 is information concerning the location of the process in which the remote function thereof exists and for example indicates a pointer to the process reference table 52.

[Process Reference Table]

Figure 14:
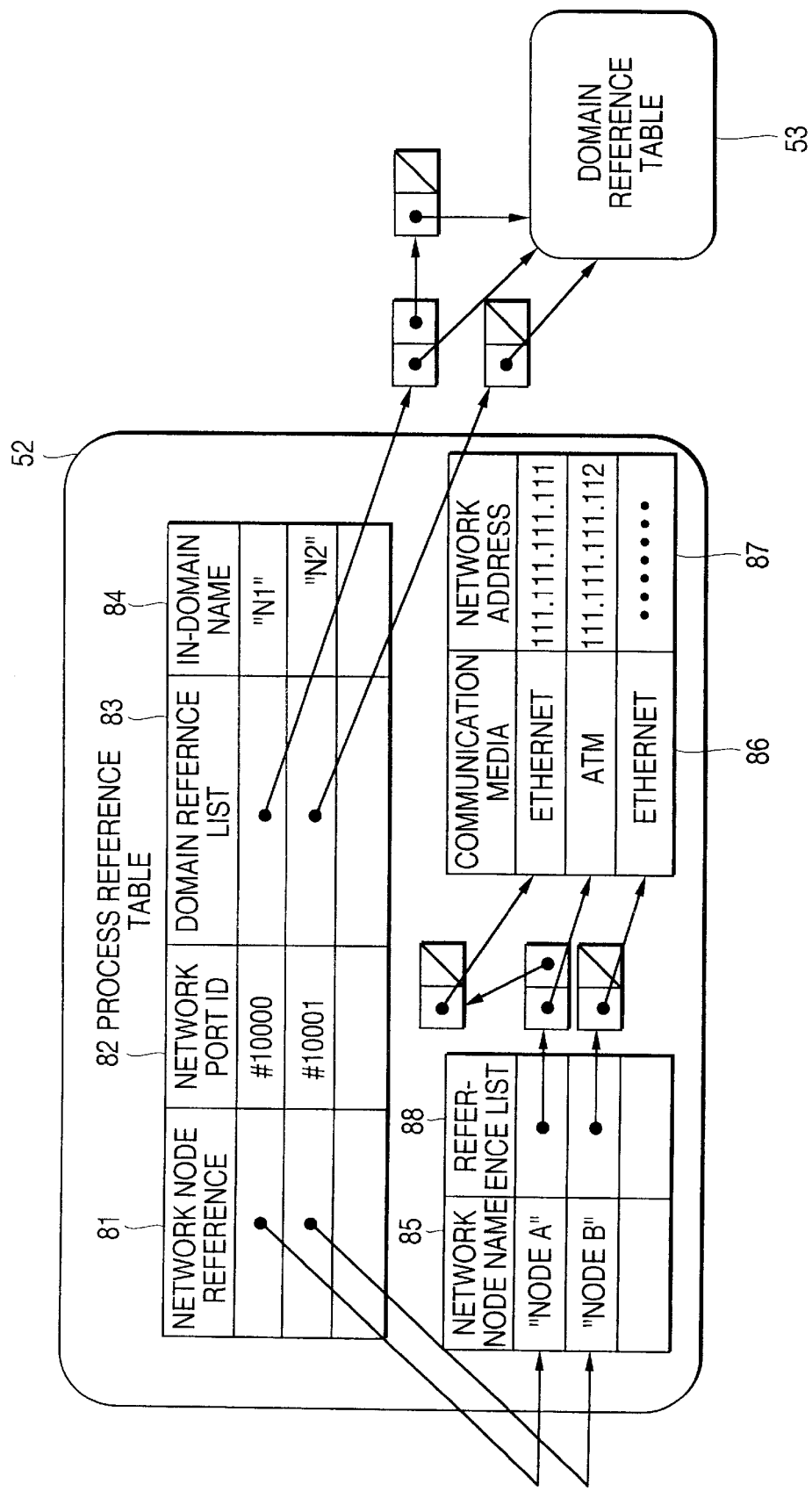
FIG. 14 is a view for explaining a process reference table.

FIG. 14 is a view for explaining a process reference table 52.

The process reference table 52 is a table for storing information indicating the locations of partial spaces (processes).

As shown in FIG. 14, the process reference table 52 has four fields of a network node reference 81, a network port ID 82, a domain reference list 83, and an in-domain name 84.

Here, the meanings of the domain reference list 83 and the in-domain name 84 are the same as those mentioned before.

The network node reference 81 indicates reference information concerning the network node in which a process exists and has four of a network node name 85, a reference list 88, a communication media 86, and a network address 87.

The network node name 85 indicates the name of the network node on the name space.

The communication media 86 indicates the communication means and indicates for example Ethernet or ATM.

The network address 87 indicates the network address of the node in accordance with the communication means and indicates for example an IP address and DNS (domain name system) name.

The network port ID 82 indicates the management process port number in each network node used on the parallel distributed processing system 31. Access is carried out by specifying a process by the network address and this management process port number.

There are network nodes provided with a plurality of communication media (access facilities). For example, among the network nodes, there is one to which access by both of the Ethernet and ATM is possible. Usually, in such a case, network addresses are individually assigned to the access facilities.

Accordingly, in the process reference table 52, by expressing the correspondence between the network names and the network addresses by using the reference list 88 of the list structure as shown in FIG. 14, the correspondence between one network node name 85 and a plurality of network addresses 87 is expressed in accordance with the types of the communication media 86.

In the example shown in FIG. 14, a process with an in-domain name "N1" has the network port ID 82 "#10000" and the network node name 85 "node A". Further, "node A" is provided with the Ethernet and ATM as the communication media 86. The network addresses 87 are "111.111.111.111" and "111.111.111.112".

[Domain Reference Table]

Figure 15:
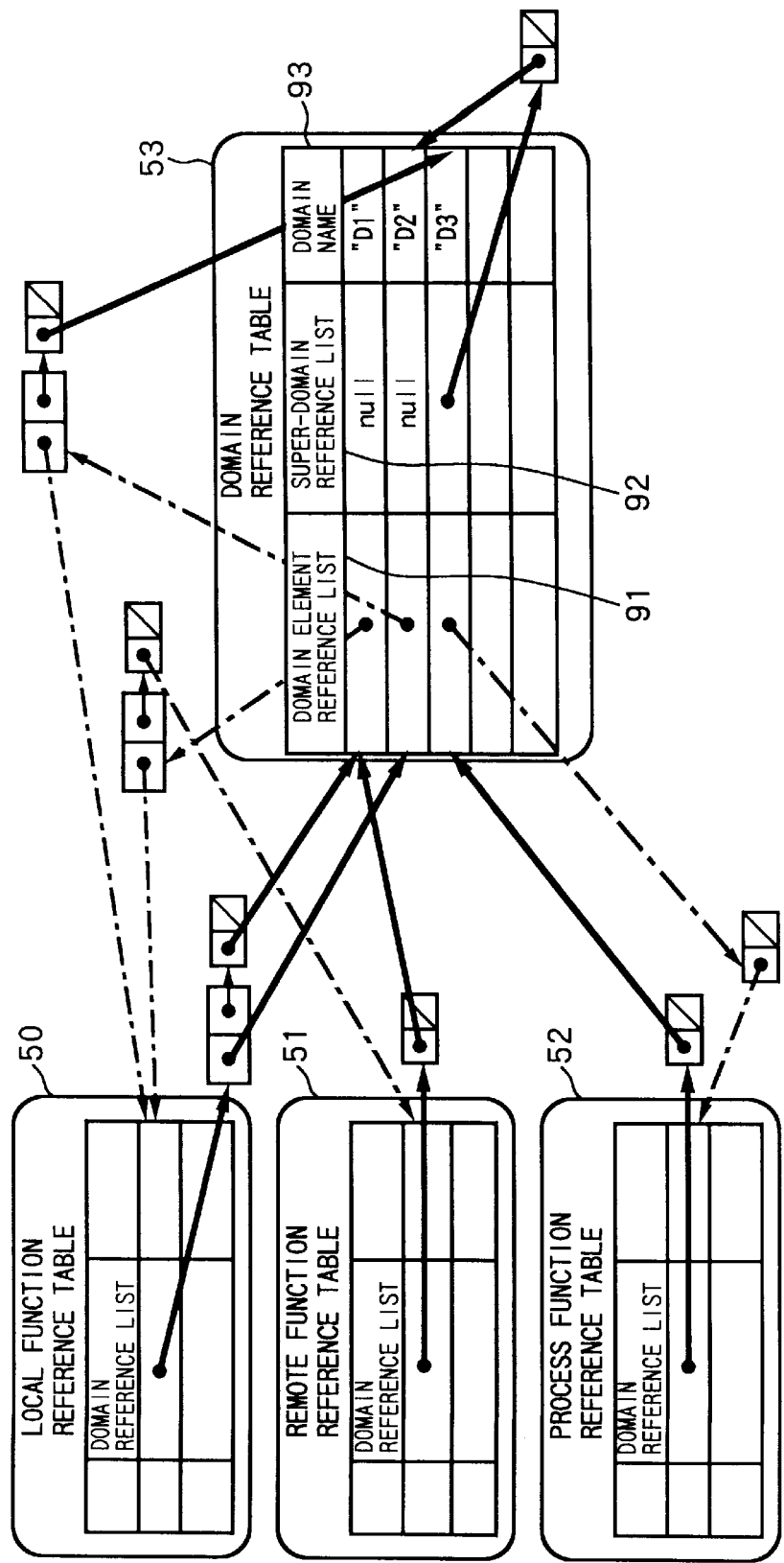
FIG. 15 is a view for explaining a domain reference table.

FIG. 15 is a view for explaining a domain reference table 53.

The domain reference table 53 is a table for managing the reference information of the domains. As mentioned before, the domains can adopt a hierarchical structure and so one domain can contain another domain.

As shown in FIG. 15, the domain reference table 53 has a domain element reference list 91, a super-domain reference list 92, and a domain name 93.

The domain element reference list 91 indicates the pointer to the function reference and sub-domain reference which are constituent elements of a domain.

The super-domain reference list 92 indicates a pointer list to the super-domain (higher domain) of the domain. Here, the reason for the use of the list structure for the super-domain reference is that one domain sometimes has a plurality of super-domains.

The domain name 93 indicates the domain name on the name space.

[Domain Name Hash Table]

FIG. 16 is a view for explaining a domain name hash table 54.

The domain name hash table 54 is constructed based on the domain names given by individual name spaces and enables a search of the domain reference table by name.

As shown in FIG. 16, the domain name hash table 54 has two fields of a domain name 100 and a reference list 101.

The domain name 100 indicates the domain name on the name space. The reference list 101 indicates the pointer list to the domain reference table.

In the example shown in FIG. 16, when the domain name hash table 54 is used using the domain name "D1" as a key, the address of the domain name "D1" of the domain reference table 53 is obtained.

[Function/Process Name Hash Table]

FIG. 17 is a view for explaining a function/process name hash table 55.

The function/process name hash table 55 is constructed based on the in-domain names given by individual name spaces and enables a search of the function reference table and the process reference table by name.

As shown in FIG. 17, the function/process name hash table 55 has two fields of an in-domain name 110 and a reference list 111.

As the in-domain name 110, either of the local function name in the domain on the name space, the remote function name, and the process name is indicated.

The reference list 111 is a pointer list with respect to either of the local function reference table 50, the remote function reference table 51, and the process reference table 52.

For example, in FIG. 17, when the local function name hash table of the function/process name hash table 55 is used using the function name "A" of the in-domain name 110 as a key, the reference list 111 gives the address of the in-domain name "A" in the local function reference table 50. As the function/process name hash table 55, other than the local function name hash table, there are a remote function name hash table and a process name hash table.

[Remote Function ID Hash Table]

FIG. 18 is a view for explaining a remote function ID hash table 56.

The remote function ID hash table 56 is constructed based on the remote function IDs and enables a search of the local function reference table by the remote function IDs.

As shown in FIG. 18, the remote function ID hash table 56 has two fields of a remote function ID 120 and a local function reference 121.

The local function reference 121 indicates the pointer to the local function reference in the local function reference table corresponding to a remote function ID.

For example, in FIG. 18, when the remote function ID hash table 56 is used using "#000001" of the remote function ID 120 as a key, the address of the position where the remote function ID 64a in the local function reference table 50a is "#000001" is obtained.

Below, a method of generating the above reference information in the reference generating unit 40 shown in FIG. 10 will be concretely explained.

First, the space configuration generating the reference information will be mentioned.

Figure 19:
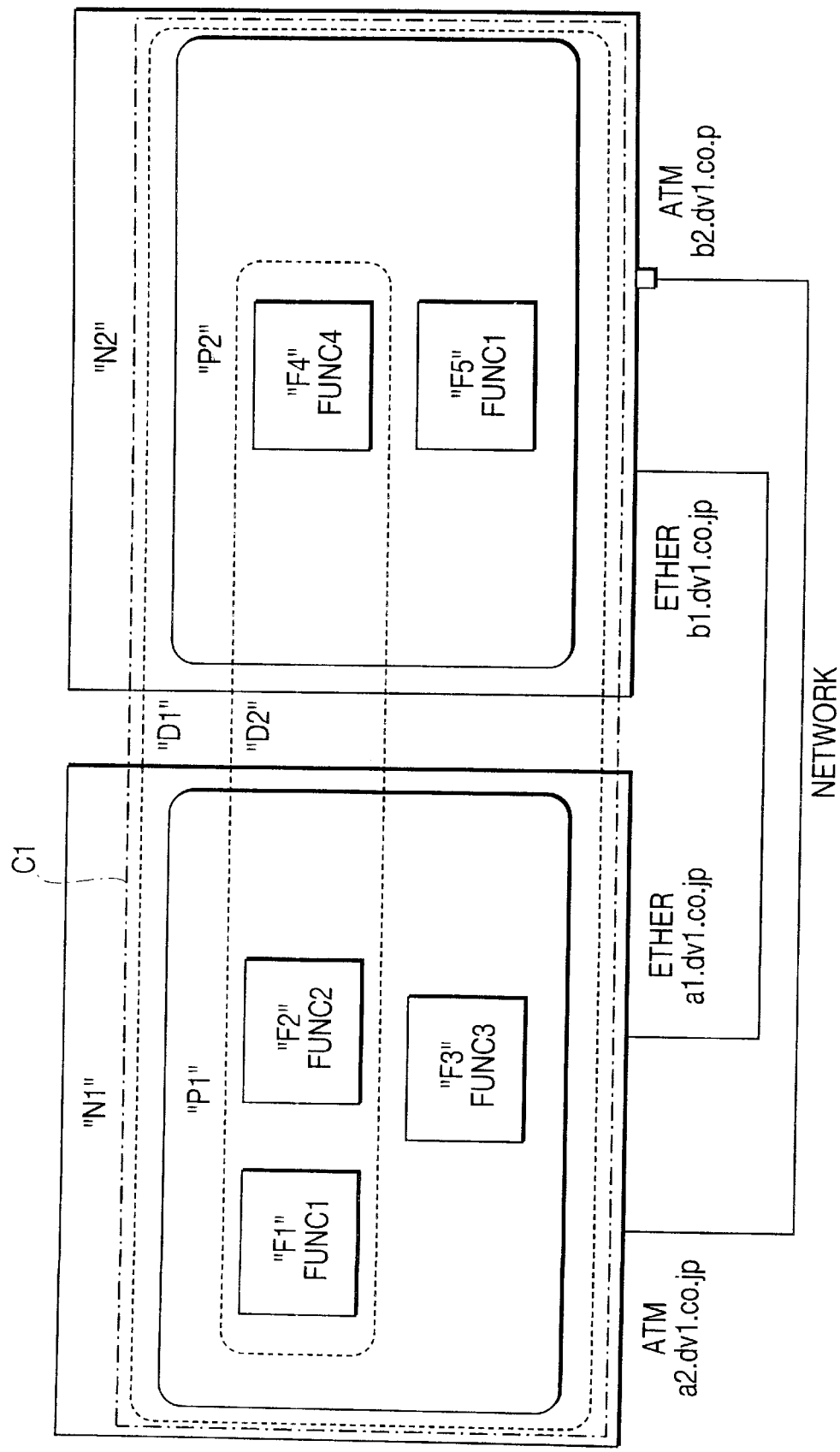
FIG. 19 is a view for explaining a space configuration for generating the reference information.

FIG. 19 is a view for explaining the space configuration generating the reference information.

As shown in FIG. 19, names such as "N1" and "N2" are given to the network nodes on their individual name spaces. Further, each network node is provided with interfaces of the Ethernet and ATM and each has a unique DNS name.

Further, the in-domain names such as "P1" and "P2" are given to the processes.

Further, the in-domain names such as "F1", "F2", and "F3" are given to functions having the print names on the process "P1" of "func1", "func2", and "func3", and the in-domain names such as "F4" and "F5" are given to the functions having the print names on the process "P2" of "func4" and "func5".

Further, the processes "P1" and "P2" and the functions "F1", "F2", "F3", "F4", and "F5" belong to the domain "D1". Further, the functions "F1", "F2", and "F4" also belong to the domain "D2".

Here, the domains "D1" and "D2" belong to the computation space "C1".

In the example shown in FIG. 19, there are a management process for executing the process "P1" and a management process for generating the process "P2".

The information concerning the space configuration is given to the reference generation units of these management processes by the method of designating the information by arguments at the activation of the program of these management processes, implanting the information in the program codes of these management processes, preparing a file in which the information is described and reading out from this file, etc.

Figure 20:
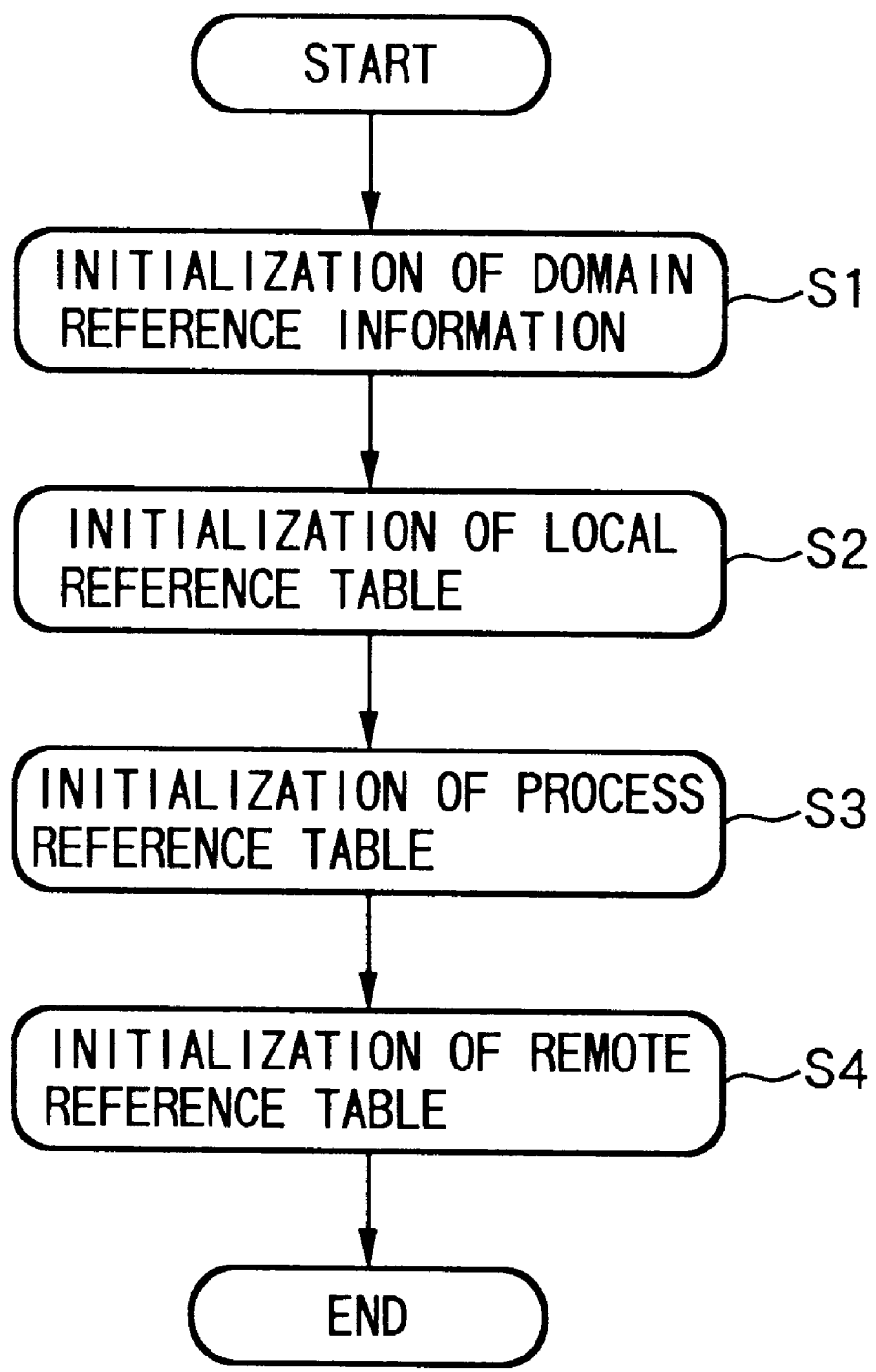
FIG. 20 is a view for explaining a process in a reference generation unit of a management process.

The reference generation unit of each management process initializes the domain reference table 53 (S1), initializes the local function reference table 50 (S2), initializes the process reference table 52 (S3), and initializes the remote function reference table 51 (S4) as shown in FIG. 20 based on this space configuration information so as to generate the reference information. Below, a detailed explanation will be made of the steps shown in FIG. 20.

[Initialization of Domain Reference Table (S1)]

The reference generation unit of the management process of the process "P1" generates the domain reference table 53 based on information concerning the space configuration given in advance.

Here, the reference generation unit generates the domain reference table 53 based on the following space configuration information of (1) and (2).

(1) There is a domain "D1", but there is no super-domain of the same.

(2) There is a domain "D2", and the super-domain thereof is "D1".

First, the reference generation unit of the process "P1" generates the domain reference table 53 in which information concerning the domain "D1" is described as shown in FIG. 13 and, at the same time, generates the domain name hash table 54 in which the information concerning the domain "D1" is described.

Next, the reference generation unit of the process "P1" adds the reference information concerning the domain "D2" to the domain reference table 53. At this time, the reference generation unit 40 obtains the reference information of the domain "D1", which is the higher domain of the domain "D2", from the domain name hash table 54 shown in FIG. 13 and adds the pointer to the domain "D2" to the domain element reference list 91 of the domain "D1" in the domain reference table 53 as shown in FIG. 14 based on the reference information of this domain "D1".

[Initialization of Local Function Reference Table (S2)]

The reference generation unit of the management process of the process "P1" prepares the local function reference table 50 shown in FIG. 15 for the process "P1" based on the space configuration information of (3) to (5) shown below.

(3) A function of a print name of "func1", a local function ID of "#000001", an in-domain name of "F1", and affiliated domain names of "D1" and "D2".

(4) A function of a print name of "func2", a local function ID of "#000002", an in-domain name of "F2", and affiliated domain names of "D1" and "D2".

(5) A function of a print name of "func3", a local function ID of "#000003", an in-domain name of "F3", and an affiliated domain name of "D1".

Here, the local facility ID 62 in the local function reference table 50 shown in FIG. 23 is uniquely given in each process.

Figure 21:
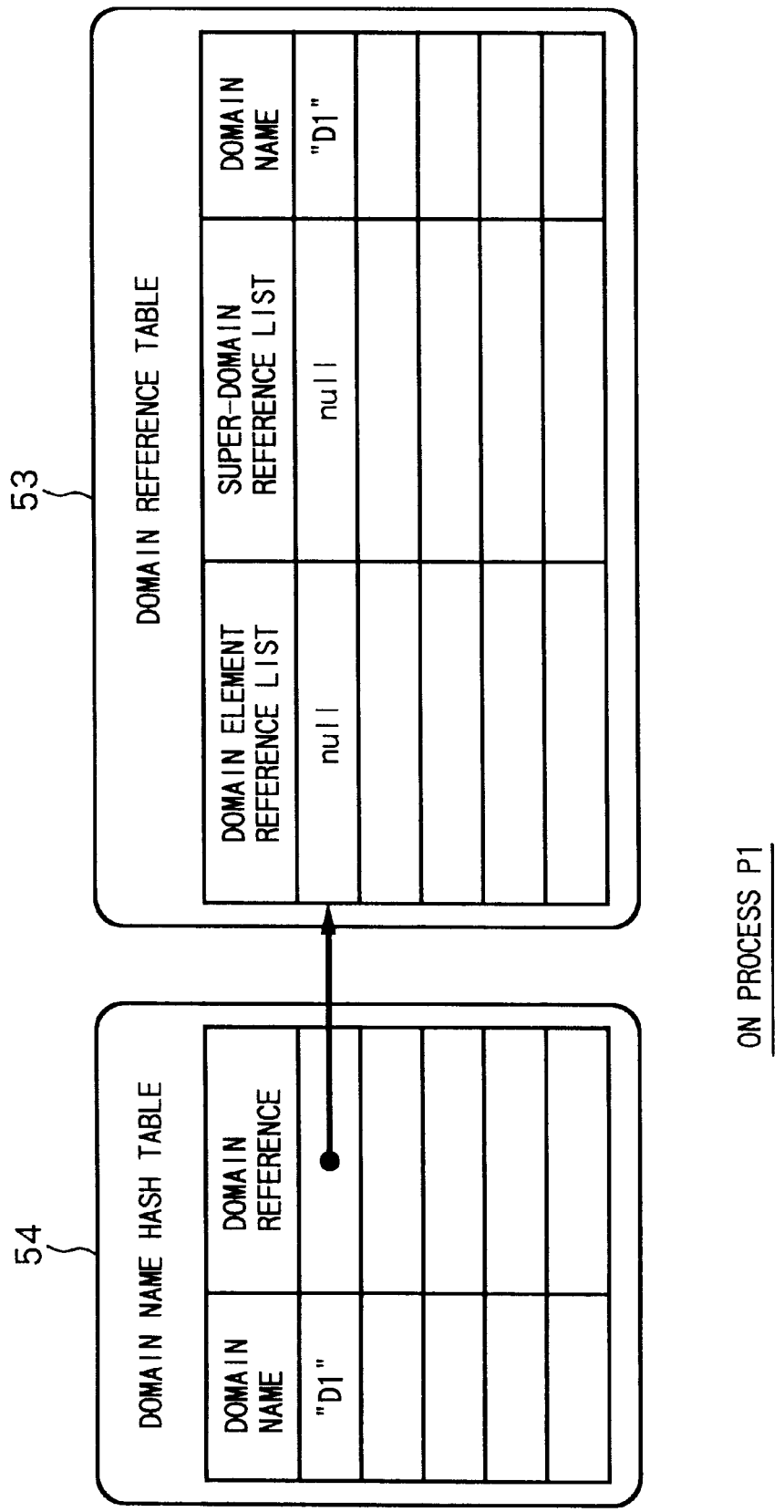
FIG. 21 is a view for explaining an initialization processing of a domain reference table on a process P1 shown in FIG. 19.
Figure 22:
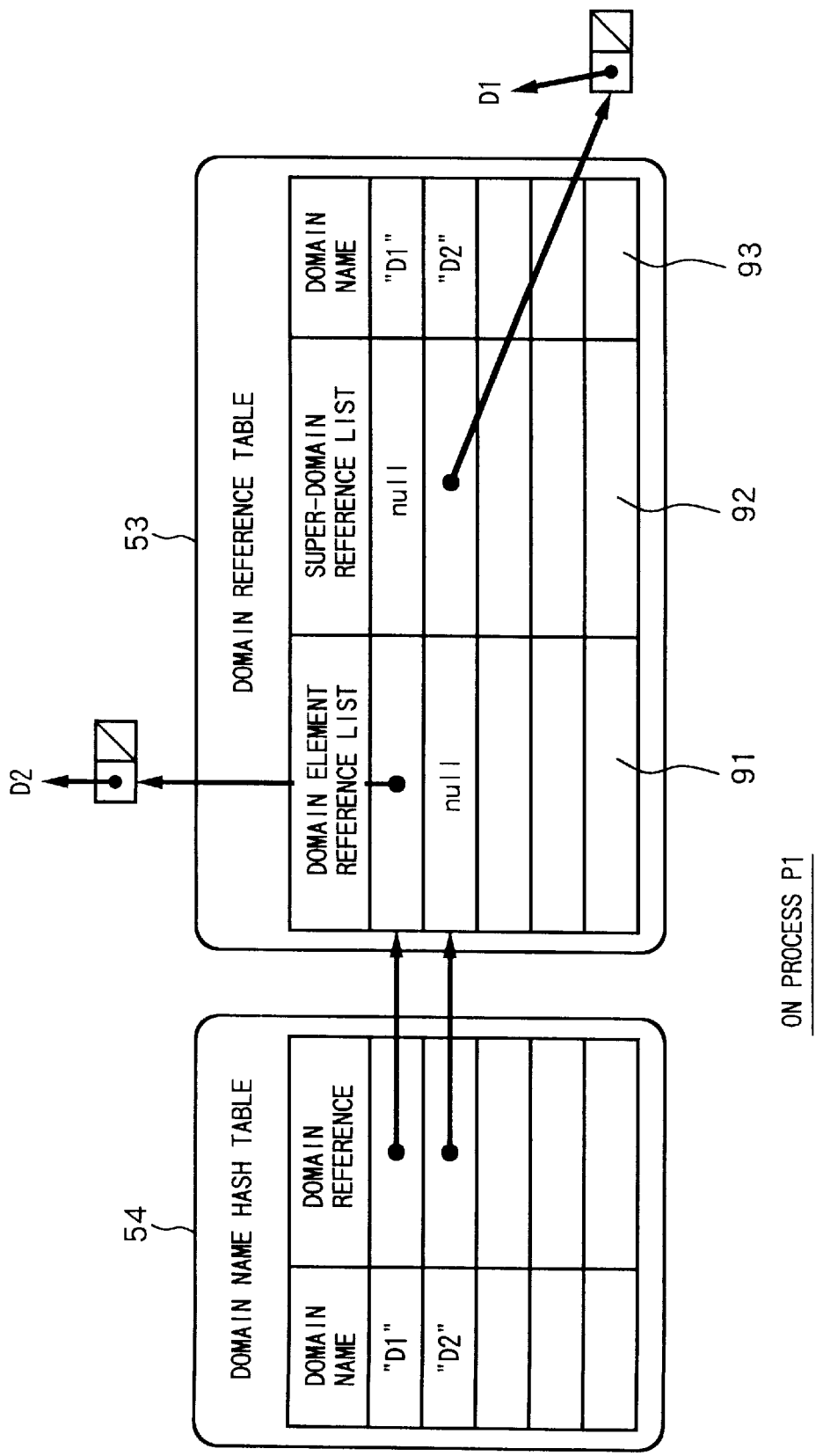
FIG. 22 is a view for explaining the initialization processing of the domain reference table on the process P1 shown in FIG. 19.

Further, the already prepared domain name hash table 54 shown in FIG. 21 is referred to using the domain names to which the functions belong to obtain the corresponding domain reference information. As shown in FIG. 23, the pointer to the reference information of the function is added to the domain element reference list 91 of the affiliated domain.

Figure 24B:
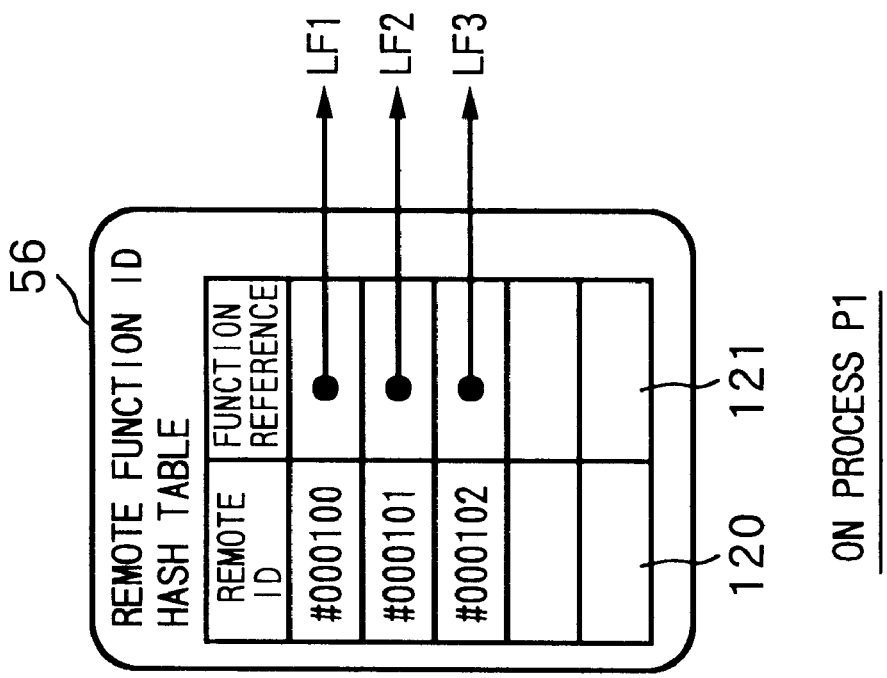
FIG. 24B is a view for explaining the initialization processing of a local function reference table on the process P1 shown in FIG. 19.
Figure 24A:
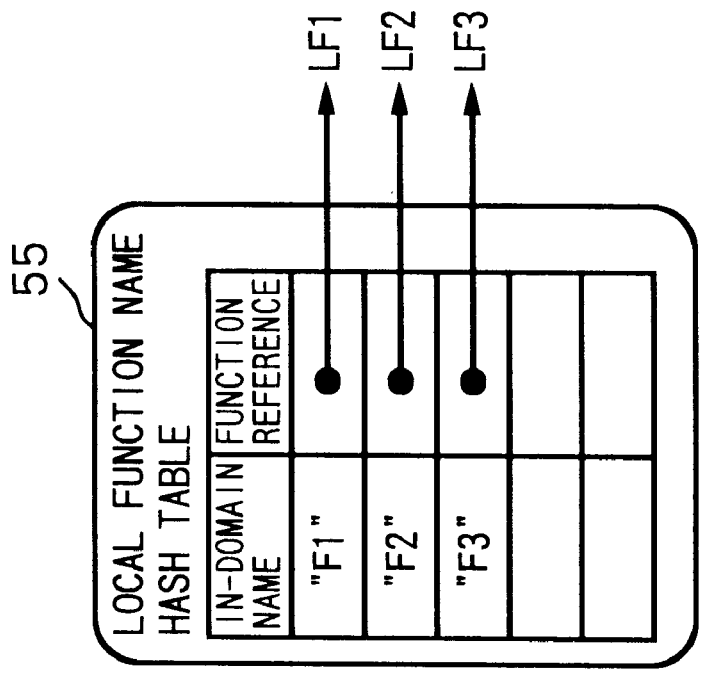
FIG. 24A is a view for explaining the initialization processing of a local function reference table on the process P1 shown in FIG. 19.

Simultaneously with this, the reference generation unit of the process "P1" generates the local function name hash table 55 and the remote function ID hash table 56 by adding the information of the functions as shown in FIGS. 24A and 24B.

Further, the reference generation unit of the process "P2" prepares the local function reference table 50 shown in FIG. 25 for the process "P2" based on the space configuration information of (6) and (7) shown below and, at the same time, generates the local function name hash table 55 and remote function ID hash table 56 shown in FIGS. 26A and 26B.

(6) A function of a print name of "func4", a local function ID of "#000001", an in-domain name of "F4", and affiliated domain names of "D1" and "D2".

(7) A function of a print name of "func1", a local function ID of "#000002", an in-domain name of "F5", and an affiliated domain name of "D1".

[Initialization of Process Reference Table (S3)]

Figure 28:
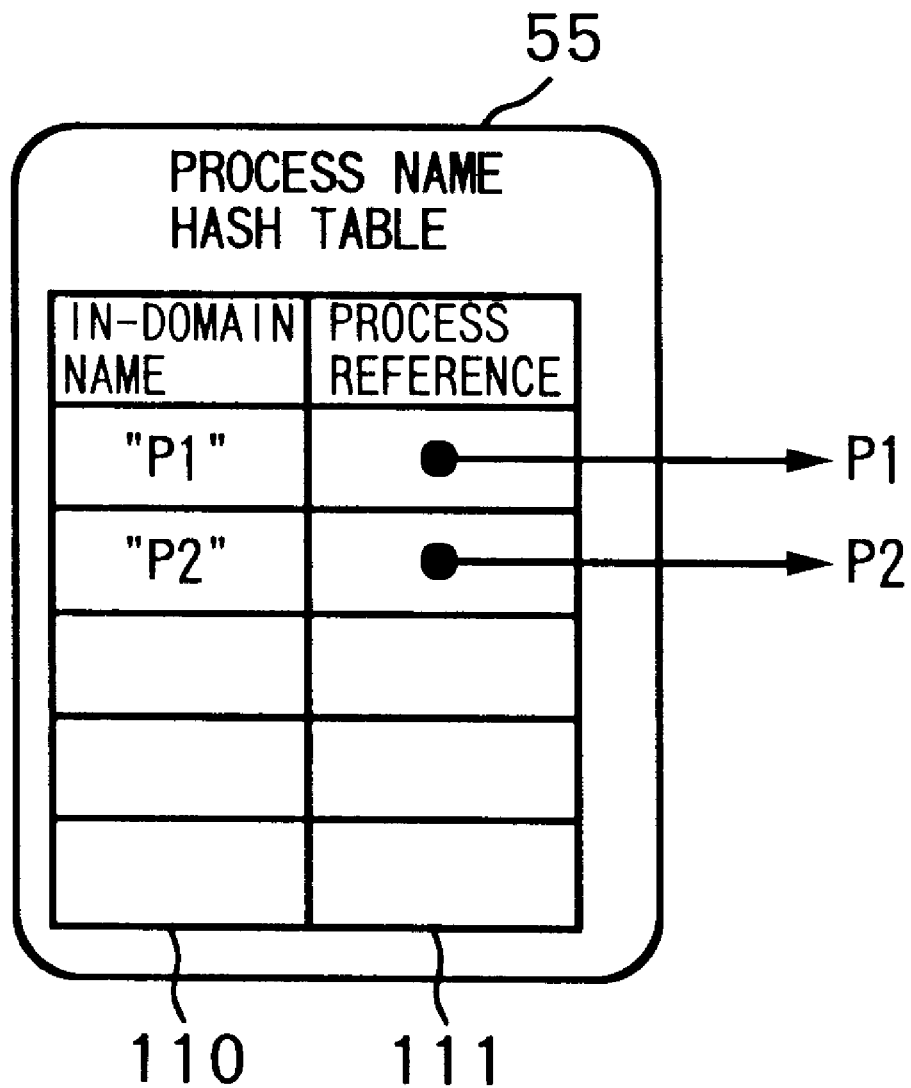
FIG. 28 is a view for explaining the initialization processing of the process reference table on the process P1 shown in FIG. 19.

The reference generation unit of the management process of the process "P1" prepares the process reference table 52 and the domain reference table 53 shown in FIG. 27 and the process name hash table 55 shown in FIG. 28 for the processes "P1" and "P2" based on the space configuration information of (8) to (11) shown below.

(8) A process of a network node information of[00c6] "N1", a port number of "#10000", an affiliated domain name of "D1", and a name inside the domain of "P1".

(9) A process of a network node information of "N2", a port number of "#10001", an affiliated domain name of "D1", and a name inside the domain of "P2".

(10) In "N1", when the "machine name" is "a1.dv1.co.jp" a "communication media" is an Ethernet and when the "machine name" is "a2.dv1.co.jp" a "communication media" is an ATM.

(11) In "N2", when the "machine name" is "b1.dv1.co.jp" a "communication media" is an Ethernet and when the "machine name" is "b1.dv1.co.jp" a communication media" is ATM.

[Remote Function Reference Table (S4)]

The reference generation unit of the management process of the process "P2" prepares the remote function reference table 51 and domain reference table 53 shown in FIG. 29 and the remote function name hash table 55 shown in FIG. 30 for the process "P2" based on the space configuration information of (12) and (13) shown below.

(12) A print name of "func4", a process name of "P2", affiliated domains of "D1" and "D2", and a name inside the domain of "F4".

(13) A print name of "func1", a process name of "P2", an affiliated domain of "D1", and a name inside the domain of "F5".

Figure 31:
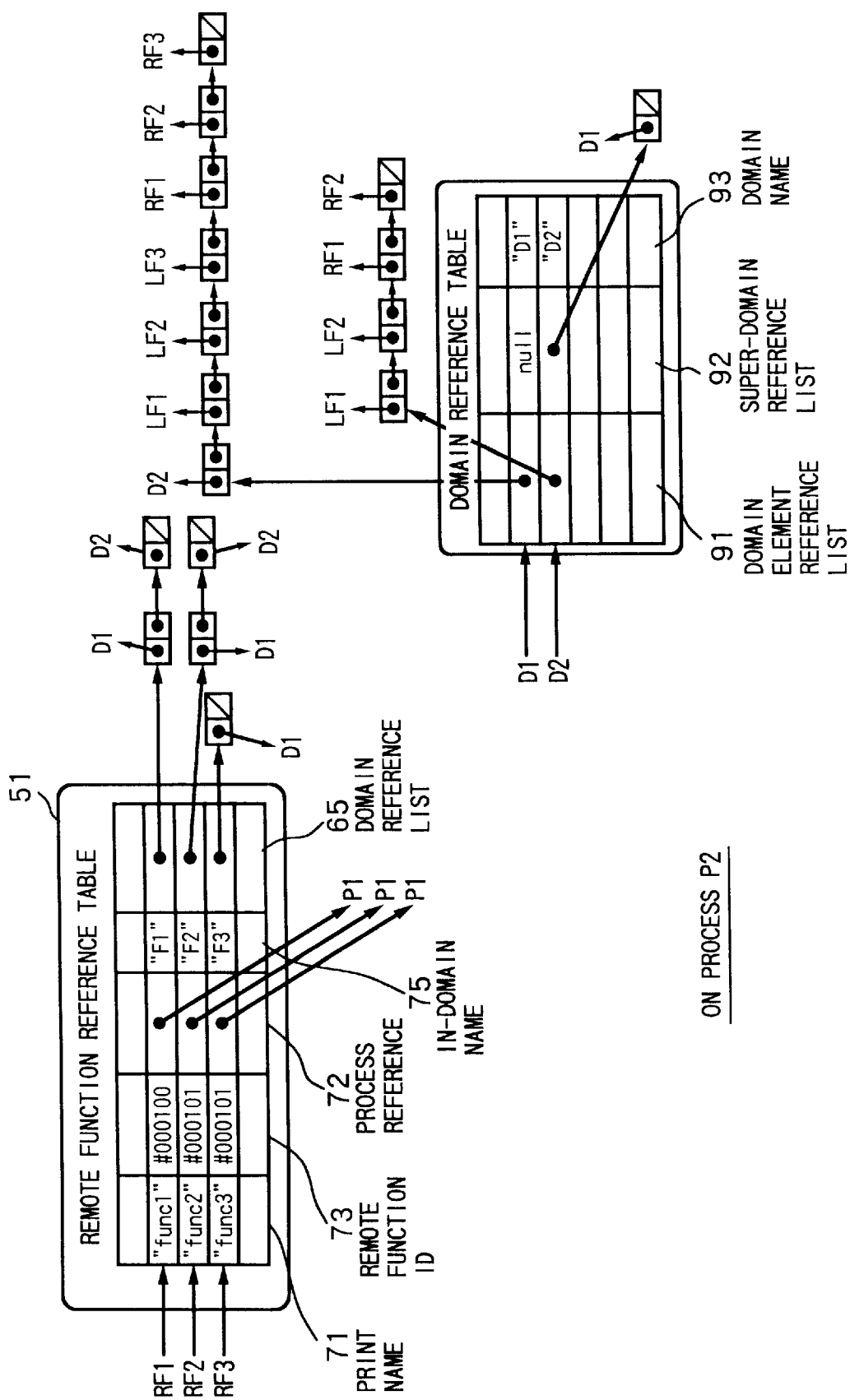
FIG. 31 is a view for explaining the initialization processing of the remote function reference table on the process P2 shown in FIG. 19.
Figure 32:
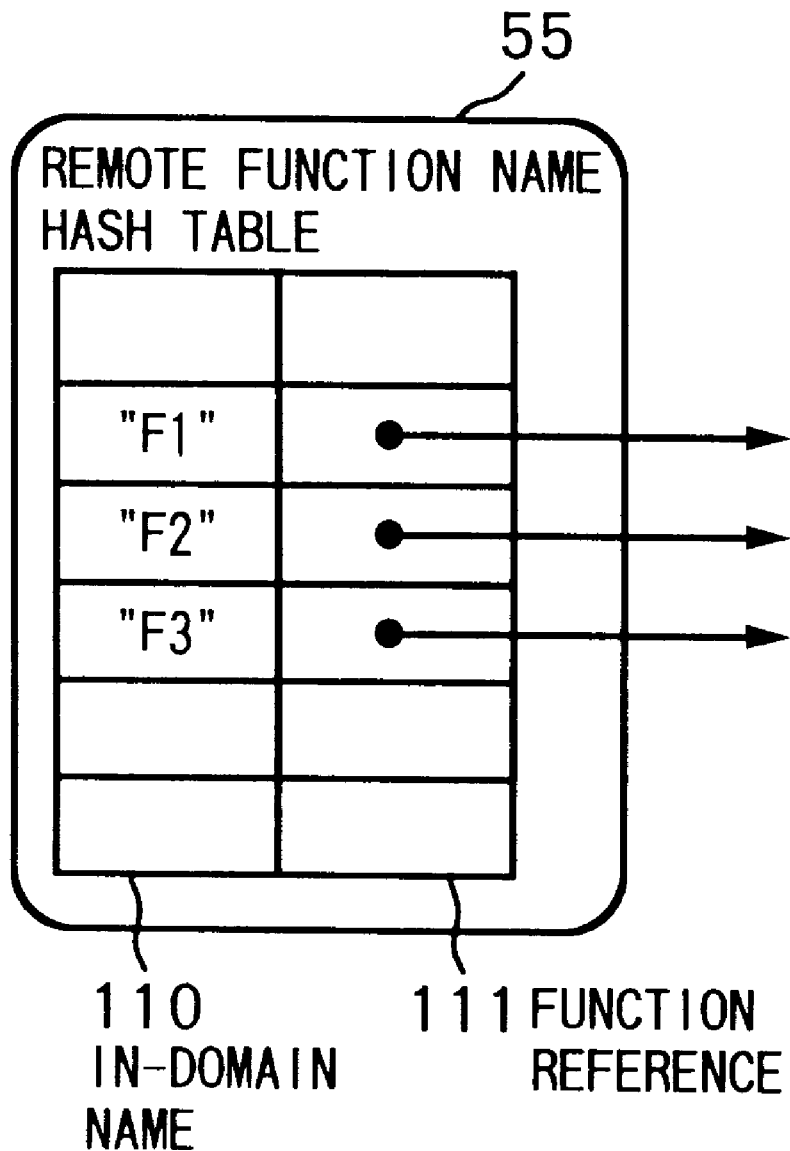
FIG. 32 is a view for explaining the initialization processing of the remote function reference table on the process P2 shown in FIG. 19.

Further, the reference generation unit of the management process of the process "P1" prepares the remote function reference table 51 and domain reference table 53 shown in FIG. 31 and the remote function name hash table 55 shown in FIG. 32 for the process "P1" based on the space configuration information of (14) to (16) shown below.

(14) A print name of "func1", a process name of "P1", affiliated domains of "D1" and "D2", and a name inside the domain of "F1".

(15) A print name of "func2", a process name of "P1", affiliated domains of "D1" and "D2", and a name inside the domain of "F2".

(16) A print name of "func3", a process name of "P1", an affiliated domain of "D1", and a name inside the domain of "F3".

The remote function ID is obtained using the protocol that the remote function ID is obtained when the "function name (set of domain name and name inside the domain)" is given.

For example, the management process of the process "P1" inquires about a function having a domain name of "D1" and in-domain name of "F4" to the management process of the process "P2". The management process of the process "P2" obtains the reference information of the desired function by using the domain name hash table 54 and the function name hash table 55. Then, the management process of the process "P2" returns "#000100", which is the remote function ID of the function, to the management process of the process "P1".

Next, an explanation will be made of the call operation of a function using the reference information in the parallel distributed processing system by using FIG. 19 as an example.

Here, an explanation will be made by exemplifying a case where the function "F4" of the domain name "D2" is called from the process "P1" shown in FIG. 11.

Figure 29:
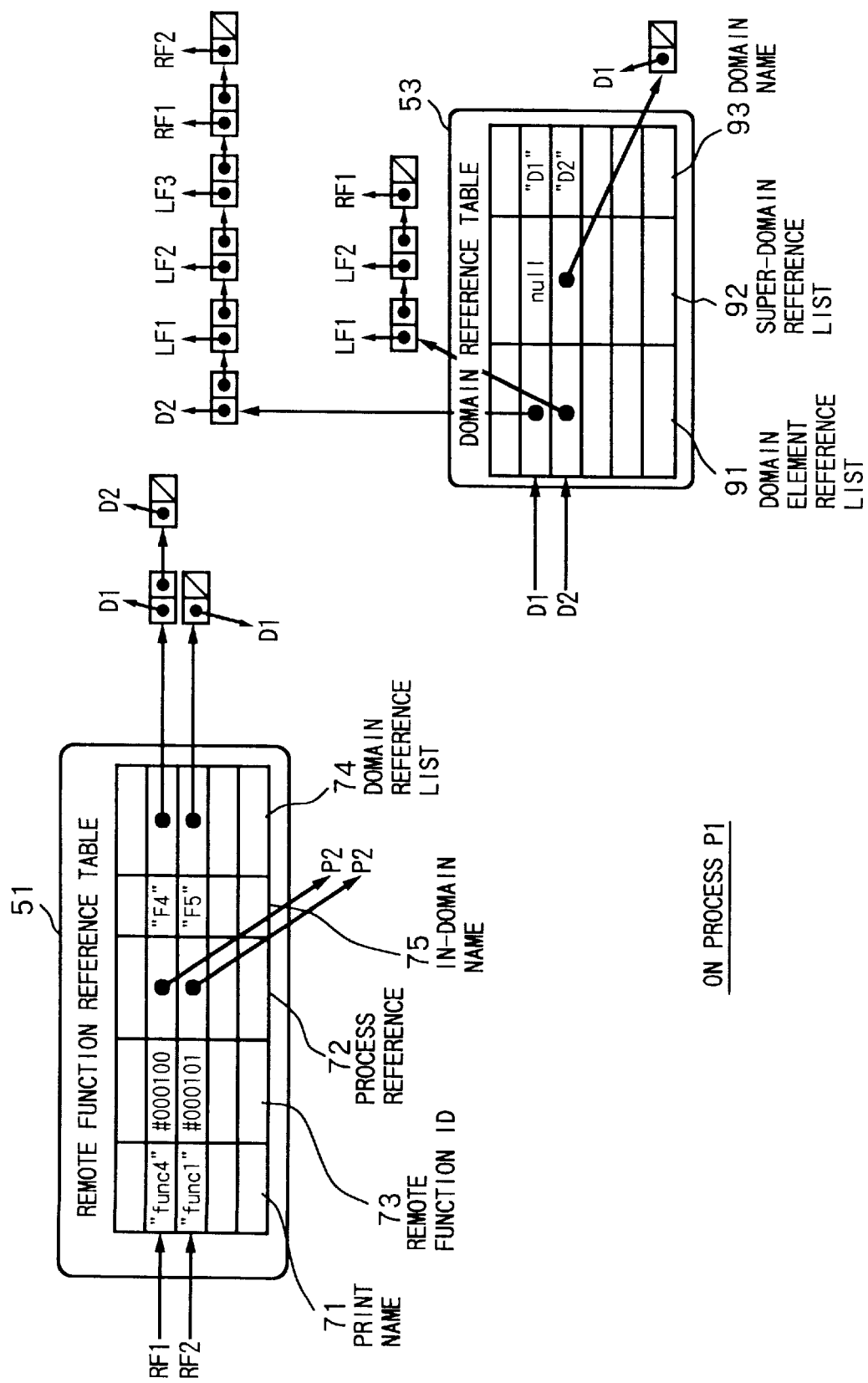
FIG. 29 is a view for explaining the initialization processing of a remote function reference table on the process P1 shown in FIG. 19.
Figure 30:
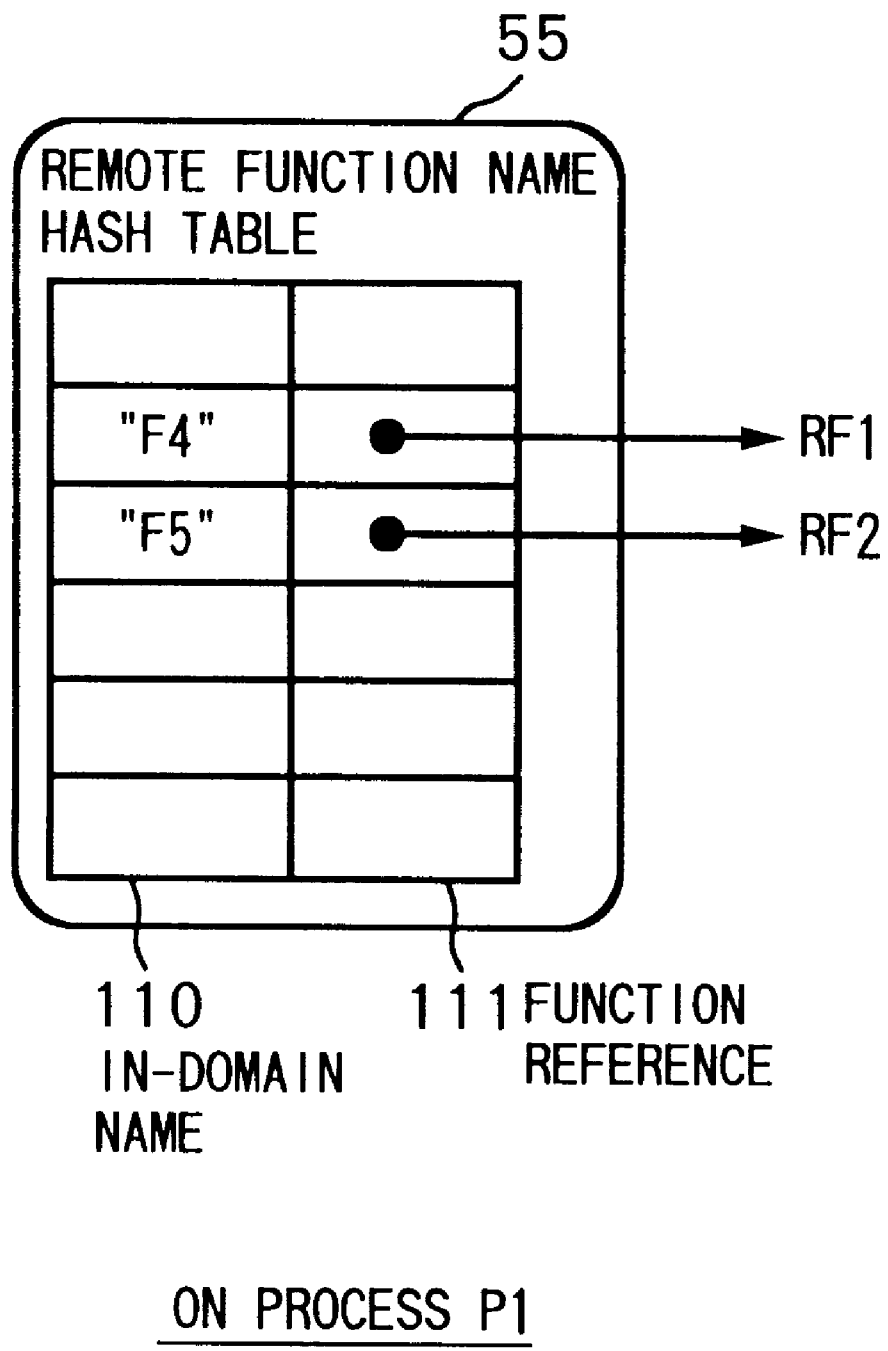
FIG. 30 is a view for explaining the initialization processing of the remote function reference table on the process P1 shown in FIG. 19.

First, the management process of the process "P1" refers to the remote function name hash table 55 shown in FIG. 30 by using the in-domain function name "F4" as the in-domain name 110 and obtains the domain reference list 74 of the remote function reference table 51 shown in FIG. 29 based on the function reference RF1. Then, the domain reference list 74 is examined and the item having the domain name of "D2" is found. At this time, it is seen from the process reference 72 of the remote function reference table 51 that the in-domain function name "F4" exists in the process "P2".

Next, the management process of the process "P1" designates a communication means for accessing an external process based on the process reference table 52 shown in FIG. 27. In this case, by designating the Ethernet, the DNS host name of the process "P2" in which the process function "F4" exists is specified. Then, the management process of the process "P1" accesses the management process of the process "P2" by using this specified DNS host name and the network port ID 82 and performs the ID designation call by "#000100", which is the remote function ID 73 obtained from the remote function reference table 51 shown in FIG. 29, based on the function reference RF1 mentioned before.

Figure 26A:
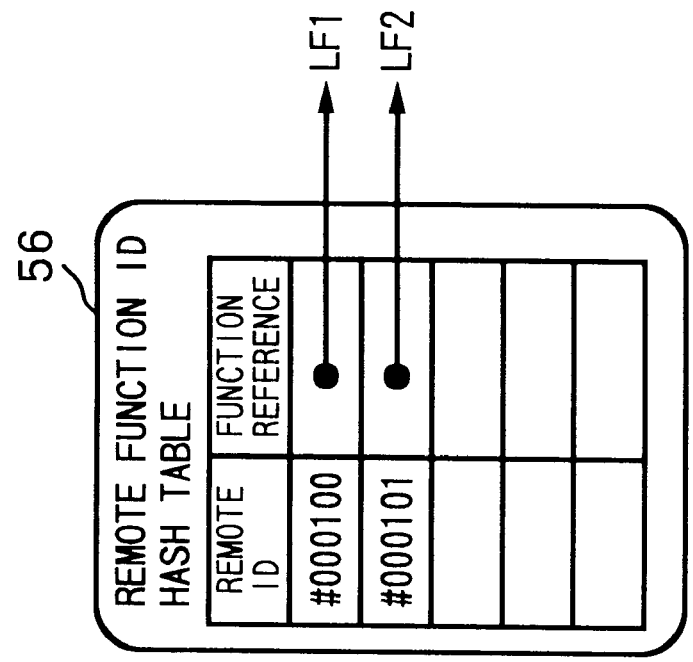
FIG. 26A is a view for explaining the initialization processing of a local function reference table on the process P2 shown in FIG. 19.
Figure 26B:
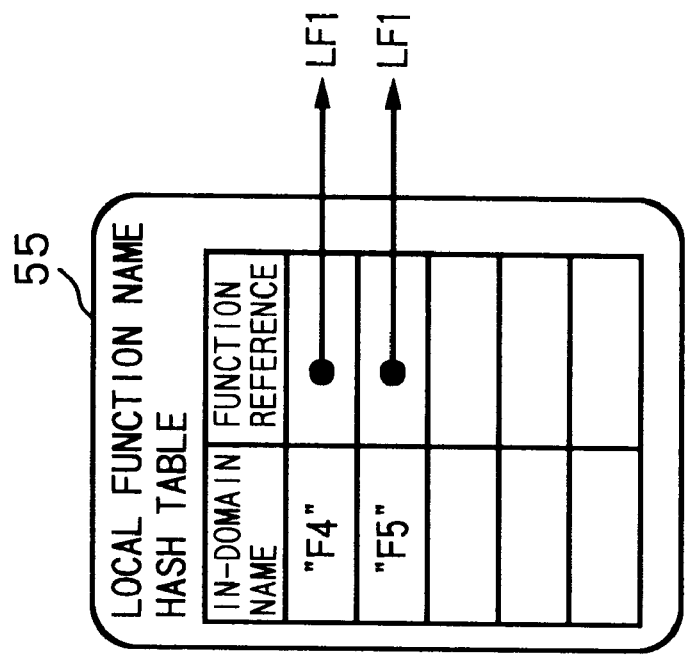
FIG. 26B is a view for explaining the initialization processing of a local function reference table on the process P2 shown in FIG. 19.

The management process of the process "P2" receiving this call refers to the remote function ID hash table 56 on the process "P2" shown in FIGS. 26A and 26B by using "#000100", which is the designated remote facility ID, as a key and obtains the function reference LF1. Next, this management process obtains the desired reference information such as the local facility ID 62 for the function "F4" from the local function reference table 50 shown in FIG. 25 by using the function reference LF1. At this time, the local facility ID for the function "F4" is "#000001". The management process calls and executes the function "F4" based on this local facility ID and returns the result of execution to the management process of the process "P1".

As explained above, according to the parallel distributed processing system 31, by introducing the concept of computation space, the user can freely form management spaces for managing only the required functions in accordance with a particular purpose. As a result, the load on the user for management of the names and identifiers of the functions is reduced. Further, the number of the managed objects is decreased, therefore the time for specifying an object can be shortened. Further, erroneous access to the objects out of the reference space can be effectively prevented.

Further, according to the parallel distributed processing system 31, by introducing domains in addition to the computation space, the collision of names of the functions etc. is allowed even between domains and the degree of freedom of the functions useable in each domain is raised.

Further, according to the parallel distributed processing system 31, it is possible to flexibly and in addition easily deal with cases where a new function is added, a function is deleted, etc. by amending the portions concerning the functions, for example, the local function reference table 50, remote function reference table 51, process reference table 52, domain reference table 53, domain name hash table 54, function/process name hash table 55, and remote function ID hash table 56.

Further, in the above parallel distributed processing system 31, the type of the execution environment (OS) of the network nodes N1 and N2 shown in FIG. 19 is irrelevant to the space management, therefore a system not dependent upon the execution environment can be provided.

Further, in the above parallel distributed processing system 31, by using the concept of domains, it is possible to manage the references of the functions provided in each process without regard as to the mode of connection of the network nodes in the network.

The present invention is not limited to the above embodiments. For example, the types of the computation objects comprising the domains are not limited to those mentioned above.

Further, in the above embodiments, functions were exemplified as the computation objects, but other than this, the present invention can be similarly applied even if reference information such as computation modules for executing predetermined programs, instances, classes, methods, global shared functions, and files are managed.

Further, it is also possible to provide the reference holding unit and the reference generation unit for every process or provide them for every computation object.

Further, in the above embodiments, as shown in FIG. 16, FIG. 17, FIG. 21, FIG. 22, FIG. 24A, FIG. 24B, FIG. 26A, FIG. 26B, FIG. 30, and FIG. 32, the in-domain name indicating the name of the object was used as the reference information, but it is also possible to use an identifier indicating the location of the computation object as the reference information.

Third Embodiment

[Space Management System]

First, the space management system adopted in a parallel distributed processing system according to the present embodiment is the same as the space management system in the parallel processing system according to the second embodiment shown in FIG. 9 explained above. The concepts of the "reference space", "reference", and "domain" are the same as well.

Figure 36:
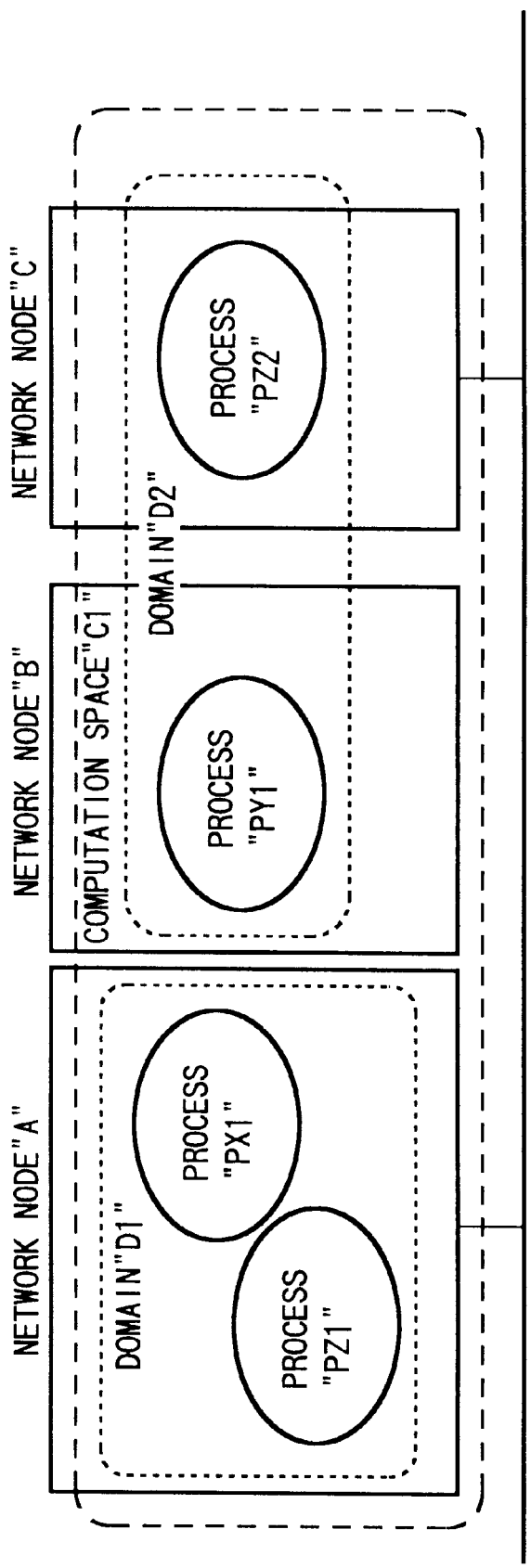
FIG. 36 is a view for explaining a computation space and domain formed in the parallel distributed processing system shown in FIG. 33.

Note that the domains are not shown in FIG. 9, but are shown in FIG. 36.

Figure 33:
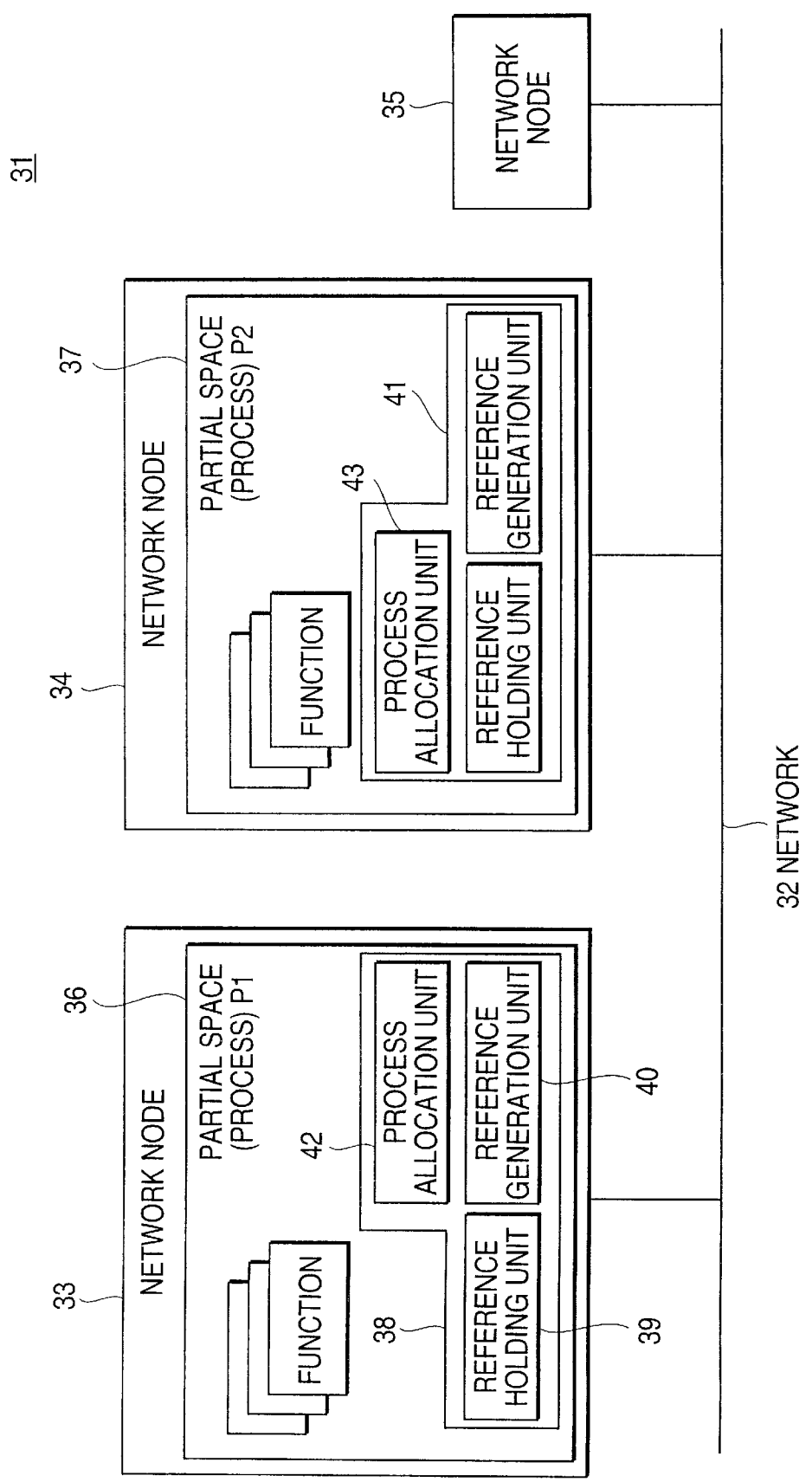
FIG. 33 is a view of the configuration of the parallel distributed processing system according to the third embodiment of the present embodiment.

FIG. 33 is a view of the configuration of a parallel distributed processing system 31 according to the present embodiment.

As shown in FIG. 33, in the parallel distributed processing system 31, network nodes 33 to 35 are connected via a network 32.

In the network node 33, a process (partial space) 36 executed by the management process 38 exists.

The management process 38 has a reference holding unit 39, a reference generation unit 40, and a process allocation unit 42.

The reference holding unit 39 stores reference information identifying the processes, computation objects, and domains for specifying their locations and controlling the managing the same.

The reference generation unit 40 generates the reference information mentioned later from the reference information on the program modules obtained from an export module and an import module and the given allocation information. Here, a "program module" means a collection of programs for executing a process and can also be comprised by a plurality of files. For example, it is possible even if the program module "X" is comprised by the two files of "ps.exe" and "px.dll".

Figure 34:
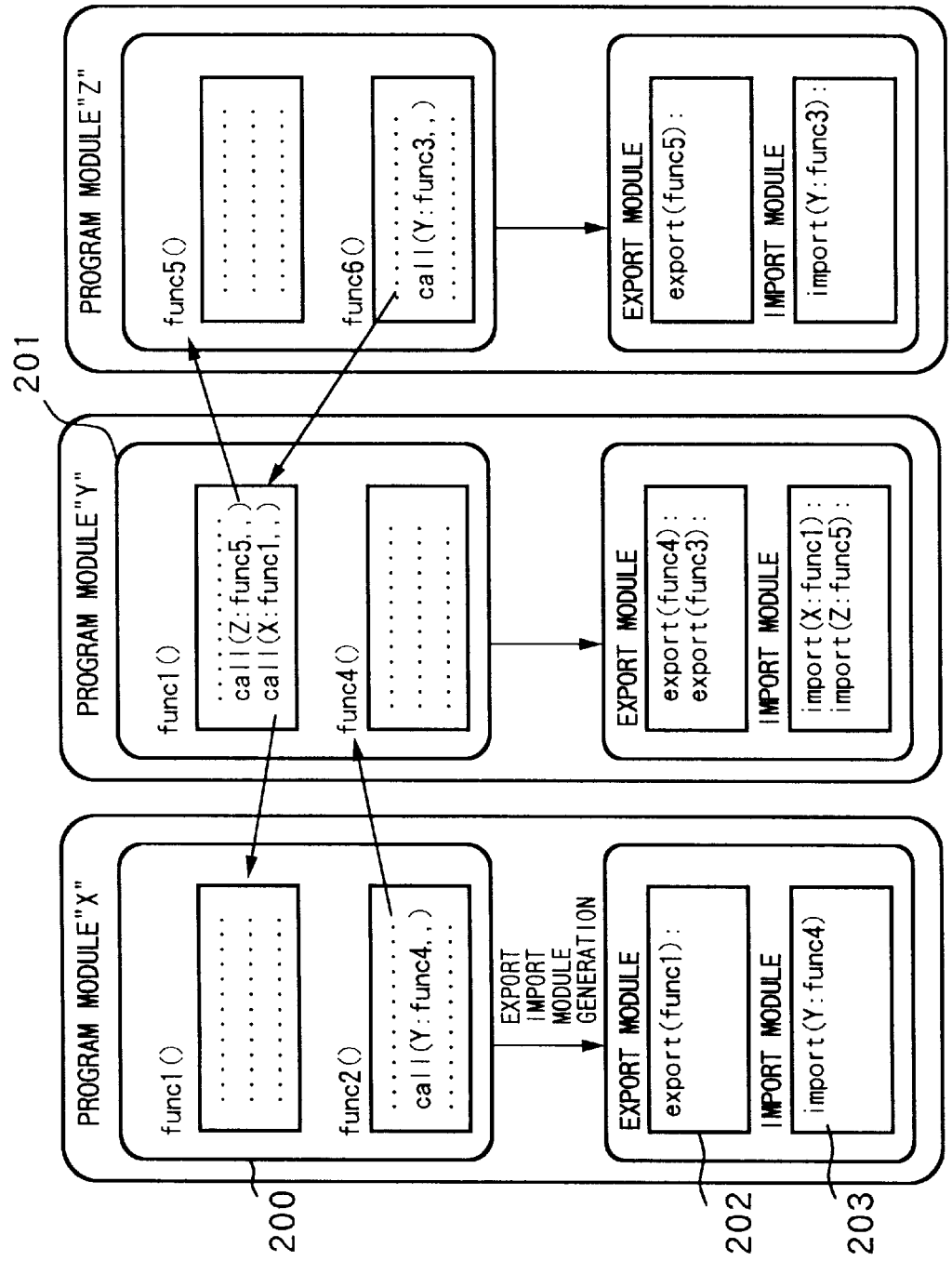
FIG. 34 is a view of the content of description of a program module processed in the parallel distributed processing system shown in FIG. 33.

Each program module encompasses an export module indicating the content of registration to an internal reference table and an import module indicating the content of registration to an external reference table for giving the reference relationship on the program modules to the reference generation unit 40. In the example shown in FIG. 34, in the function func2( ) of the program module "X", the function func4( ) of the program module "Y" is read. Further, the function func1( ) is read from the function func1( ) of the program module "Y". At this, "export (func1);" is described in the export module 202 of the program module "X", and "import (Y; func4);" is described in the import module 203. As shown in FIG. 34, the programmer describes "call (Y: func4, args)" where a call of the external function is described. This means that the function func4 of the program module "Y" is called by the arguments indicated by args. In this way, the description of the program concerning the reference on the program is described unrelated to the allocation at the time of execution of the program.

Note that, the export module and import module are automatically generated from the application source code or generated under at the responsibility of the application programmer by using a translator or the like.

The process allocation unit 42 executes the program module on the designated network node based on the given allocation information to generate a process.

Figure 35:
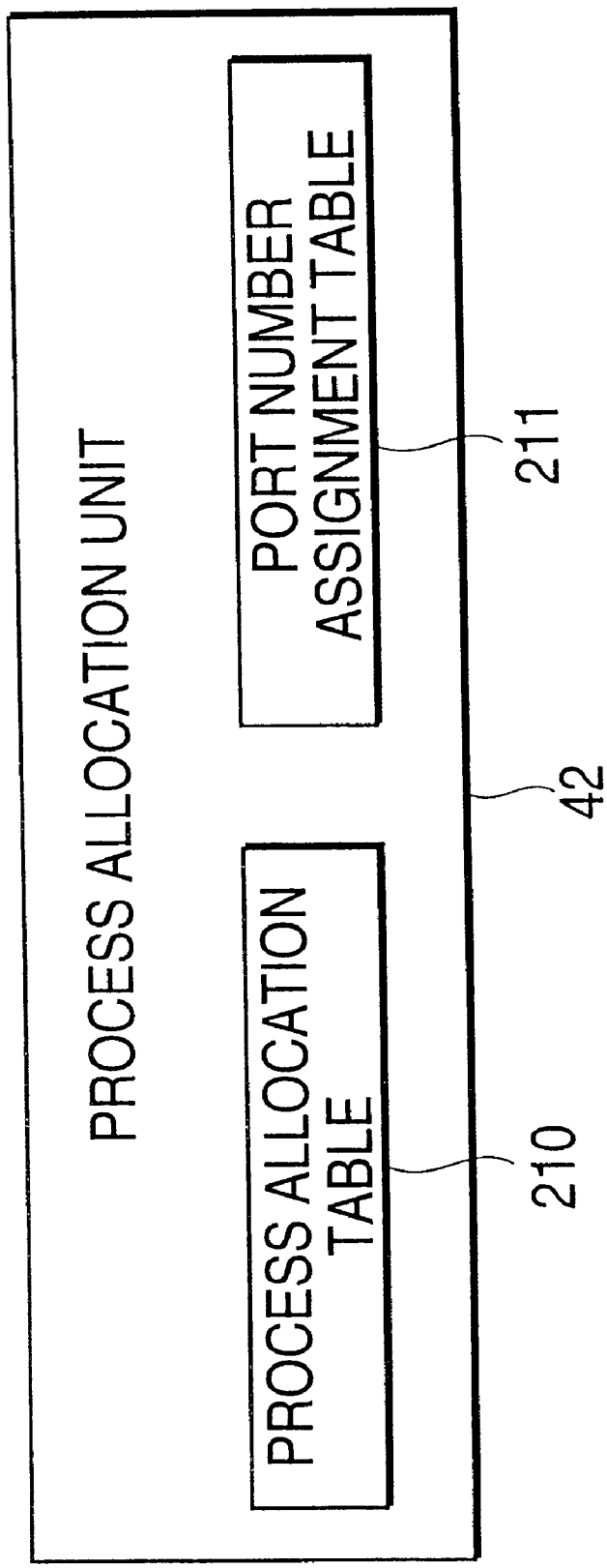
FIG. 35 is a view for explaining a process allocation unit shown in FIG. 33.

The process allocation unit 42 is provided with a process allocation table 210 and a port number assignment table 211 as shown in FIG. 35.

[Allocation Information]

The allocation information is comprised by information for determining in which network node which program module is allocated and information concerning the names given to the processes and the computation objects.

This allocation information is input to a master management process by for example a reading of a file, an input operation of the user, or the like. Information in the allocation information necessary for preparing the process allocation table and the port number assignment table is output from the master management process to a slave management process.

Here, for convenience of explanation, the management process reading the allocation information first will be referred to as a master management process. As opposed to this, a management process receiving the process generation command from the master management process will be referred to as a slave management process.

Below, an explanation will be made of a specific example of the allocation information by taking as an example a case where the computation space and process allocation respectively have the structures shown in FIG. 36 and 37.

As shown in FIG. 36, the processes "PX1" and "PZ1" are allocated in the network node "A", a process "PY1" is allocated in a network node "B", and a process "PZ2" is allocated in a network node "C".

Here, a computation space "C1" is composed by the processes "PX1", "PZ1", "PX1", and "PZ2".

Further, a domain "D1" is comprised by processes "PX1" and "PZ1", and a domain "D2" is comprised by processes "PY1" and "PZ2".

Here, the process "PX1" is generated by executing the program module "X" shown in FIG. 34, the process "PY1" is generated by executing the program module "Y", and the processes "PZ1" and "PZ2" are generated by executing the program module "Z".

Figure 37:
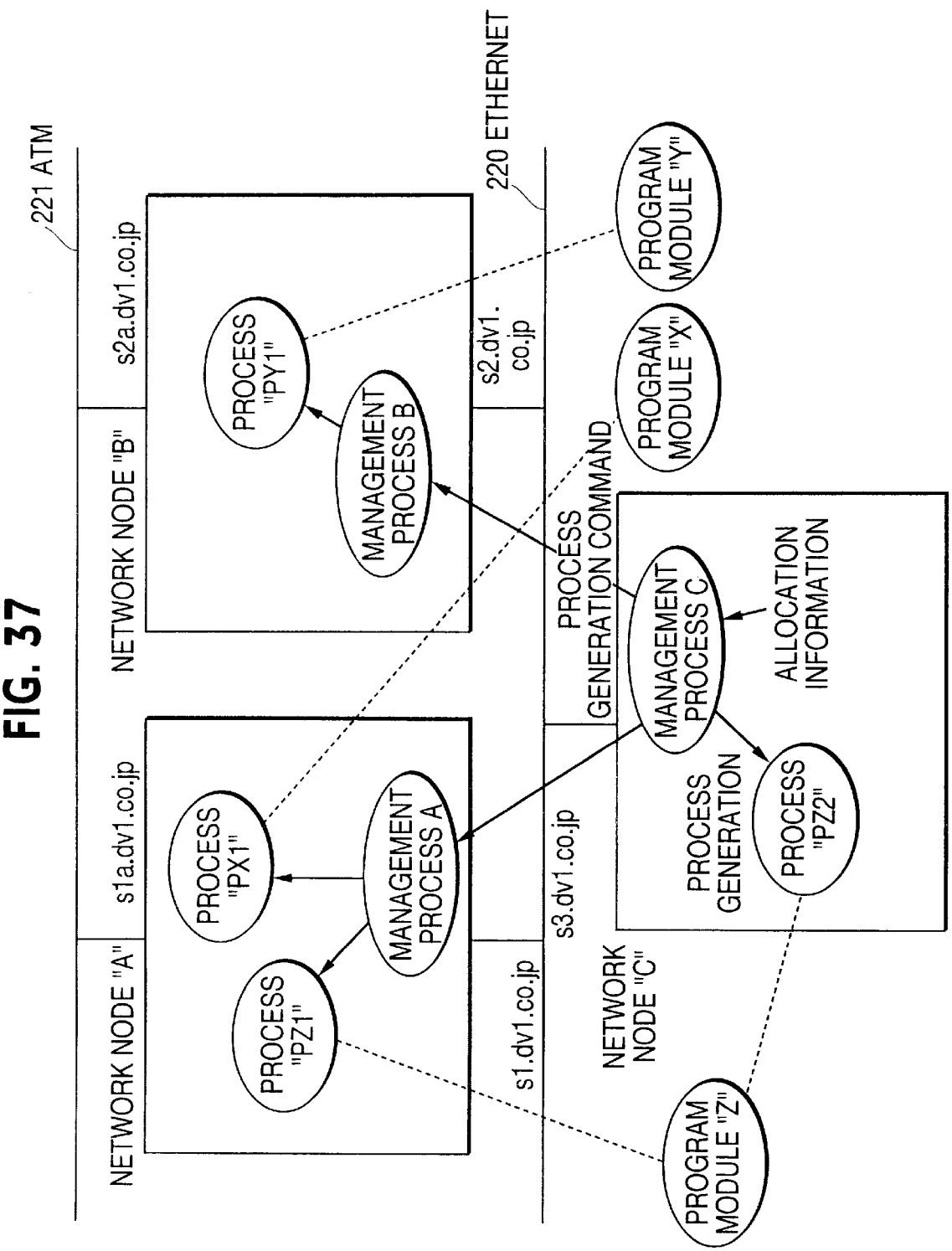
FIG. 37 is a view for explaining a process arranged in each network node of the parallel distributed processing system shown in FIG. 33.

Further, as shown in FIG. 37, the network node "A" is connected to an Ethernet 220 and an ATM 221 and has the network addresses (DNS name) "s1.dv1.co.jp" and "s1a.dv1.co.jp", respectively.

The network node "B" is connected to the Ethernet 220 and ATM 221 and has the network addresses "s2.dv1.co.jp" and "s2a.dv1.co.jp", respectively.

The network node "C" is connected to the Ethernet 220 and has the network address "s3.dv1.co.jp".

Further, as shown in FIG. 37, in the network nodes "A", "B", and "C", management processes A, B, and C respectively exist.

In the above cases shown in FIG. 36 and FIG. 37, the allocation information has the following information.

The program module "X" is allocated on the network node "A" and is named the process "PX1".

The program module "Y" is allocated on the network node "B" and is named the process "PY1".

The program module "Z" is allocated on the network node "A" and is named the process "PZ1".

The program module "Z" is allocated on the network node "C" and is named the process "PZ2".

The program module "X" location (real) is:
"ftp://ftp.dv1.co.jp/bin/px.exe".

The program module "Y" location is:
"ftp://ftp.dv1.co.jp/bin/py.exe" and
"ftp://ftp.dv1.co.jp/bin/py.dll".

The program module "X" location is:
"ftp://ftp.dv1.co.jp/bin/pz.exe".

In the network node "A", the network address is "s1.dv1.co.jp" for the Ethernet (media) and "s1a.dv1.co.jp" for the ATM (media).

In the network node "B", the network address is "s2.dv1.co.jp" for the Ethernet (media) and "s2a.dv1.co.jp" for the ATM (media).

In the network node "C", the network address is "s3.dv1.co.jp" for the Ethernet (media).

[Management Process]

The management process is activated in advance when allocating the processes in the parallel distributed processing system in a distributed manner.

The management process is a type of process in which a fixed port of each network node (for example a port number "010000") is assigned and which performs the allocation of general process based on the allocation information.

The general processes and the management process are the same in terms of facility, but different in the point that a fixed port is assigned to the management process.

In FIG. 37, the allocation information is given to the management process C, and the process generation command is output from the management process C to the management processes A and B.

Accordingly, the management process C becomes the master management process, and the management processes A and B become the slave management processes.

The processing of the master management process C and the slave management processes A and B are shown in for example FIG. 7.

[Process Allocation Table]

A process allocation table 210 is provided in a process allocation unit 42 and stores the allocation information or the required information among the allocation information.

Here, where there are a plurality of allocation information, in order to identify the allocation information, a configuration ID is given to each allocation information.

Figure 39:
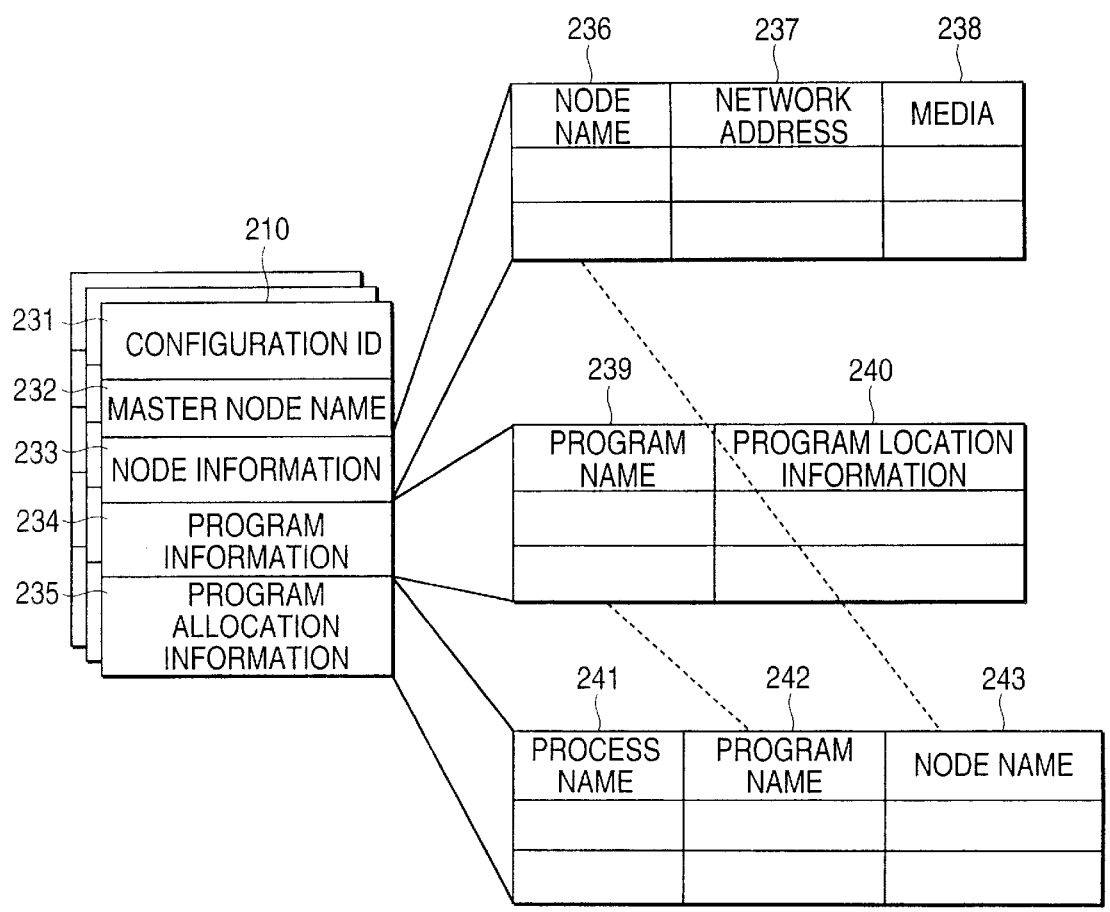
FIG. 39 is a view of the configuration of a process allocation table.

FIG. 39 is a view for explaining the process allocation table 210.

As shown in FIG. 39, the process allocation table 210 is comprised by a configuration ID 231, a network address 232 of a master node, a node information 233, a program information 234, and a program allocation information 235.

The node information 233 is a table of a node name 236, network address 237, and media 238.

The program information 234 is a table of a program name 239 and a program location information 240.

The program allocation information 235 is a table of a process name 241, a program name 242, and a node name 243.

Figure 40:
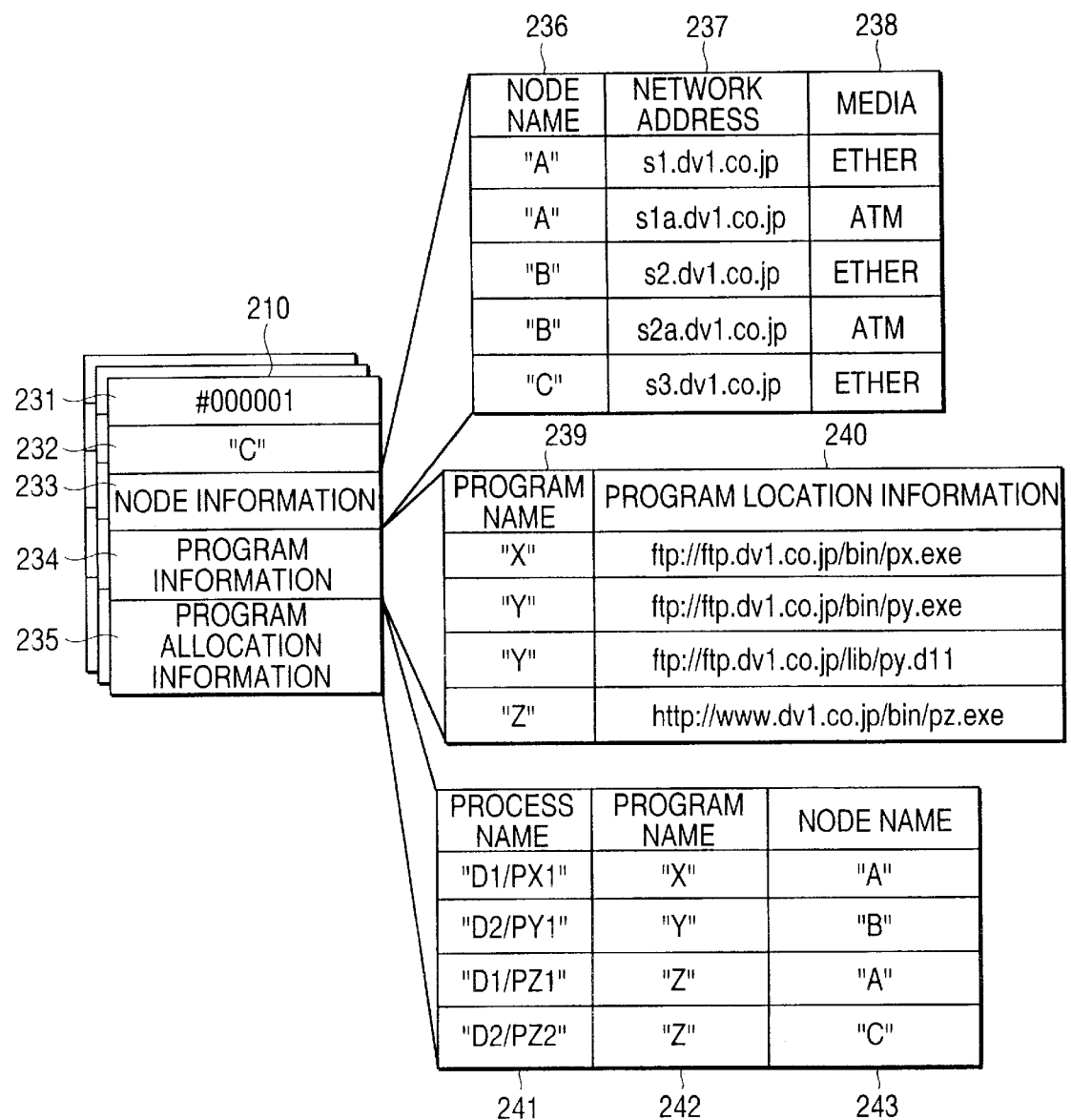
FIG. 40 is a concrete example of the process allocation table of a network node C.
Figure 41:
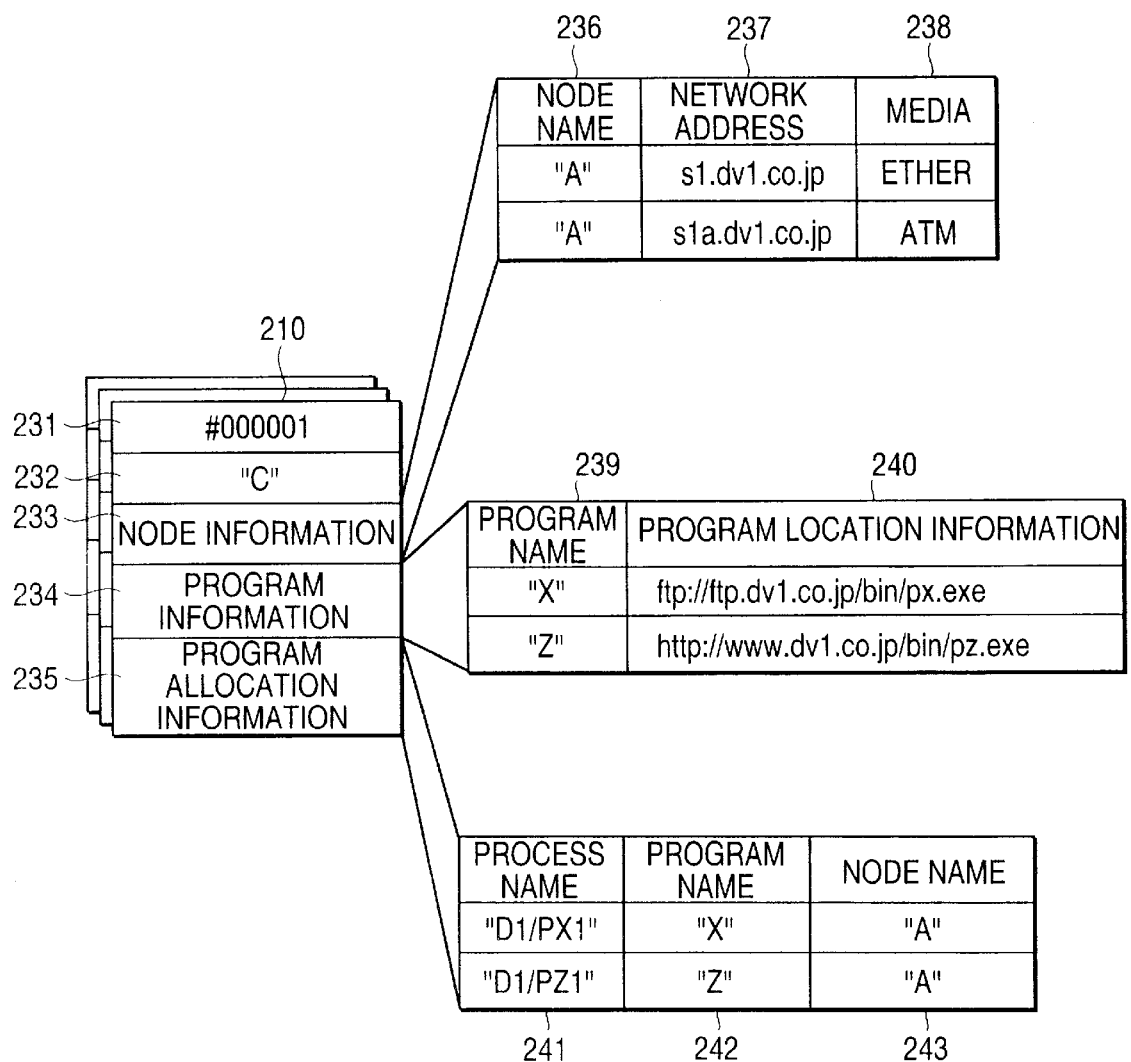
FIG. 41 is a concrete example of the process allocation table of a network node A.
Figure 42:
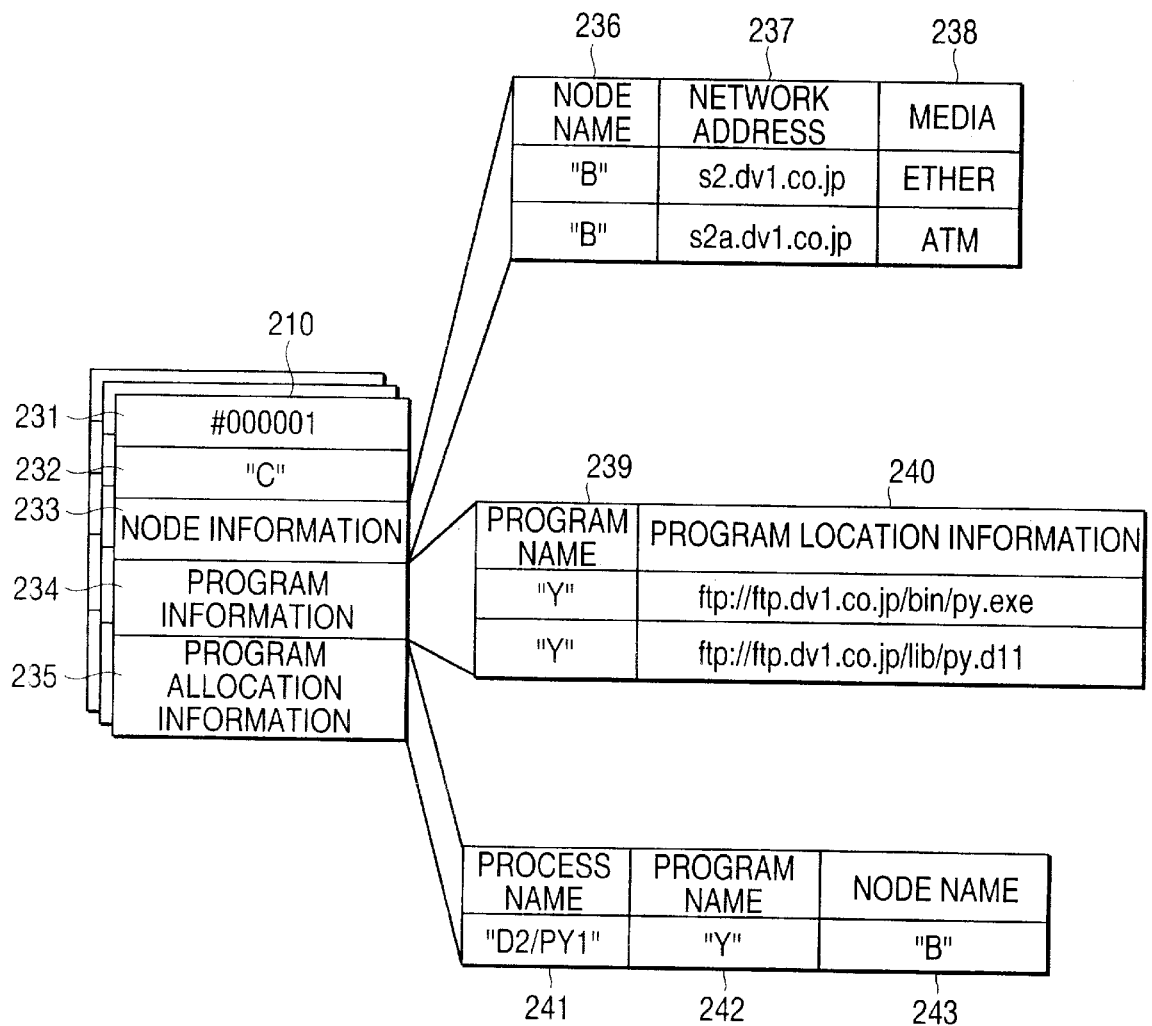
FIG. 42 is a concrete example of the process allocation table of a network node B.

In the parallel distributed processing system shown in FIG. 37, the process allocation units 42 of the network nodes A, B, and C are respectively provided with process allocation tables 210 as shown in FIG. 41, FIG. 42, and FIG. 40. The process allocation table 210 of the network node C is generated by the management process C based on the allocation information. The process allocation tables 210 of the network nodes A and B are generated by the management processes A and B based on the required information among the allocation information.

[Port Number Assignment Table]

FIG. 42 is a view of explaining a port number assignment table 211.

As shown in FIG. 42, the port number assignment table 211 is comprised by a configuration ID 250, a process name 251, and a port number 252.

In the present embodiment, as shown in FIG. 44, in the slave management processes A and B and the master management process C, port number assignment tables 253, 254, and 211 are respectively generated. The port number assignment tables 253, 254, and 211 are provided in the process allocation units 42 of the network nodes A, B, and C, respectively.

[Reference Information]

This reference information is generated by an import processing and an export processing mentioned later.

In the following example, a case is shown where functions allocated distributed throughout a network are referred to. The reference information is comprised of four reference tables and three search use hash tables in the second embodiment as shown in FIG. 11. As the reference tables, there are a local function reference table 50 shown in FIG. 12, a remote function reference table 51 shown in FIG. 13, a process reference table 52 shown in FIG. 14, and a domain reference table 53 shown in FIG. 15. Further, the search use hash tables are hash tables between the names and identifiers and include a domain name hash table 54 shown in FIG. 16, a function/process name hash table 55 shown in FIG. 17, and a remote function ID hash table 56 shown in FIG. 18.

The contents of these tables are the same as explained in the second embodiment.

Note that, as the network node 34, there is a process (partial space) 37 executed by the management process 41. This is conceptually the same as the network node 33.

[Processing in Management Process]

Below, an explanation will be made of the processings in the master management process C and the slave management processes A and B while referring to FIG. 38.

Figure 38:
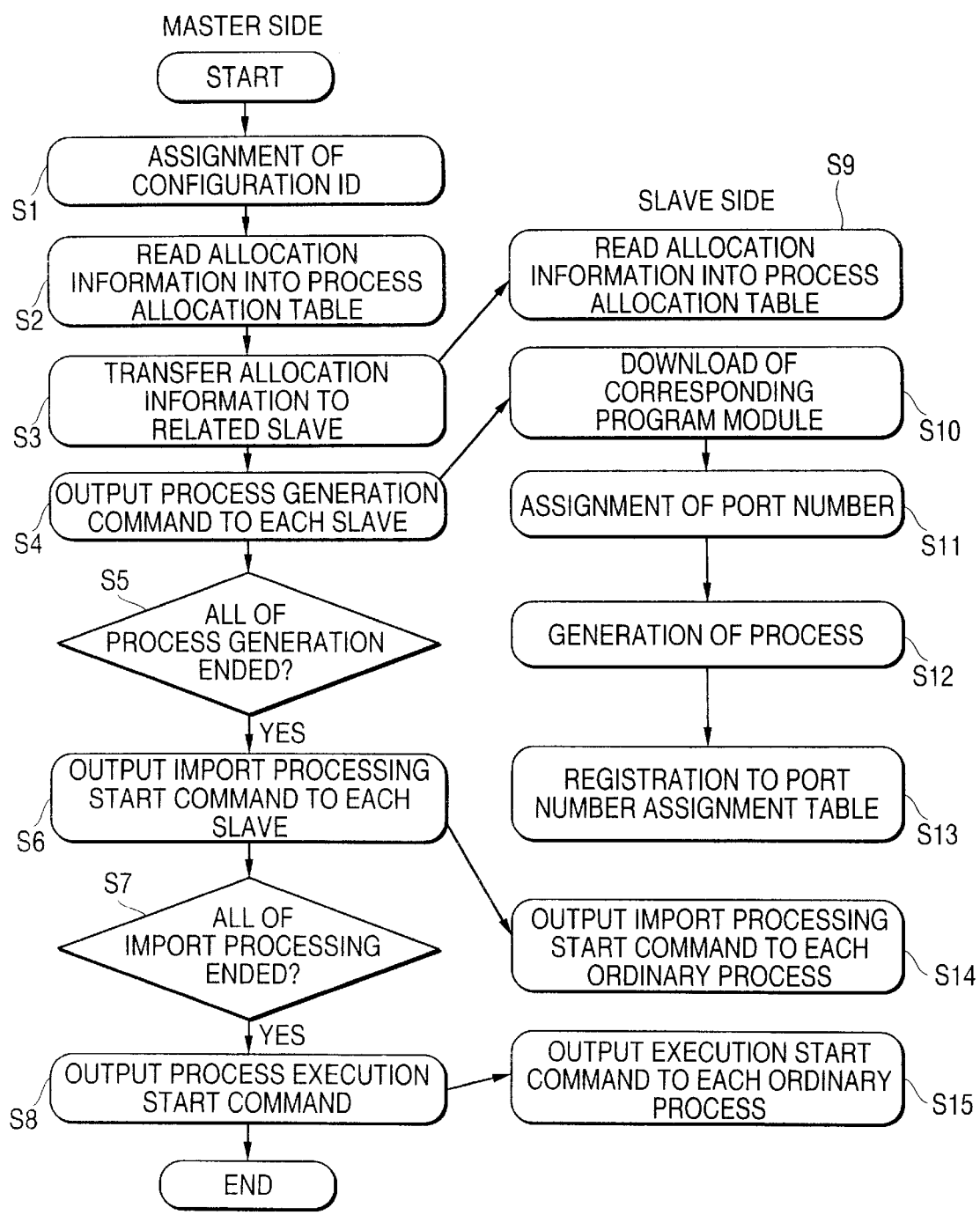
FIG. 38 is a flowchart of the processings in a master management process C and slave management processes A and B.

FIG. 38 is a flowchart of the processings in the master management process C and the slave management processes A and B.

First, when a plurality of allocation information are input to for example the master management process C, a configuration ID is given to each allocation information for the master management process C to identify the allocation information (step S1).

Next, the master management process C generates the process allocation table 210 as shown in FIG. 49 from the allocation information (step S2).

The master management process C outputs the information necessary for generating the process in each network node among the allocation information to the slave management processes A and B (step S3). The slave management processes A and B store the information input form the master management process C in the process allocation tables (step S9).

The master management process C outputs the process generation command as shown below to the slave management processes A and B itself (step S4).

Namely, the master management process C outputs a process generation command for instructing the generation of the processes having a configuration ID of #000001 and process names of "D1/PX1" and "D1/PZ1" to the slave management process A.

Further, the master management process C outputs a process generation command for instructing the generation of the process having the configuration ID of #000001 and process name of "D2/PY1" to the slave management process B.

Further, the master management process C outputs an instruction for generating the process having the configuration ID of #000001 and process name of "D2/PZ2" to itself. At this time, the master management process C performs both functions of a master and a slave.

The slave management processes A and B obtain the program for realizing the corresponding processes from the process allocation table when the process generation command is input (step S4) and further obtain the location information of the program from the program name and start the download of that program (step S10). As the protocol of the download, "ftp.http" or the like is used.

Then, the slave management processes A and B uniquely assign a port number for every network node at the process generation (step S11) and give the assigned port number and configuration ID to the program module as the arguments and generate processes (step S12). This assigned port number is registered in the port number assignment table 211 provided in each process allocation unit (step S13). Also the master management process C receiving the process generation command from itself performs similar processing.

The slave management processes A and B and the general process in the network node C output an ending message to the master management process C after the ending of the generation of the process.

When the master management process C decides from these ending messages that all of the process generation is ended (step S5), it outputs the import start command to the slave management processes A and B and the general processes in the network node C (step S6).

At this time, the master management process C outputs the import start command with respect to the processes "D1/PX1" and "D2/PZ1" of the configuration ID of #000001 to the slave management process A.

Further, the master management process C outputs the import start command with respect to the process "D2/PY1" of the configuration ID of #000001 to the slave management process B.

On the other hand, the master management process C outputs the import start command with respect to the process "D2/PZ2" of the configuration ID of #000001 to the general process of the network node C.

The slave management processes A and B obtain the corresponding port numbers from the port number assignment table and output the import processing command to the general processes (step S14). When receiving the import processing command (step S23 shown in FIG. 45), the general process starts the import processing (step S24), and when the import processing is ended, outputs the ending message to the master management process C.

The master management process C decides whether or not the import processing is all ended (step S7), and where it decides that all has been ended, outputs the process execution start command to the slave management processes A and B and the general process of the network node C (step S8).

At this time, the master management process C outputs the process (main function) execution start command with respect to the processes "D1/PX1" and "D1/PZ1" of the configuration ID of #000001 to the slave management process A.

Further, the master management process C outputs the process execution start command with respect to the process "D2/PY1" of the configuration ID of #000001 to the slave management process B.

On the other hand, the master management process C outputs the process execution start command with respect to the process "D2/PZ2" of the configuration ID of #000001 to the general process of the network node C.

The slave management processes A and B output the process execution start command to the corresponding general processes (step S15). Namely, the slave management processes A and B obtain the corresponding port number from the port number assignment table and output the call command of the main function.

Figure 45:
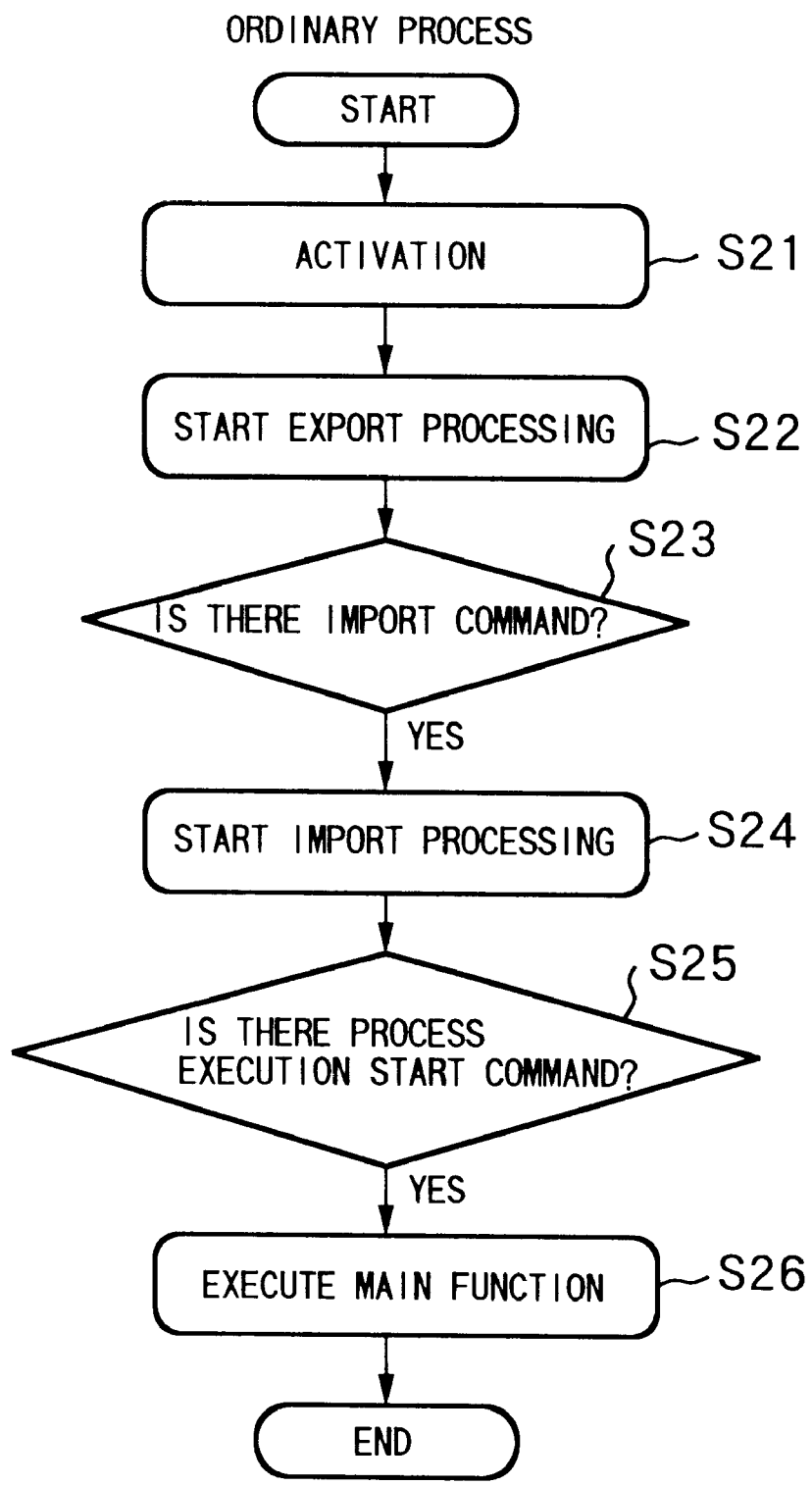
FIG. 45 is a flowchart of the processing of a general process.

FIG. 45 is a flowchart of the processing of a general process.

As shown in FIG. 45, the general process is activated by receiving as its input the port number, configuration ID, and network address of the master node as the arguments from the management process of the same network node (step S21). Then, next, the general process executes the export processing (step S22).

Then, it is decided whether or not there is an import processing command from the master management process C and the slave management processes A and B (step S23), and where it is decided that it exists, the import processing is executed (step S24), and the process execution start command is awaited (step S25). When the process execution start command is inputted, the general process executes the main function (step S26).

[Export Processing]

Below, the explanation will be made taking the export processing concerning the process "PX1" shown in FIG. 37 as an example.

Figure 51:
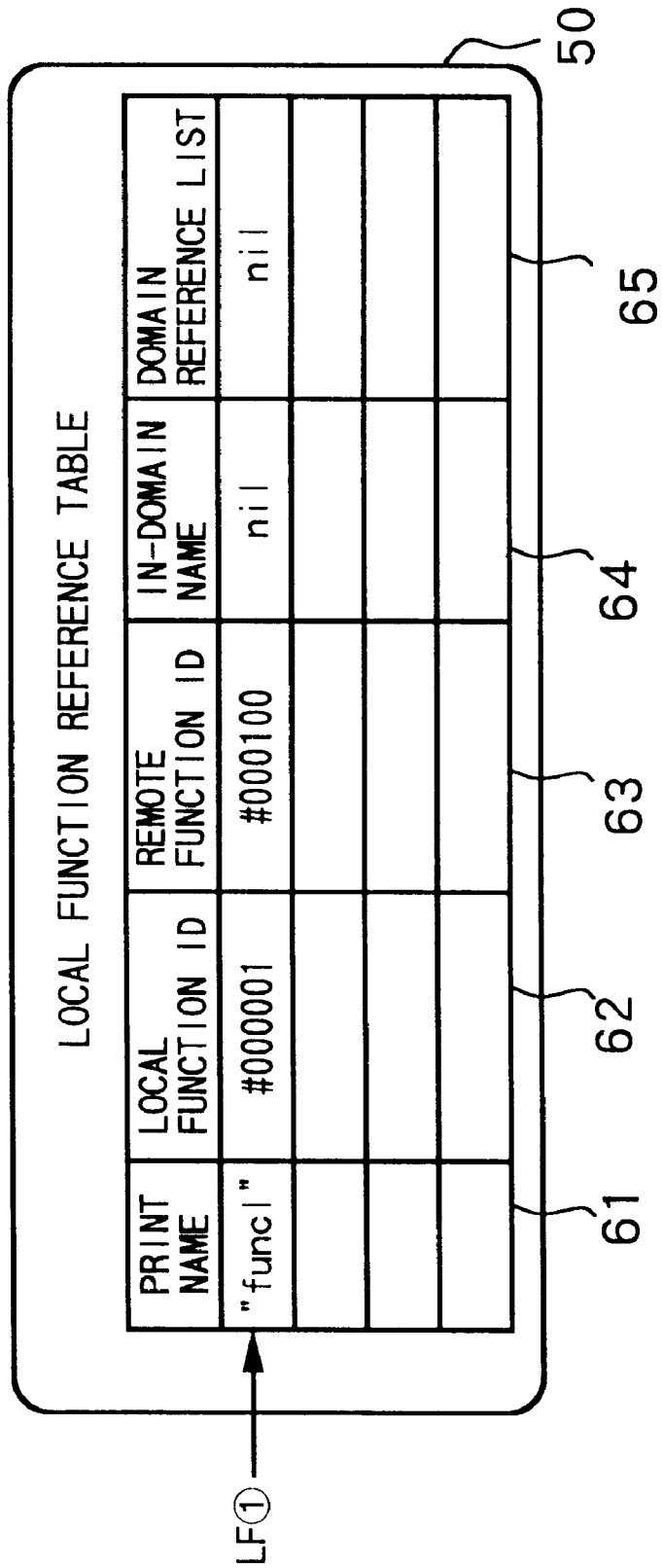
FIG. 51 is a view for explaining the export processing.

First, the general process calls "export (func1)" shown in FIG. 34, that is, the export module on the process "PX1" shown in FIG. 37, and registers "func1" in the print name 61 of the local function reference table 50 as shown in FIG. 51.

In the local function reference table 50, as the local function ID 62 of "func1", the configuration ID "#000001" shown in the port number assignment table 253 of FIG. 44 is registered, and "#00100" is registered as the remote function ID 63. This remote function ID "#00100" is registered in also the remote function ID hash table 56 shown in FIG. 52B.

Further, a name is not attached to the function "func1" on the name space, therefore the in-domain name 64 of the local function reference table 50 becomes "nil". Further, this function "func1" does not belong to any domain, and the domain reference list 65 becomes "nil".

Figure 53:
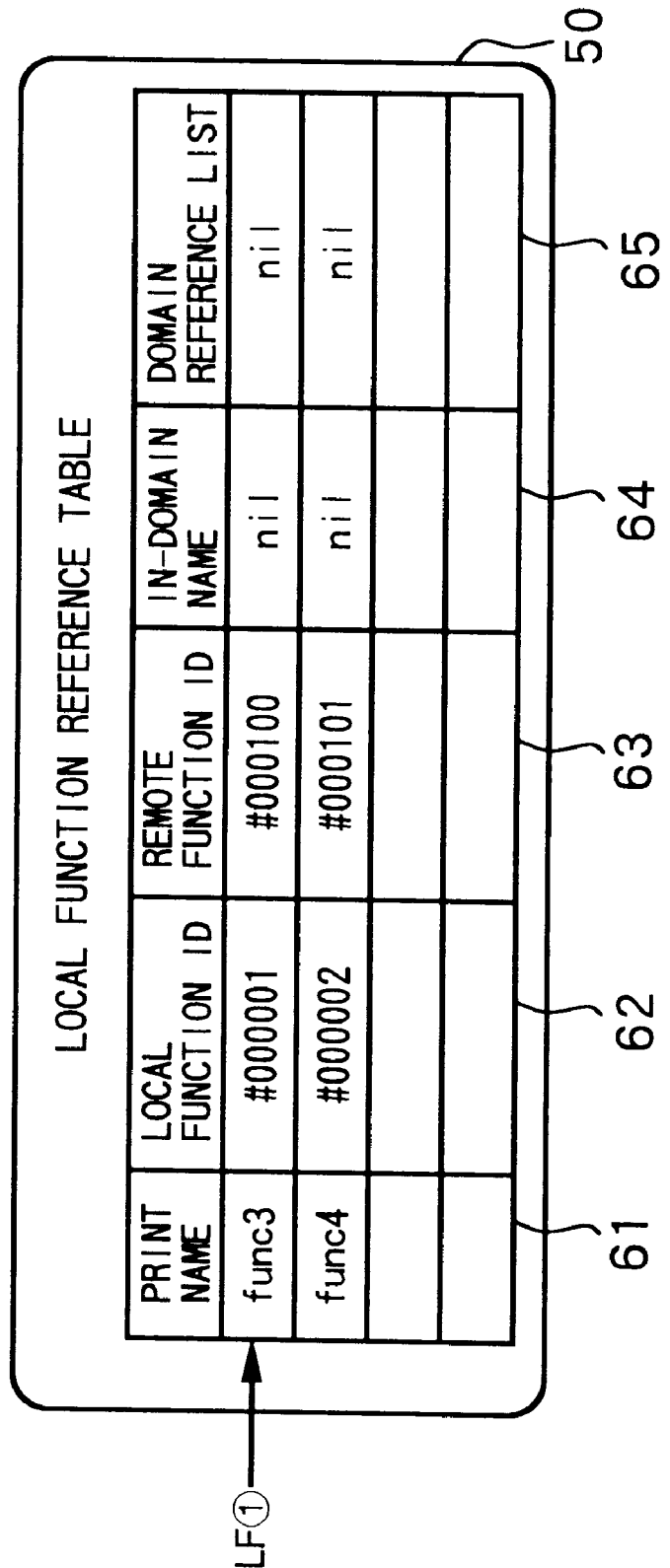
FIG. 53 is a view for explaining the export processing.

The local function reference table 50 of the process "PY1" shown in FIG. 37 becomes as shown in FIG. 53.

Figure 54:
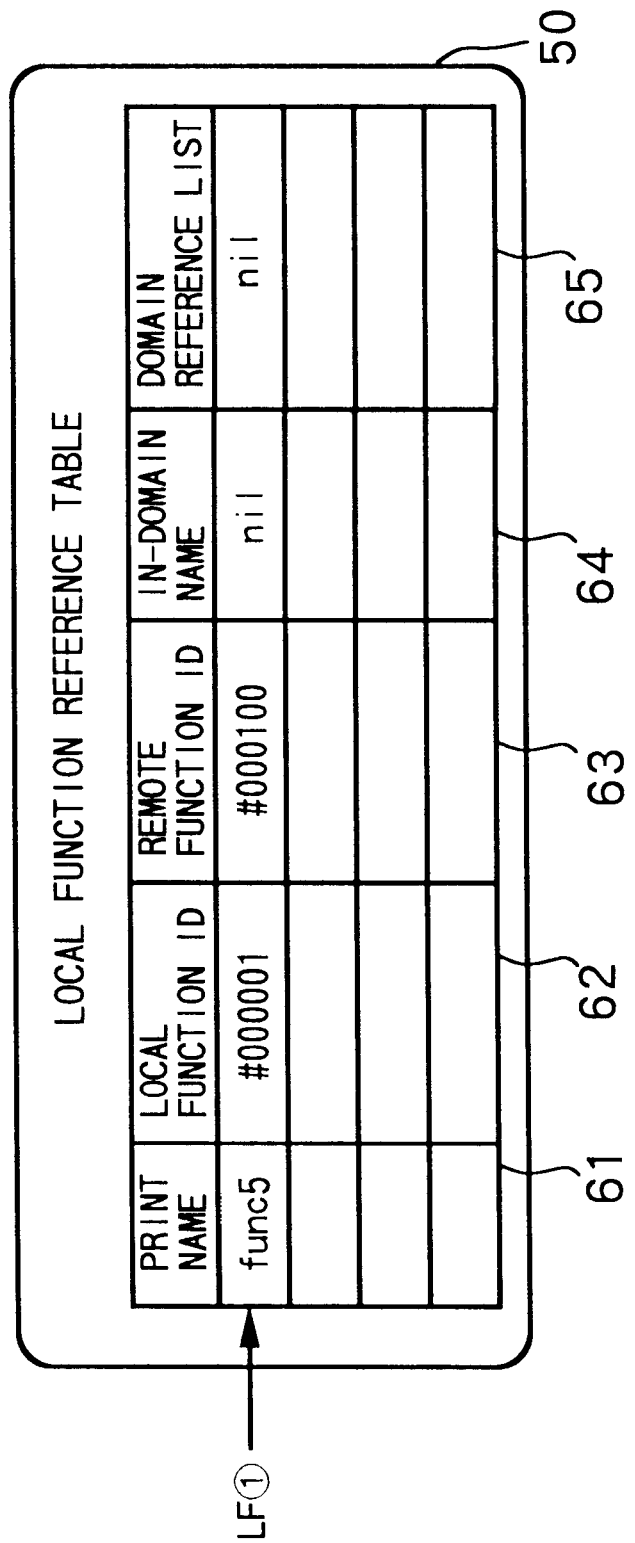
FIG. 54 is a view for explaining the export processing.

Further, the local function reference table 50 of the processes "PZ1 and PZ2 shown in FIG. 37 becomes as shown in FIG. 54.

Note that, in the export processing, also the function/process name hash table 65 shown in FIG. 52A is registered.

Here, as mentioned above, the import processing and export processing for the process "PX1" shown in FIG. 37 were exemplified, but also the import processing and export processing of the "PZ1", "PZ1", and "PZ2" shown in FIG. 37 are carried out by similar procedures.

[Import Processing]

Figure 46:
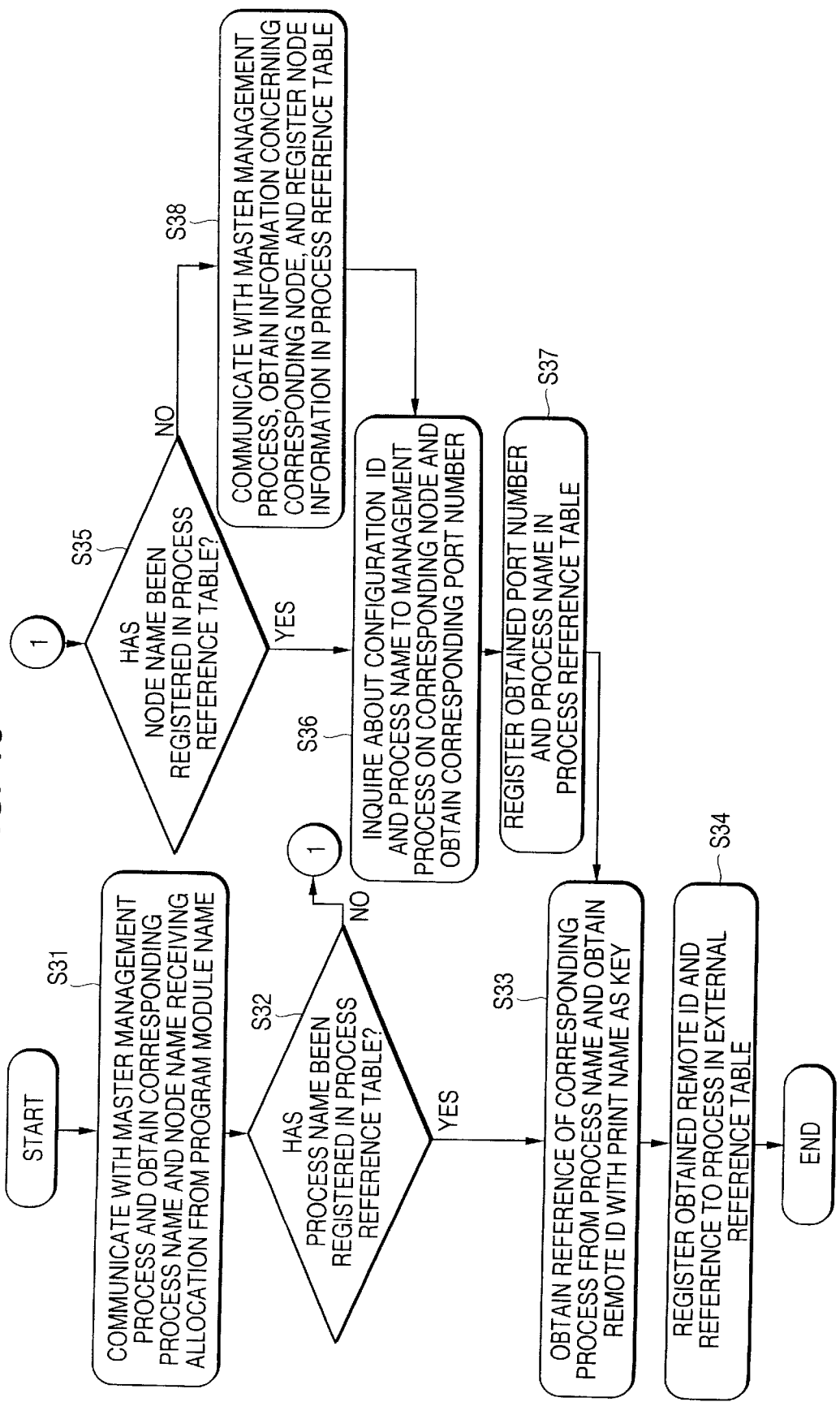
FIG. 46 is a flowchart for explaining an import processing.

FIG. 46 is a flowchart for explaining the import processing.

The general processes of the network nodes A, B, and C first perform the communication with the master management process when the import processing is started, call the import module contained in the program module, and obtain the process name of the corresponding process and the allocation destination node name thereof from the program module name based on the process allocation table 210 (step S31). At this time, where there are a plurality of corresponding processes, all are regarded as the objects of the import processing.

For example, in the case of the process "PX1" shown in FIG. 37, "import (Y: func4)" contained in the import module of the program module "X" is called. Then, the corresponding process name "D2/PY1" and node name "B" are obtained from the program allocation information 235 of the process allocation table 210 shown in FIG. 40 by using the program module name "Y" contained in this "import (Y: func4)" as the key.

Next, this general process decides whether or not the obtained process name has been already registered in the process reference 52 (step S32), and where it has not been registered, further decides whether the node name has been registered in the process reference table 52 (step S35). Where the node name has not bee registered, the general process performs the communication with the master management process, obtains the information concerning the corresponding node, and registers this node information in the process reference table 52 (step S38).

Figure 47:
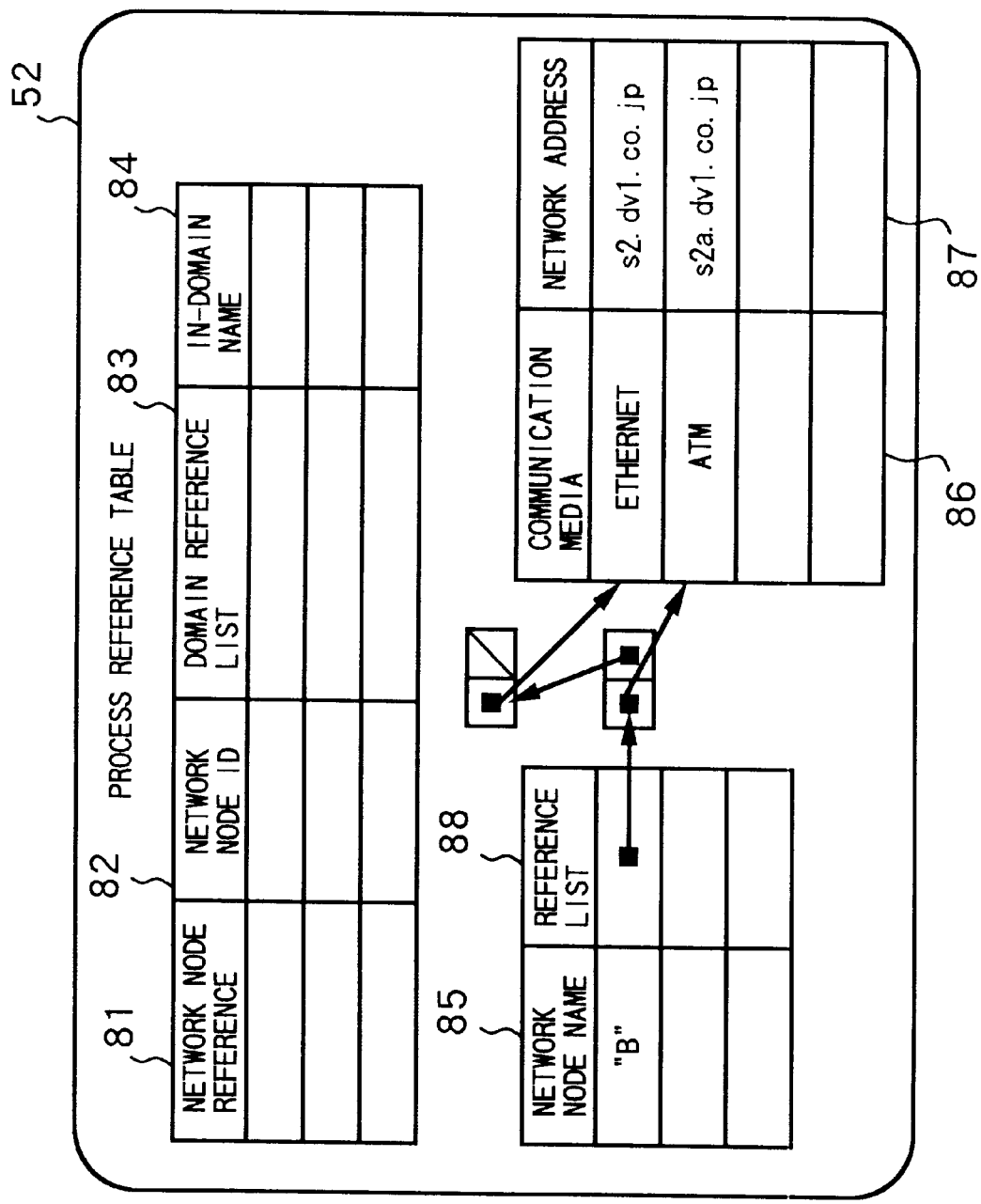
FIG. 47 is a view for explaining the import processing.

For example, as shown in FIG. 47, the process name "D2/PY1" has not been registered in the process reference table 52, therefore this process is registered in the process reference table 52. At this time, so as to specify the network address receiving the import, the node information is registered in the process reference table 52 by using the process allocation table 210 shown in FIG. 40. From this node information, the network address receiving the import is viewed.

More specifically, from the process allocation table 210 shown in FIG. 40, the node information that, in the network address of the network node "B", Ethernet is "s2.dv1.co.jp" and ATM is "s2a.dv1.co.jp", is obtained.

Next, the general process makes an inquiry to the management process on the network node receiving the import by using the configuration ID and process name as a key and obtains the corresponding port number (step S36). Concretely, the general process asks the port number to the management process receiving the import by using the configuration ID=#000001 and the process name "D2/PY1" as a key. The management process receiving the inquiry returns the port number "#010000" to the general process by referring to the port number assignment table 254 shown in FIG. 44.

When obtaining the port number, the general process registers this port number and process name in the process reference table 52 (step S37). By this, the process reference table 52 becomes as shown in FIG. 48.

Figure 48:
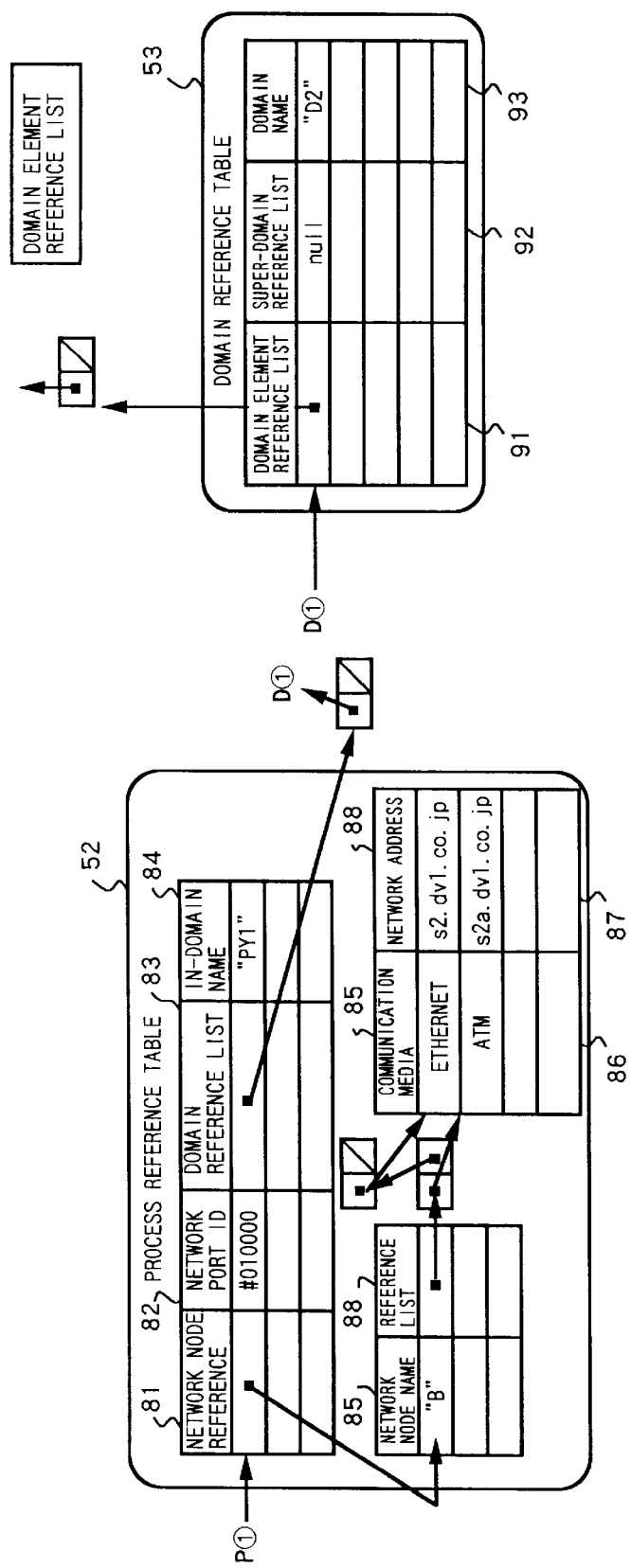
FIG. 48 is a view for explaining the import processing.

Further, where the reference of the domain "D2" to which the process "PY1" belongs does not exist, as shown in FIG. 48, a new domain is prepared in the domain reference table 53.

Figure 49B:
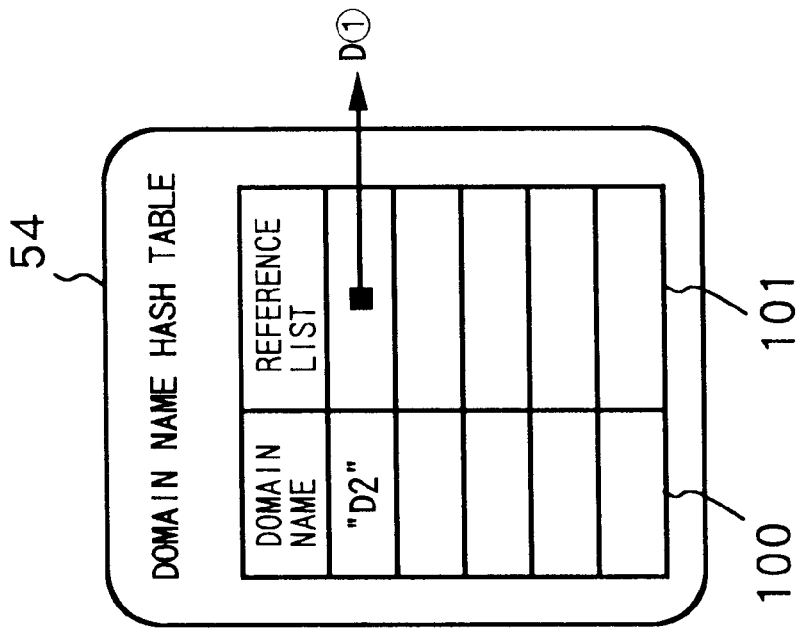
FIG. 49B is a view for explaining the import processing.
Figure 49A:
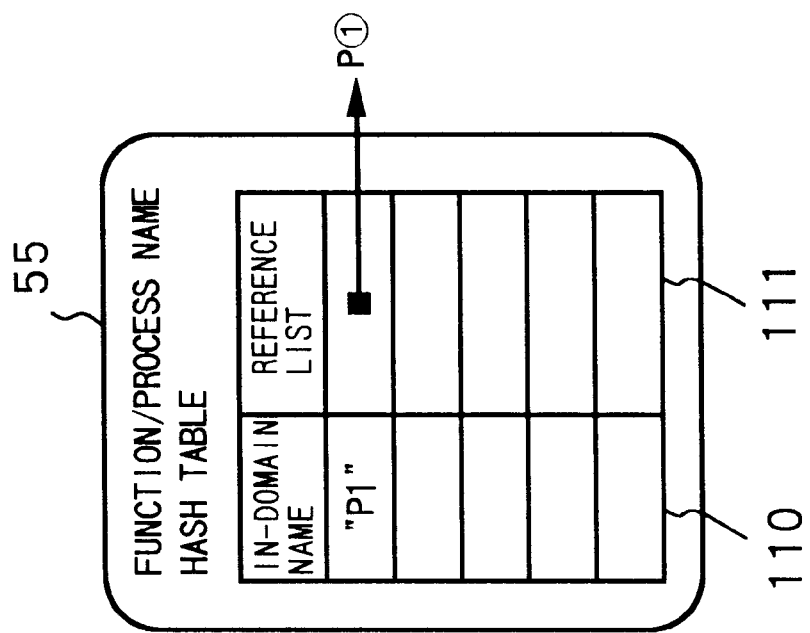
FIG. 49A is a view for explaining the import processing.

Next, as shown in FIGS. 49A and 49B, a function/process name hash table 55 and a domain name hash table 54 are prepared, and a reference relationship is established.

Next, the general process obtains the reference of the corresponding process from the process name and obtains a remote ID by using the print name as a key (step S33).

Concretely, it makes an inquiry to the remote ID, for example, the management process, by using the print name "func4" of the function described in the import module as a key. The management process obtains the remote ID "#000101" from the local function reference table by using the print name "func4" as a key and returns this to the general process. Note that, the local function reference table has been prepared in the export processing (step S22) performed before the import processing (step S24) is started as shown in FIG. 45.

Then, the general process registers the obtained remote ID, print name, and process reference in the remote function reference table (step S34).

Concretely, the general process registers the obtained remote ID "#000101", print name "func4", and the process reference in the remote function reference table 51 as shown in FIG. 50 (step S34).

[Execution of Program Module]

For example, when the network node A shown in FIG. 37 executes the program module X shown in FIG. 34 and generates the process "PX1", the processing corresponding to the "call (Y: func4)" in the function "func2( )" of the program module X is executed. At this time, the process "PX1" obtains the process reference concerning the process of the program module Y by referring to the process allocation table 210 shown in FIG. 41 of the network node A. This process reference indicates that the program module Y is allocated in the network node B and the network address of the network node B is "s2.dv1.co.jp" for the Ethernet and "s2a.dv1.co.jp" for ATM.

Next, the process "PX1" obtains the external reference by referring to the remote function reference table 51 shown in FIG. 50 by using a set of the obtained process reference and the print name "func4" and the communication media as a key. This external reference is the remote function ID "#000101", the network address and the network port ID "#010000".

Next, the process "PX1" performs the access to the other process by using the network address and network port ID and performs the function call by the designation of the remote function ID.

The called process obtains the local ID from the remote function ID hash table 56 shown in FIG. 52B by using the remote ID as a key and outputs the function activation command to the system (OS).

As explained above, in the parallel distributed processing system 31, the allocation information concerning the network node by which the program module is executed is described outside of the program module, therefore the network node for which the program module is executed can by dynamically changed by only changing the allocation information without amendment of the description of the program module. Namely, after the computation object space is formed, the space configuration thereof can be dynamically changed.

Further, according to the parallel distributed processing system 31, the application programmer can describe the reference relationship at the time of execution of the program module without depending upon the network allocation at the time of execution.

Namely, the allocation information at the time of execution of the program module is described outside of the program module, therefore it is sufficient so far as the user describes the program module by being conscious of only the reference relationship of the computation object on the program module (set of the program name and computation object). For this reason, a static reference relationship of the computation object described in the program module and the dynamic reference relationship described in the allocation information can be separately handled.

Further, as explained above, according to the parallel distributed processing system 31, by introducing the concept of computation space, the user can freely form management spaces for management only the required functions in accordance with a particular purpose. As a result, the load on the user for management of the names and identifiers of the functions is reduced. Further, the number of the managed objects is decreased, therefore the time for specifying an object can be shortened. Further, erroneous access to the objects out of the reference space can be effectively prevented.

Further, according to the parallel distributed processing system 31, by introducing domains in addition to the computation space, the collision of names of the functions etc. is allowed even between domains and the degree of freedom of the functions useable in each domain is raised.

Further, according to the parallel distributed processing system 31, it is possible to flexibly and in addition easily deal with cases where a new function is added, a function is deleted, etc. by amending the portions concerning the functions, for example, the local function reference table 50, remote function reference table 51, process reference table 52, domain reference table 53, domain name hash table 54, function/process name hash table 55, and remote function ID hash table 56.

Further, in the above parallel distributed processing system 31, the type of the execution environment (OS) of the network nodes is irrelevant to the space management, therefore a system not dependent upon the execution environment can be provided.

Further, in the above parallel distributed processing system 31, by using the concept of domains, it is possible to manage the references of the functions provided in each process without regard as to the mode of connection of the network nodes in the network.

The present invention is not limited to the above embodiments. For example, the types of the computation objects comprising the domains are not limited to those mentioned above.

Further, in the above embodiments, functions were exemplified as the computation objects, but other than this, the present invention can be similarly applied even if reference information such as functions, instances, classes, methods, global variables, and files for executing predetermined programs are managed.

Further, any management process among the management processes shown in FIG. 37 can become the master management process.

Further, it is also possible to provide the reference holding unit and the reference generation unit for every process or provide them for every computation object.

Fourth Embodiment

As this embodiment, there is shown a reference conversion device for converting the reference information of processing modules designated by the application level to system reference information capable of directly specifying an object on an actual system so as to perform for example communication among the processing modules in an environment where for example computations spaces comprised by a plurality of processing modules are allocated on a computer network comprised of a plurality of computer devices linked with each other and where each processing module performs distributed processing or parallel distributed processing while substantially communicating with another module.

Figure 55:
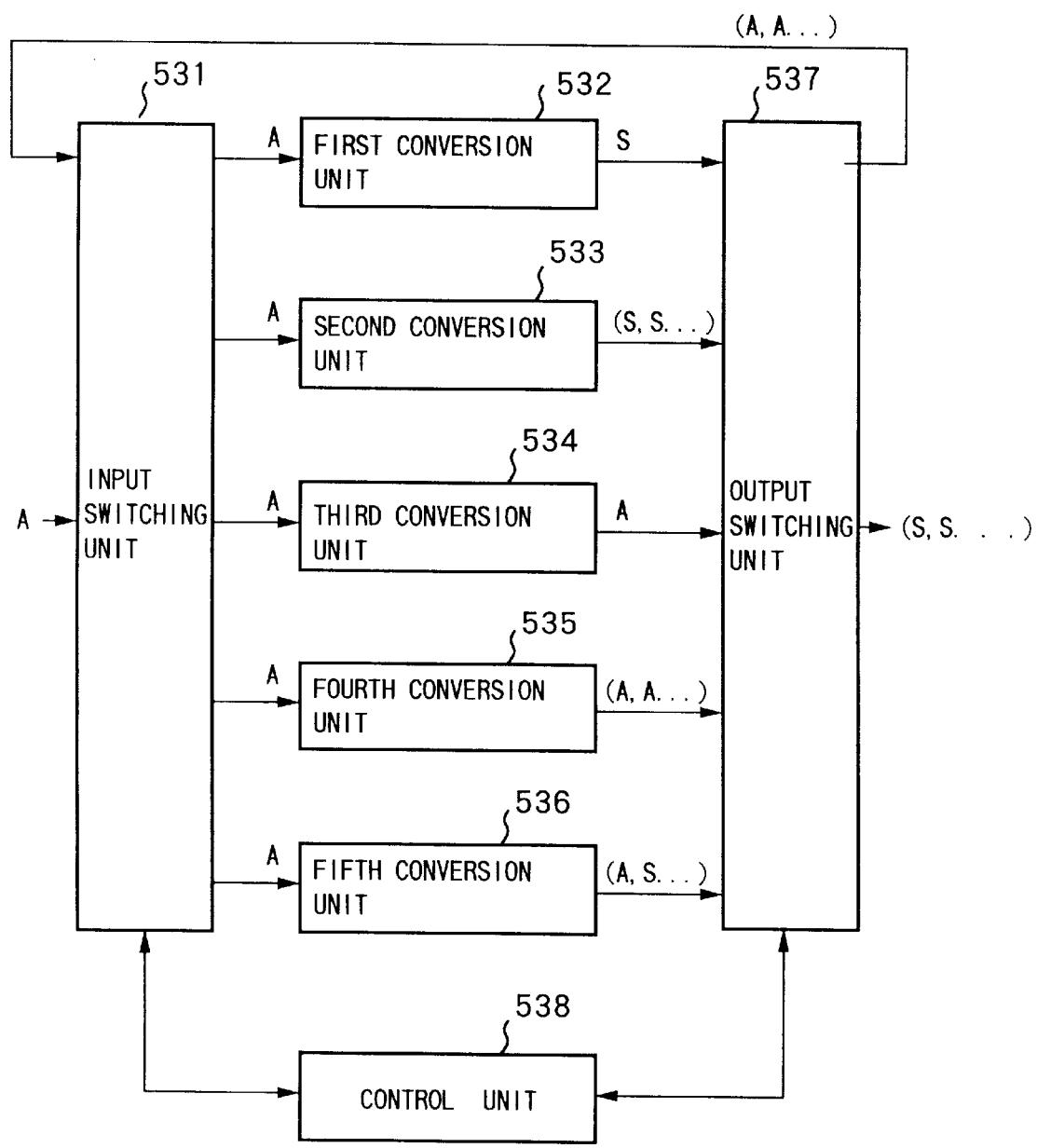
FIG. 55 is a block diagram of the configuration of a reference conversion device of the fourth embodiment of the present invention.

FIG. 55 is a block diagram of the configuration of the reference conversion device.

The reference conversion device 530 has an input switching unit 531, a first conversion unit 532, a second conversion unit 533, a third conversion unit 534, a fourth conversion unit 535, a fifth conversion unit 536, an output switching unit 537, and a control unit 538.

Note that, in FIG. 55, a symbol A indicates application reference information, and a symbol S indicates system reference information.

First, an explanation will be made of the configuration and functions of the units.

The input switching unit 531 selectively inputs the input application reference information or the application reference information input again from the output switching unit 537 mentioned later to one of the first conversion unit 532 to the fifth conversion unit 536 based on a switching signal from the control unit 538.

The first conversion unit 532 converts the input application reference information to one piece of system reference information.

The second conversion unit 533 converts the input application reference information to a set of two or more pieces of system reference information.

The third conversion unit 534 converts the input application reference information to other application reference information.

The fourth conversion unit 535 converts the input application reference information to a set of two or more pieces of application reference information.

The fifth conversion unit 536 converts the input application reference information to a set of the other application reference information and system reference information.

The output switching unit 537 switches among the processing of the reference information which is converted at the first conversion unit 532 to the fifth conversion unit 536 and sequentially output based on the control signal input from the control unit 538. Namely, it performs the switching so that the system reference information among the reference information to be output is output to the outside and so that the application reference information is input to the input switching unit 531 again. Note that, the output switching unit 537 has a not illustrated storage unit therein and that the system reference information which is converted and can be output to the outside is stored once in this storage unit. Then, at the point of time when all of the reference information with respect to the application reference information input to the reference conversion device 530 are converted to the system reference information, the system reference information are output together containing also the information stored in the storage unit.

The control unit 538 controls the input switching unit 531 and the output switching unit 537 so as to suitably convert the input application reference information to the system reference information.

The control unit 538 first reads the application reference information input to the input switching unit 531 from the outside, that is, the application reference information to be converted, or the application reference information input from the output switching unit 537, examines the contents thereof, and determines in which conversion unit among the first conversion unit 532 to the fifth conversion unit 536 the reference solution would be suitably carried out. Then, based on the result of the decision, it switches the input switching unit 531 so that the input application reference information is suitably input to a desired conversion unit.

Further, the control unit 538 decides whether the reference information resulting from the conversion input from the first conversion unit 532 to the fifth conversion unit 536 to the output switching unit 537 is the application reference information or the system reference information and, if it is the application reference information, controls the output switching unit 537 so that this information is input to the input switching unit 531 again. Further, if it is the system reference information, it controls the output switching unit 537 so as to store the same in the storage unit in the output switching unit 537 as the reference information for output.

Further, the control unit 538 outputs the system reference information or the set of the system reference information as the result of conversion to the outside if the reference information with respect to the input application reference information are all converted to the system reference information.

An explanation will be made next of the operation for substantially controlling the reference conversion device 530 by the control unit 538 by referring to the flowchart of FIG. 56.

Figure 56:
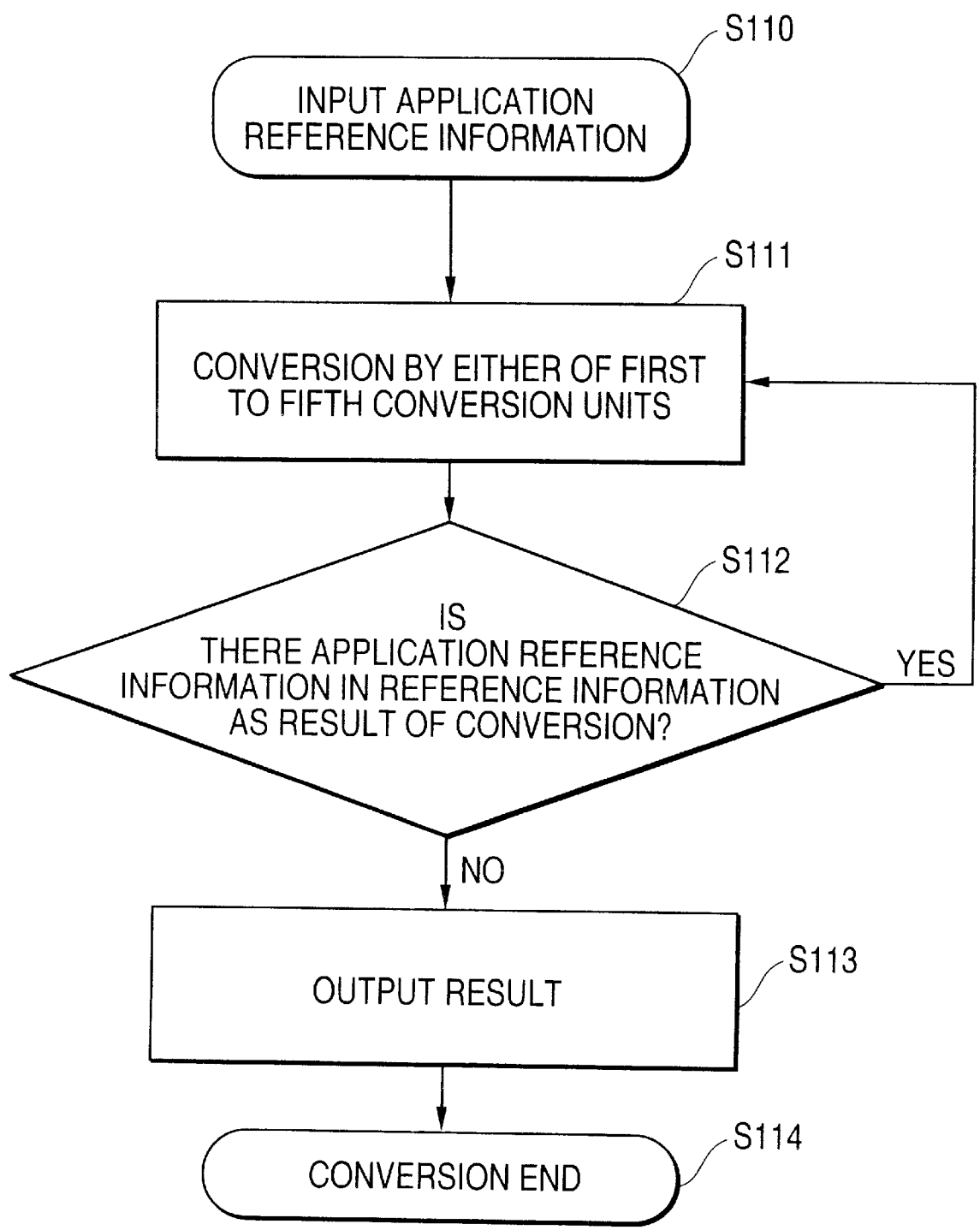
FIG. 56 is a flowchart of the flow of the processing of a control unit shown in FIG. 55.

As shown in FIG. 56, the control unit 538 starts the processing when the application reference information is input to the reference conversion device 530 (step S110), examines in which of the first conversion unit 532 to the fifth conversion unit 536 the conversion of the input application reference information is possible, and inputs the application reference information to the conversion unit, thereby making the conversion unit start the conversion (step S111). Then, when the conversion is ended, it checks whether or not the application reference information exists in the reference information resulting from the conversion (step S112) and, where it exists, repeats the processing of step S111 again for the application reference information.

When it is decided at step S112 that all reference information are converted to the system reference information, the result of the conversion is output (step S153) and the series of conversion processing is ended (step S114).

Next, an explanation will be made of the operation of this reference conversion device 530 by referring to FIGS. 57A, 57B, and 57C.

First, an example of the usual operation of this reference conversion device 530 will be shown in FIG. 57A.

In the example shown in FIG. 57A, first the input application reference information A is examined in content in the control unit 538, determined to be converted at the fourth conversion unit 535, and converted to the set of the application reference information (A1, A2, A3) at the fourth conversion unit 535. The result of this conversion is all application reference information, therefore the conversion will be carried out again, the content of the application reference information is checked again by the control unit 538, and the next conversion unit is determined. In the example of FIG. 57A, the application reference information A1 to A3 are separately input to the first to third conversion units 532 to 534 where the conversion is carried out.

As the result of conversion, the application reference information A1 is converted to the system reference information S1 at the first conversion unit 532, the application reference information A2 is converted to the set of the system reference information (S2, S3) at the second conversion unit 533, and the application reference information A3 is converted to the application reference information A4 at the third conversion unit 534.

Among these results of conversion, only the reference information A4 is still application reference information, therefore the conversion is carried out again. Namely, the selection of the conversion unit is carried out again based on the contents thereof and, as a result, at this time, it is converted to the set of the application reference information and system reference information (A5, S4, S5) at the fifth conversion unit 536. Further, the application reference information A5 remains in this conversion result, therefore this is now converted to the system reference information S6 in the first conversion unit 532.

The conversion is sequentially carried out in this way. As a result, the input application reference information A is converted to a series of the system reference information (S1, (S2, S3), (S6, S4, S5)) and output.

Note that, the application reference information and the system reference information are specifically the logical names or IDs of the modules and objects.

Further, in the first conversion unit 532 to the fourth conversion unit 535, it is also possible to perform the processing together for a set of the reference information. An example of this is shown in FIG. 57B.

In FIG. 57B, a set of the application reference information (A1, A2, A3) is generated from the input application reference information A by the fourth conversion unit 535. Next, this set of application reference information is input to the first conversion unit 532 as it is and a corresponding set of system reference information (S1, S2, S3) is obtained.

In the first conversion unit 532 to the fifth conversion unit 536 of the reference conversion device 530, the set of the application reference information can therefore be determined as the input in this way.

Further, it is also possible to input only one part of the set of the application reference information without inputting the set of the application reference information together as shown in FIG. 57B.

Such an example is shown in FIG. 57C.

Also in FIG. 57C, a set of the application reference information (A1, A2, A3) is generated from the input application reference information A by the fourth conversion unit 535. Then, in the next stage, the set of the application reference information (A1, A2) is extracted, and the application reference information A3 remaining in the first conversion unit 532 is output to the second conversion unit 533 and converted again.

In the reference conversion device 530, it is also possible to appropriately rearrange the sets of the application reference information generated in this way and define the same as the input of the application reference information of the next stage.

In this way, in the reference conversion device 530, the first conversion unit 532 to the fifth conversion unit 536 are suitably repeatedly selected and the conversion of the reference information is performed based on the contents of the reference information for the input application reference information. Accordingly, even application reference information having a complex structure is developed as the series of the system reference information finally directly indicating the object on the system.

Fifth Embodiment

The parallel distributed processing system of this embodiment applies the reference conversion device explained as the fourth embodiment to the parallel distributed processing system shown in FIG. 9 as the second embodiment. The processing modules perform the processing by substantially linking up.

In the parallel distributed processing system shown in FIG. 9, the parallel objects communication while regarding the message transmission as a base and so parallel distributed processing is realized.

In the parallel distributed processing system of this embodiment, in this message transmission, the node receiving the transmission, process, and object are specified from the remote reference with respect to the object receiving the transmission, and the processing of transmission is carried out. At this time, if the destination of transmission has become a domain or object cluster, a multicast is carried out.

Further, if the reference unit indicates a proxy object, the proxy is relayed to carry out the message transmission. Further, according to some locations of the destination of transmission, the RPC on the network, IPC inside the node, or in-process communication is selected to carry out the message transmission.

At this time, the parallel object manages the mutual remote reference in the application space and high speed message transmission is realized by this.

In relation to the present invention, an explanation will be made below of the object reference information in the application space in such a distributed processing system and the reference conversion device for performing the conversion with the system reference information for performing the actual transmission.

Figure 58:
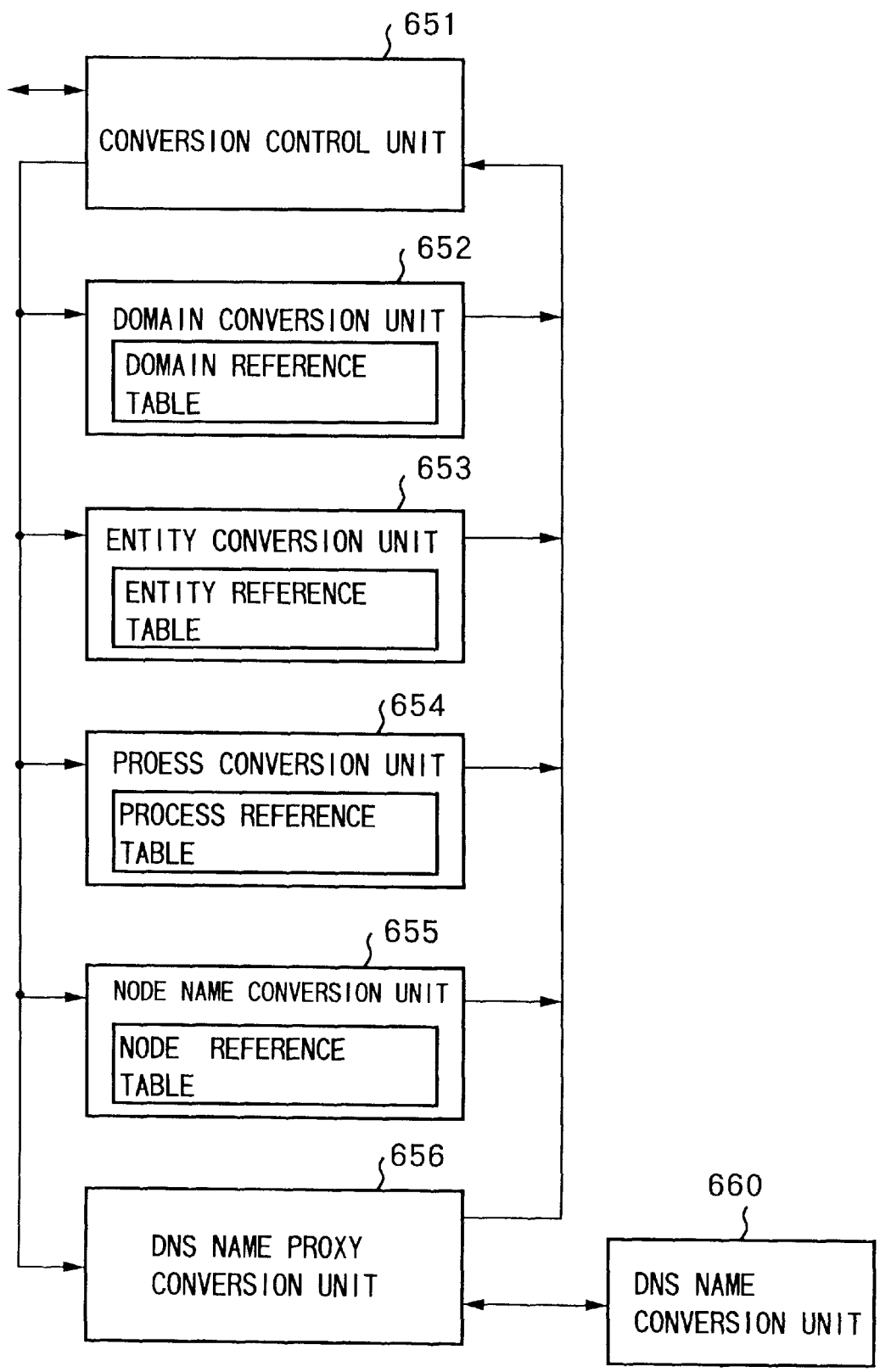
FIG. 58 is a block diagram of the configuration of a reference resolution unit in the distributed processing system of the fifth embodiment of the present invention.

FIG. 58 is a block diagram of the configuration of the reference converter 150.

The reference converted 650 has a conversion control unit 651, a domain conversion unit 652, an entity conversion unit 653, a process conversion unit 654, a node name conversion unit 655, and a DNS name proxy conversion unit 656.

First, an explanation will be made of the reference information referred to from the units of the domain conversion unit 652 to the node name conversion unit 655 and for the space management of the distributed processing system of the present invention.

The main reference information used in this distributed processing system is managed by four reference tables and three search use hash tables as shown in FIG. 11. As the four reference tables, there are a local function reference table 50 shown in FIG. 12, a remote function reference table 51 shown in FIG. 13, a process reference table 52 shown in FIG. 14, and a domain reference table 53 shown in FIG. 15. Further, the search use hash table is a hash table between the names and identifiers and is a domain name hash table 54 shown in FIG. 16, a function/process name hash table 55 shown in FIG. 17, and a remote function ID hash table 56 shown in FIG. 18.

The contents of these tables are the same as explained in the second embodiment above.

Next, an explanation will be made of the configuration of the units of the reference converter 650 shown in FIG. 58.

The conversion control unit 651 performs the overall management of the reference converted 650. More specifically, it confirms the contents of the input application reference information and outputs the input name to one of the domain conversion unit 652 to the node name conversion unit 655 in accordance with the type thereof. Then, it reads the conversion result obtained at the conversion unit and checks whether or not the obtained reference information is the system reference information. Then, for the application reference information, it inputs the same to the domain conversion unit 652 to the node name conversion unit 655 again in accordance with the contents thereof. By repeating such processing, the conversion control unit 651 controls the system so that the finally input application reference information is indicated by the system reference information and outputs the obtained system reference information.

Note that, this conversion control unit 651 has a storage means and sequentially stores the system reference information for output sequentially detected with respect to the input reference information. Then, when all reference information are finally converted to the system reference information, it reads the contents of this storage means and outputs the converted system reference information together.

Further, in the conversion control unit 651, when additional information such as information designating the communication media are input together with the application reference information, it outputs also the additional information to the conversion unit together with the reference information.

The domain conversion unit 652 converts the input domain reference information to the set of elements composing the domain by referring to the domain reference table 53. More specifically, it converts this to for example a set of the entity reference and the domain reference contained in that domain.

The entity conversion unit 653 converts the input entity reference information to the reference information of the process in which that entity exists and the remote identifier there by referring to the entity reference table. This entity reference table is substantially the same table as the local function reference table 50 and remote function reference table 51 mentioned before. Note that, here, "entity" indicates for example a function, instances, class, method, or global variable.

The process conversion unit 654 converts the input process reference information to the information of the node at which that process exists and the process identifier in that node by referring to the process reference table 52. The information of the node is either of the DNS name, IP address, or uniquely given node name.

The node name conversion unit 655 converts the input node name to the DNS name or the IP address by referring to the node reference table contained in the process reference table 52.

The DNS proxy conversion unit 656 converts the input DNS name to the IP address. The DNS name proxy conversion unit 656 has a communication means and storage means inside it. Then, when the DNS name is input, it communicates with the DNS name conversion unit 160, that is, the external reference conversion device, via the communication means and requests the conversion of the DNS name to the IP address. Then, it output the result of this as the conversion result.

Further, in the DNS name proxy conversion unit 656, the correspondence between the DNS name and the IP address obtained at this time is stored in the internal storage means mentioned before. Then, when the DNS name to be converted is input, first, the DNS names stored in this storage means are searched. When there is the same DNS name (which has been already once converted), the IP address stored in that storage means is output as the conversion result. Accordingly, only a DNS name not stored in the internal storage means is inquired about to the DNS name conversion unit 160.

Note that, in the converters of the domain conversion unit 652 to the node name conversion unit 655, when the input application reference information is a name or ID, the corresponding items of the tables are searched by this by appropriately referring to the domain name hash table 54 to the remote function ID hash table 56 and not illustrated other has table.

Further, the conversion of the information regarding the node on the network performed in the process conversion unit 654 to the node name conversion unit 655 is carried out by referring to the additional information indicating the communication media input from the conversion control unit 651 together with the reference information. This is because, if the communication media is different, usually the address is different even with respect to the same system. Accordingly, as the additional information, concretely information designating the Ethernet or ATM is input. Note that, in the present embodiment, where the communication media is not designated, the conversion is carried out by using the Ethernet as the communication media as a default.

Next, an explanation will be made of the concrete operation of this reference resolution unit 650 by referring to FIG. 59.

FIG. 59 is a view of the reference information conversion processing when a message is transmitted to all entities belonging in the domain as one example of the operation of the reference converter 650.

Note that, in FIG. 59, where a similar operation is carried out in the above reference conversion device 530 of the first embodiment in each conversion processing, the type of the conversion unit performing the conversion processing and the conversion operation are simultaneously described.

First, when the domain name D1 is input to the conversion control unit 651 of the reference converter 650, since the content is the domain name, the conversion control unit 651 outputs the reference information thereof to the domain conversion unit 652.

In the domain conversion unit 652, all entities and domains contained in a domain are extracted by referring to the domain reference table 53 via the domain name has table 54. As a result, a domain name D1 is converted to a set of entities E1 and E2 and domain names D2 and D3.

For the domain names D2 and D3 among the obtained elements, the conversion is further carried out reflexively in the domain conversion unit 652. They are converted to a set of entities E3 and E4 and entities E5 and E6 by this.

As a result, the input domain name D is converted to the set of entities (E1, E2, E3, E4, E5 and E6) in the domain conversion unit 652.

Next, the obtained entities E1 to E6 are sequentially input to the entity conversion unit 653. In the entity conversion unit 653, the entity reference information E1 to E6 are converted to the set of the reference information and the remote identifiers of the process in which the entity exists. As a result, as illustrated, the reference information indicated by the set of reference information P1 to P4 and remote identifiers ID1 to ID3 are obtained.

Next, the conversion control unit 651 inputs the obtained reference information P1 to P4 of the process to the process conversion unit 654. In the process conversion unit 654, the reference information of that process is converted to the node information and process identifier. Namely, the node information indicated by the DNS name and the process identifiers in that node are obtained with respect to the processes P1 and P2, the node information indicated by the IP address and the process identifier at that node are obtained with respect to the process P3, and the node information indicated by the node name and the process ID at that node are obtained with respect to the process P4.

In the information of node name, the node information indicated by the node name obtained with respect to the process P4 is next input to the node name conversion unit 655 and converted to the DNS name.

Further, the node information obtained as the DNS name obtained with respect to the processes P1 and P2 is transferred to the DNS name conversion unit 560 via the node name conversion unit 655 and converted to the IP address at the DNS name conversion unit 560.

As a result of such processing, the input domain name D1 is all converted to the system reference information indicated by the system address.

In this way, the reference converter 650 performs the conversion of the reference information by recursive and hierarchical processing and therefore even on a complex computer network, the reference information of the application level can be converted to the system reference information. In other words, various computation resources, that is the domains, nodes, processes, functions, instances, classes, methods, global variables, etc. can be referred to from the logical application reference information without depending upon the system structure. As a result, a more sophisticated distributed processing system not depending upon the physical network structure can be realized.

Note that, the present invention is not limited to the present embodiment and can be modified in any way.

For example, the configuration of the reference converter according to the present invention was shown in FIG. 58, but this configuration shows the basic functions and may be modified in various ways.

Figure 60:
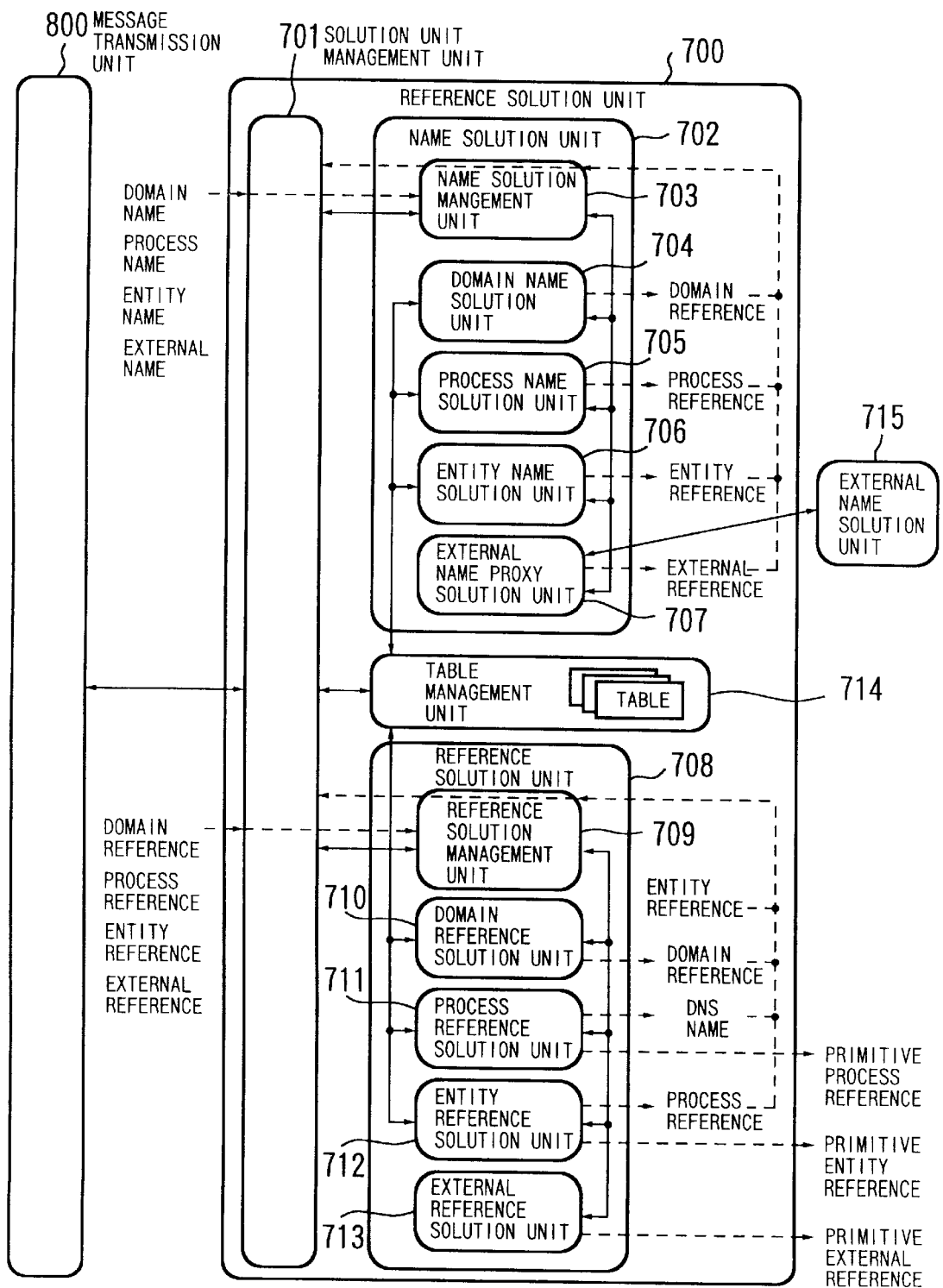
FIG. 60 is a view of a concrete embodiment of the reference resolution unit shown in FIG. 58.

As one example thereof, an example of a more concrete configuration of the reference converter is shown in FIG. 60.

The reference resolver 700 shown in FIG. 60 constitutes the conversion unit by separating this to a name solution unit 702 and a reference solution unit 708.

Below, an explanation will be made of the configuration and functions of the reference resolver 700.

The reference resolver 700 has a solution unit management unit 701, a name solution unit 702, a reference solution unit 708, and a table management unit 214.

The solution unit management unit 701 performs the overall management of the reference solution unit 700. Concretely, it decides whether the input reference information is the name or reference information. If it is the name, it outputs it to the name solution unit 702, and if it is the reference information, it outputs it to the reference solution unit 708.

The name solution unit 702 converts the name on the name space to be converted input from the solution unit management unit 701 to the corresponding reference.

The name solution management unit 703 performs the overall management of the name solution unit 702. The name solution management unit 703 outputs the input name to one of the domain name solution unit 704 to the proxy solution unit 707 in accordance with the type of the given name. Then, it reads the reference obtained at that solution unit and outputs the same to the solution unit management unit 701.

The domain name solution unit 704 performs the conversion from the domain name to the domain reference by utilizing the domain name hash table 54.

The process name solution unit 705 performs the conversion from the process name to the process reference by utilizing the function/process name hash table 55.

The entity name solution unit 706 performs the conversion from the entity name to the entity reference by utilizing a not illustrated other name hash table.

The external name solution unit 707 performs the conversion from the external name to the external reference by utilizing the proxy. Concretely, it is the proxy to for example the DNS name server.

The reference solution unit 708 performs the conversion of the reference to be converted input from the solution unit management unit 701 to the primitive reference.

The reference solution management unit 708 performs the overall management of the reference solution unit 708. The reference solution management unit 709 outputs the input reference to one of the domain reference solution unit 710 to the external reference solution unit 713 in accordance with the type of the given reference. Then, it reads the conversion result obtained at that solution unit and outputs this to the solution unit management unit 701.

The domain reference solution unit 710 performs the conversion from the domain reference to the entity reference. Concretely the domain reference is converted to the set of the (entity reference and domain reference). Then, the domain reference obtained as the result of conversion is converted reflexively in the domain reference solution unit 710.

The process reference solution unit 711 performs the conversion from the process reference to the primitive process reference. At this time, by designating the communication media, the network node name is converted to the desired network address.

The entity reference solution unit 712 performs the solution from the input entity reference to the primitive entity reference. In the present example, in the case of the conversion of the local entity reference, the given local entity reference is returned as it is as the conversion result. Further, in the case of the solution of the remote entity reference, the process reference appearing in the internal expression is converted to the primitive reference and the result is output.

The external reference solution unit 713 performs the solution from the external reference to the primitive external reference.

Note that, in FIG. 60, the external name solution unit 715 is the DNS name converting means and converts the input DNS name to the IP address.

Further, the message transmission unit 800 performs the message transmission for performing the communication among the objects in the distributed processing system 1.

Accordingly, in the reference resolver 700, concretely the reference information indicating for example the node receiving the transmission, process, and object are input from the message transmission unit 800, and the reference information is converted to the system reference information at the reference solution unit 700 and output to the message transmission unit 800. The message transmission unit 800 actually performs the communication based on the system reference information.

The reference converter may also be configured in this way.

What is claimed is:

1. A parallel distributed processing system wherein one or more computation objects of their facilities executed on a plurality of operation processing nodes connected through a network are mutually called, said parallel distributed processing system comprising:

internal referring means for showing the correspondence between a first identifier identifying the computation object or its facility receiving the call and a second identifier specifying a location of the computation object or its facility receiving the call and specified by a third identifier specifying the module to which the computation object or its facility receiving the call belongs and external referring means for holding first reference information showing the correspondence among the name or reference of the computation object or its facility receiving the call specified by the computation object or its facility originating the call, the first identifier of the computation object or its facility receiving the call, and a reference of the module to which the computation object or its facility receiving the call belongs and second reference information showing the correspondence among the third identifier of the module, the name of the operation processing node executing the module, and the location information of the operation processing node on the network and specified by the reference of the module, the computation object or its facility originating the call obtaining, from the name or reference of the computation object or its facility receiving the call obtained by the call using the first reference information of the external referring means, the first identifier and the reference of module to which the computation object or its facility receiving the call belongs, using the second reference information specified using the reference obtained to obtain the third identifier of the module to which the computation object or its facility receiving the call belongs and the location information on the network of the operation processing node executed by the module, and using the obtained first identifier of the computation object or its facility, the obtained third identifier, and the obtained location information of the operation processing node to call the module to which the computation object or its facility belongs, the module, when receiving the call, using the internal referring means specified using the third identifier to obtain a second identifier corresponding to the first identifier of the computation object or its facility receiving the call and executing the computation object or its facility receiving the call based on the second identifier.

2. A parallel distributed processing system as set forth in claim 1, wherein, when the operation processing node is managed by a predetermined name management system, the correspondence between the name of the operation processing node executing the module shown by the first reference information and the location information of the operation processing node on the network is obtained by converting the name of the operation processing node to the location information of the operation processing node on the network on the basis of said predetermined name management system.

3. A parallel distributed processing system as set forth in claim 2, wherein
a computation space is prescribed which is composed of a set of any of the one or a plurality of computation objects or their facilities and in which uniqueness of names or identifiers of the computation objects or their facilities is required in only the set; and
the external referring means uses as the name or reference of the receiving the call specified by the of the computation object or its facility originating the call the name or reference in the computation space.

4. A parallel distributed processing system as set forth in claim 3, which prescribes another computation space including at least a computation object or its facility belonging to a different computation space and performs the call in said other computation space.

5. A parallel distributed processing system as set forth in claim 1, wherein, when the module is a process,
said operation processing node comprises:
process allocating means for allocating a program module at a predetermined operation processing node and generating a process at an operation processing node receiving the allocation based on allocation information indicating correspondence between location information of the program module for realizing the process and information of the operation processing node receiving the allocation of the program module and
reference information generating means for generating the reference information of a computation object or its facilities which the program modules for realizing a process mutually refer to based on the allocation information and the reference relationship among the computation objects or their facilities described in the program module in each process.

6. A parallel distributed processing system as set forth in claim 1, wherein
a computation space is prescribed which is composed of a set of any of the one or a plurality of computation objects or their facilities and in which uniqueness of names or identifiers of the computation objects or their facilities is required in only the set;
further comprising
a plurality of reference converting means for converting logical reference information specifying a computation object or its facility in a computation space to either of similar logical reference information and system reference information corresponding to the location information or reference information of a combination of the same; and conversion control means for recursively inputting the input logical reference information and the logical reference information converted and generated in the reference converting means to any one of the plurality of reference converting means based on the logical reference information and converting the input logical reference information to the system reference information; and the logical reference information of the process receiving the communication is converted to system reference information by said reference converting means through said conversion control means and communication is performed among processes.

7. A parallel distributed processing system as set forth in claim 1, wherein the call includes a time indicated by a timer used in the module originating the call.

8. A parallel distributed processing system as set forth in claim 1, wherein when a plurality of calls are made from a module originating a call to a module receiving a call, the plurality of calls are made in succession based on a predetermined priority order in the module receiving the call.

9. A parallel distributed processing system as set forth in claim 1, wherein the call includes the time when the facility which is called is to be executed in the module receiving the call.

10. A parallel distributed processing system as set forth in claim 1, wherein the computation object or its facility is any one of a function, class, instance, method, global variable, and file, and the module is a process.

11. A parallel distributed processing system as set forth in claim 1, wherein when a new computation object or facility is registered, the modules were the call of the computation object or facility will be received and originated are analyzed and the reference information is dynamically prepared based on the result of the analysis.

12. An operation processor for executing a process provided with one or more computation objects and connected with other operation processors through a network, said operating processor comprising:

process generating means for generating a process corresponding to a program module, reference information generating means for generating reference information relating to location information directly specifying on the network a computation object or is facility which said plurality of program modules will refer to together based on a reference relationship among computation objects or their facilities described in the program module, and reference information holding means for holding said reference information, said reference information comprising:

internal reference information for showing the correspondence between a first identifier identifying the computation object or its facility receiving the call and a second identifier specifying a location of the computation object or its facility receiving the call and specified by a third identifier specifying the process to which the computation object or its facility receiving the call belongs and external reference information for holding first reference information showing the correspondence among the name or reference of the computation object or its facility receiving the call specified by the computation object or its facility originating the call, the first identifier of the computation object or its facility receiving the call, and a reference of the process to which the computation object or its facility receiving the call belongs and second reference information showing the correspondence among the third identifier of the process, the name of the operation processing node executing the process, and the location information of other operation processing nodes on the network and specified by the reference of the process, when originating the call, from the name or reference of the computation object or its facility receiving the call given by the call using the first reference information of the external reference information, the first identifier and the reference of the process to which the computation object or its facility receiving the call belongs, using the second reference information specified using the reference obtained to obtain the third identifier of the process to which the computation object or its facility receiving the call belongs and the location information on the network of the other operation processing nodes executed by the process, and using the obtained first identifier of the computation object or its facility the obtained third identifier, and the obtained location information of the operation processing node to call the process to which the computation object and its facility receiving the call belongs, when receiving the call, using the internal reference information specified using the third identifier to obtain a second identifier corresponding to the first identifier of the computation object or its facility receiving the call and executing the computation object or its facility receiving the call based on the second identifier.

13. An operation processor for executing a process provided with one or more computation objects and connected with other operation processors through a network, comprising:

a process allocating means for substantively generating a process by instructing the allocation of the program module and a generation of a process corresponding to the program module to a predetermined operation processing node based on allocation information showing the correspondence between location information of a program module for executing the process and information of an operation processing node receiving the allocation of the program module, reference information generating means for substantially generating reference information by instructing generation, relating to location information directly specifying on the network a computation object or its facility which said plurality of program modules will refer to together, to the process generated corresponding to the program module based on the allocation information and a reference relationship among computation objects or their facilities described in the program module, and communicating means for instructing the allocation of the process to the operation processing node or instructing the generation of the reference information to the process, said reference information comprising:

internal reference information for showing the correspondence between a first identifier identifying the computation object or its facility receiving the call and a second identifier specifying a location of the computation object or its facility receiving the call and specified by a third identifier specifying the process to which the computation object or its facility receiving the call belongs and an external reference information for holding first reference information showing the correspondence among the name or reference of the computation object or its facility receiving the call specified by the computation object or its facility originating the call, the first identifier of the computation object or its facility receiving the call, and a reference of the process to which the computation object or its facility receiving the call belongs and second reference information showing the correspondence among the third identifier of the process, the name of the operation processing node executing the process, and the location information of other operation processing nodes on the network and specified by the reference of the process.

14. A parallel distributed processing method wherein one or more computation objects or their facilities executed on a plurality of operation processing nodes connected through a network are mutually called up, said parallel distribute processing method using:

internal reference information for showing the correspondence between a first identifier identifying the computation object or its facility receiving the call and a second identifier specifying a location of the computation object or its facility receiving the call and specified by a third identifier specifying the module to which the computation object or its facility receiving the call belongs, and external reference information for holding first reference information showing the correspondence among the name or reference of the computation object or its facility receiving the call specified by the computation object or its facility originating the call, the first identifier of the computation object or its facility receiving the call, and a reference of the module to which the computation object or its facility receiving the call belongs and second reference information showing the correspondence among the third identifier of the module, the name of the operation processing module executing the module, and the location information of the operation processing node on the network and specified by the reference of the module, to resolve references, and the computation object or its facility originating the call obtaining, from the name or reference of the computation object or its facility receiving the call given by the call using the first reference information of the external reference information, the first identifier and the reference of the module to which the computation object or its facility receiving the call belongs, using the second reference information specified using the reference obtained to obtain the third identifier of the module to which the computation object or its facility receiving the call belongs and the location information on the network of the operation processing node executed by the module, and using the obtained first identifier of the computation object or its facility, the obtained third identifier, and the obtained location information of the operation processing node to call the process to which the computation object and its facility receiving the call belongs, the module, when receiving the call, using the internal reference information specified using the third identifier to obtain a second identifier corresponding to the first identifier of the computation object or its facility receiving the call and executing the computation object or its facility receiving the call based on the second identifier.

15. A parallel distributed processing method as set forth in claim 14, wherein, when the operation processing node is managed by a predetermined name management system, the correspondence between the name of the operation processing node executing the module shown by the first reference information and the location information of the operation processing node on the network is obtained by converting the name of the operation processing node to the location information of the operation processing node on the network on the basis of third predetermined name management system.

16. A parallel distributed processing method as set forth in claim 15, wherein a computation space is prescribed which is composed of a set of any of the one or a plurality of computation objects or their facilities and in which uniqueness of names or identifiers of the computation objects or their facilities is required in only the set; and the external reference information uses as the name or reference of the computation object or its facility receiving the call specified by the computation object or its facility originating the call name or reference of the computation object or its facility in the computation space.

17. A parallel distributed processing method as set forth in claim 14, which prescribes another computation space including at least a computation object or its facility belonging to a different computation space and performs the call in said other computation space.

18. A parallel distributed processing method as set forth in claim 14, comprising, when the module is a process, allocating a program module at a predetermined operation processing node and generating a process at an operation processing node receiving the allocation based on allocation information indicating correspondence between location information of the program module for realizing the process and information of the operation processing node receiving the allocation of the program module, and generating the reference information of a computation object or its facility which the program modules for realizing a process mutually refer to based on the allocation information and the reference relationship among the computation objects or their facilities described in the program module in each process.

19. A parallel distributed processing method as set forth in claim 14, further comprising:

prescribing a computation space which is composed of a set of any of the one or a plurality of computation objects or their facilities and in which uniqueness of names or identifiers of the computation objects or their facilities is required in only the set;

determining a method of reference conversion based on the content of logical reference information specifying a computation object or its facility receiving a communication of a module in a computation space;

using the method of reference conversion determined to convert to the logical reference information receiving the communication to either of another logical reference information and system reference information directly specifying an object on the computer network;

determining the method of reference conversion of the logical reference information in the reference information resulting from the conversion based on said logical reference information again;

using the method of reference conversiondetermined to again perform conversion;

repeatedly determining the method of reference conversion for the logical reference information and performing conversion based on it until all elements of the reference information resulting from the conversion become system reference information and communicating among modules based on said reference information when all of the elements become system reference information; and performing the distributed processing with the modules substantively linked.

20. A parallel distributed processing method as set forth in claim 14, wherein the call includes a time indicated by a timer used in the module originating the call.

21. A parallel distributed processing method as set forth in claim 14, wherein when a plurality of calls are made from a module originating a call to a module receiving a call, the plurality of calls are made in succession based on predetermined priority order in the module receiving the call.

22. A parallel distributed processing method as set forth in claim 14, wherein the call includes a time when the facility which is called is to be executed in the module receiving the call.

23. A parallel distributed processing method as set forth in claim 14, wherein:

the computation object or its facility is any one of a function, class, instance, method, global variable, and file, and the module is a process.

24. A parallel distributed processing method as set forth in claim 14, wherein when a new computation object or facility is registered, the modules where the call of the computation object or facility will be received and originated are analyzed and the reference information is dynamically prepared based on the result of the analysis.

* * * * *

UNITED STATES PATENT AND TRADEMARK OFFICE
CERTIFICATE OF CORRECTION

PATENT NO.:    6,098,111
DATED     :    August 1, 2000
INVENTOR(S):   Hirotoshi MAEGAWA, et al.

It is certified that [an/error[s]] appears in the above-identified patent and that said Letters Patent is hereby corrected as shown below:

Column 3, line 32, change "further" to --Further--
Column 21, line 62, delete " [00c6] "
Column 43, line 40, delete "a"(first occurrence)
Column 46, line 18, change "conversiondetermined" to --conversion determined--

Signed and Sealed this

Seventeenth Day of April, 2001

*Attest:*

NICHOLAS P. GODICI

*Attesting Officer*    *Acting Director of the United States Patent and Trademark Office*